(12) United States Patent
Graham et al.

(10) Patent No.: US 12,736,454 B2
(45) Date of Patent: Sep. 15, 2026

(54) SELF-MIXING INTERFEROMETRY

(71) Applicant: Dyson Technology Limited, Malmesbury (GB)

(72) Inventors: David James Graham, Swindon (GB); Michele Benetti, Bristol (GB); Sanjeeb Tripathy, Cambridge (GB); Christopher John Bateman, Swindon (GB); Alexander Michael Kember, Woking (GB)

(73) Assignee: Dyson Technology Limited, Malmesbury (GB)

( * ) Notice: Subject to any disclaimer, the term of this patent is extended or adjusted under 35 U.S.C. 154(b) by 25 days.

(21) Appl. No.: 18/720,037

(22) PCT Filed: Dec. 7, 2022

(86) PCT No.: PCT/GB2022/053112
§ 371 (c)(1),
(2) Date: Jun. 14, 2024

(87) PCT Pub. No.: WO2023/111512
PCT Pub. Date: Jun. 22, 2023

(65) Prior Publication Data

US 2025/0060297 A1 Feb. 20, 2025

(30) Foreign Application Priority Data

Dec. 14, 2021 (GB) ..................................... 2118084

(51) Int. Cl.
*G01N 15/0205* (2024.01)

(52) U.S. Cl.
CPC ................................ *G01N 15/0205* (2013.01)

(58) Field of Classification Search
CPC ............. G01N 15/0205; G01N 15/075; G01N 15/1456; G01N 15/00; G01N 15/06;
(Continued)

(56) References Cited

U.S. PATENT DOCUMENTS 5,170,218 A * 12/1992 Keene ..................... G01S 17/58
356/28
6,233,045 B1 * 5/2001 Suni ......................... G01C 3/08
356/5.1
(Continued)

FOREIGN PATENT DOCUMENTS

WO 2010058322 A1 5/2010

OTHER PUBLICATIONS

Norgia M et al., "Novel Measurement Method for Signal Recovery in Optical Vibrometer", IEEE Transactions on Instrumentation and Measurement, vol. 57, No. 8, 2008, pp. 1703-1707.
(Continued)

*Primary Examiner* — Sang H Nguyen
(74) *Attorney, Agent, or Firm* — Tucker Ellis LLP

(57) ABSTRACT

A self-mixing interferometer configured to monitor particulate material within a monitored region of space comprising a laser cavity assembly (1A) and an optical assembly (1B) configured to bathe the monitored region with laser light of the interferometer possessing wavefronts having different directions at different respective locations within the monitored region. A laser monitoring unit (1C) is configured to acquire an interferometric signal generated by the interferometer in response to light returned to the laser cavity assembly from said wavefronts by said particulate material. A processing module (1D) is configured to determine a property of the particulate material within the monitored region according to changes in the frequency of a waveform within at least a part of the interferometric signal.

20 Claims, 22 Drawing Sheets

(58) Field of Classification Search
CPC .... G01N 15/10; G01N 15/1431; G01N 21/45; G01N 2015/0046; G01N 2015/1027; G01N 2015/1454; G01N 2015/0003; G01N 2015/0238; G01N 2015/025; G01N 2015/1029; G01N 2015/1493; G01N 33/0004; G01N 2021/418; G01B 9/02038; G01B 9/02045; G01B 9/02092; G01B 9/02; G01B 9/02097; G01P 5/26
See application file for complete search history.

(56) References Cited

U.S. PATENT DOCUMENTS

2018/0209892 A1 7/2018 Van Der Lee et al.
2018/0224368 A1* 8/2018 Spruit ................ G01N 15/1434
2019/0146065 A1* 5/2019 Jutte ..................... G01S 7/4916 356/4.01
2019/0285753 A1* 9/2019 Spruit ..................... G01S 7/497
2019/0346360 A1* 11/2019 Jutte .................. G01N 15/0205
2020/0003673 A1 1/2020 Van Der Lee et al.
2020/0096314 A1* 3/2020 Ouweltjes ............. G01S 7/4916
2020/0318945 A1 10/2020 Mutlu et al.
2020/0319082 A1 10/2020 Mutlu et al.
2021/0116355 A1* 4/2021 Spruit ................ G01N 15/1434

OTHER PUBLICATIONS

Xia Fei et al., "Retrieve the Material Related Parameters from a Self-Mixing Signal Using Wavelet Transform" 2018 IEEE International Frequency Control Symposium (IFCS), 2018, pp. 1-4.

* cited by examiner

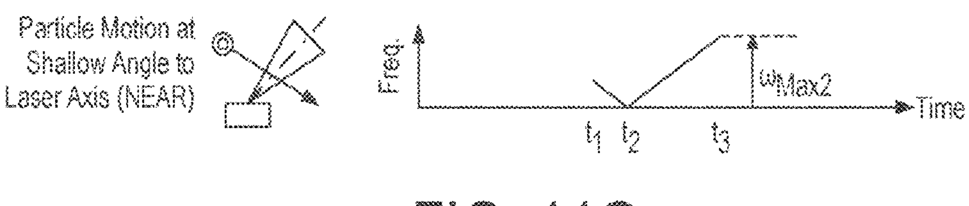
FIG. 11G
Particle Motion at Shallow Angle to Laser Axis (FAR)
Freq.
Time
$\omega_{Max2}$
$t_1$ $t_2$ $t_3$
FIG. 11H
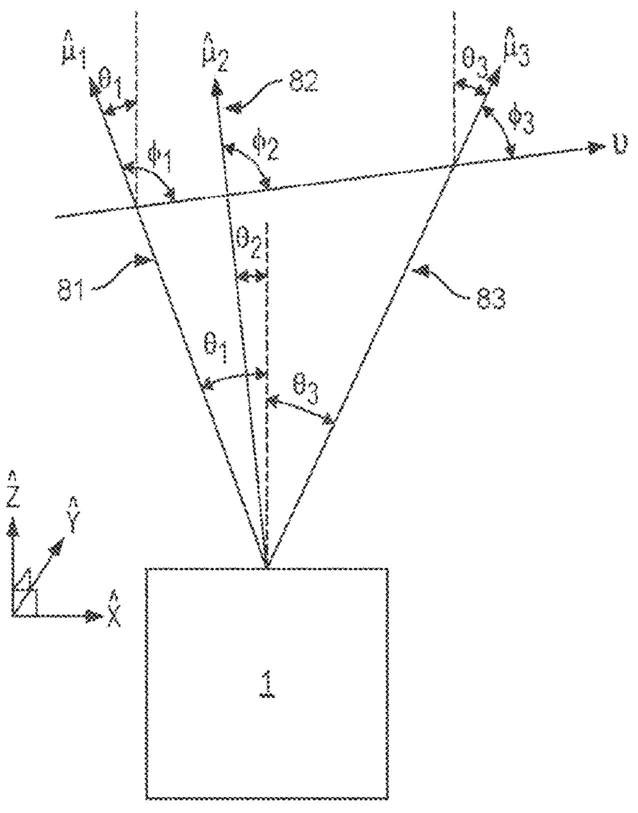
FIG. 12A

SELF-MIXING INTERFEROMETRY

RELATED APPLICATION DATA

This application is a national phase application of International Application No. PCT/GB2022/053112 filed Dec. 7, 2022, which claims priority to GB Application 2118084.9 filed Dec. 14, 2021.

FIELD OF THE INVENTION

The present invention relates to self-mixing interferometry (SMI) and particularly, although not exclusively, to particulate matter sensors based on the principle of self-mixing interferometry.

BACKGROUND

The self-mixing effect is a form of laser feedback interferometry. It occurs within a laser resonator cavity due to the deliberate mixing of the intracavity electromagnetic wave with an electromagnetic wave that has been emitted from the resonator cavity and subsequently reinjected into the resonator cavity after interaction in an "external cavity". The external cavity is simply the region of space through which the outward-and-return path of the emitted electromagnetic wave passes before re-entering the resonator cavity. The laser resonator cavity plus the external cavity collectively define an interferometer, and the external cavity serves as an interferometer arm of the interferometer. Changes in the optical path length of this interferometer arm reveal themselves as modulations in the optical power within the laser resonator cavity, or as modulations in the voltage across the drive terminals of the laser cavity.

This phenomenon is typically referred to as self-mixing interferometry (SMI), but is also referred to by other names, such as: laser feedback interferometry, back-scatter-modulation, induced-modulation, self-coupling, optical feedback, external feedback, and auto-dyning. Here we refer to the phenomenon as self-mixing interferometry (SMI), and it is to be understood that this includes a reference to the other names given to this phenomenon as identified above.

This phenomenon may occur in lasers regardless of their type, and may be implemented using gas lasers, in-plane semiconductor diode lasers, vertical-cavity surface-emitting lasers (VCSEL), mid-infrared and terahertz quantum cascade lasers (QCLs), inter-band cascade lasers, fibre lasers and fibre ring lasers, solid-state lasers, micro-ring lasers, and quantum dot lasers.

The effect is observable when typically as little as 0.1%, or less, of emitted radiation is reflected from an external object some distance from the laser resonator cavity. Using a photosensitive detector to collect radiation emitted from one partially transmissive mirror of the laser resonator cavity, displacement of the object in the external cavity may be sensed using radiation reinjected into the laser resonator cavity through the partially transmissive second mirror (i.e., the laser output mirror) after reflection from the object. The phenomenon has also been proposed for use in measuring physical parameters that are capable of altering an optical path length in the external cavity of the self-mixing interferometer. These parameters include physical size and velocity measurement of reflecting objects within the external cavity. The present invention has been devised in light of the above considerations.

SUMMARY OF THE INVENTION

An SMI system operates on the following principle schematically illustrated in FIG. 1A and FIG. 1B. Laser light 2 is emitted from the laser resonator cavity of a laser 1 and is transmitted as an electromagnetic wave 3 to an external target object 4 from which it is partially reflected, or back-scattered. A portion of the reflected or back-scattered light is transmitted back to the laser as a returned electromagnetic wave (5A or 5B) where a portion of it 6 re-enters the resonator cavity of the laser 1.

Inside the resonator cavity of the laser, the re-entered light mixes with resident light of the resonator cavity that exists in one or more of the resonant modes of the laser resonator cavity (see Mixing Modulation 7A, 7B). As a result of the mixing of light within the laser resonator cavity, the re-entered light perturbs the electromagnetic field within the resonator cavity. This perturbation becomes measurable as consequential perturbations (7A, 7B) to the operating parameters of the laser. Consequently, the branch of the laser light path extending from the laser resonator cavity to the target object may be regarded as a first arm (an external arm) of an interferometer for light output from (and returned to) the cavity, and the laser resonator cavity may be regarded as a second arm (an internal arm) of the interferometer for light remaining within the cavity. Light waves (3, 5A, 5B) propagating along these two arms of the interferometer are brought together within the laser resonator cavity where they mix and cause constructive or destructive interferences generating perturbations (e.g., mixing modulations 7A, 7B) in operating parameters of the laser. Perturbations in operating parameters such the gain of the laser result in measurable perturbations in the optical power of the laser and the voltage at the drive terminals of the resonator cavity. Variations in optical power may be monitored using a photodetector ('PD'; FIG. 1C) to indirectly measure the optical power of light sampled from the optical resonator cavity of the laser, or variations in the voltage of drive terminals of the resonator cavity can be monitored directly. Indirect measurement of optical power may be achieved either by use of a laser having an optical resonator cavity in which both mirrors of the cavity are partially transmissive thereby to release, from each end of the resonator cavity, a defined proportion of the light within resonator cavity. Of course, the output laser beam, 2, is the result of the front mirror of the optical cavity releasing a defined first proportion of the light from within resonator cavity. In addition, the back mirror of the resonator cavity may also release a defined second proportion of the light from within resonator cavity resulting in a second output of laser light (2B; FIG. 1C) which is received and monitored by the photodetector.

Referring to FIG. 1C, in a so-called "three-mirror model" of SMI, the laser resonator cavity 1A is represented as the "internal" cavity with length $L_{int}$, refractive index $n_{in}$. Light 2A within this internal cavity has a round-trip propagation time $\tau_{in}$. Light 2 leaves the internal cavity through the partially transmissive front mirror $M_2$, of reflectivity $R_2$, and traverses the external cavity of length Lex where it reflects from the external mirror $M_3$, of reflectivity R. This external light has a round-trip propagation time Text. A portion 6 of this light re-enters the laser resonator cavity 1A through the front mirror $M_2$ and mixes with the electromagnetic field inside the laser resonator cavity. A small portion 2B of the intra-cavity light exits the laser resonator cavity 1A through the back mirror $M_1$ and is detected by a monitoring photodetector (PD). When a single reflection from $M_3$ is considered, the rate at which re-injected light 6 is coupled into the laser cavity 1A given by:

$$\kappa \propto (1-R_2)\frac{1}{\tau_{int}}\sqrt{\frac{R}{R_2}}$$

The "feedback level" (C) within the resonator cavity is given by:

$$C = \kappa\frac{\tau_{ext}}{\tau_{int}}\sqrt{1+\alpha^2}$$

Here, the term α is known in the art as the "linewidth enhancement factor". It is known in the art that the optical coupling within the resonator cavity of the laser results in the so-called "excess phase equation":

$$\varphi_{FB} = \varphi_s + C\sin\left(\varphi_{FB} + \tan^{-1}\alpha\right)$$

The term $\varphi_{FB}$ represents the phase accumulated by the electromagnetic field of the laser on feed-back (FB) transmission through the external cavity. The term $\varphi_s$ corresponds to the phase accumulated by transmission through the external cavity if the laser were not experiencing optical feedback. The feedback level C determines the degree of non-linear coupling within the laser resonator cavity. In the following discussions, we will consider the "weak feedback" regime in which C→0 such that no nonlinear coupling exist. The observable quantities are either a variation in laser power or a variation in voltage across the laser terminals. The dependence of these quantities on the phase term $\varphi_{FB}$ can be found as follows.

$$\varphi_{FB} = \varphi_S + C\sin\left(\varphi_{FB} + \tan^{-1}\alpha\right)$$

$$P_{Laser} = A + B\cos\left[\varphi_s + C\sin\left(\varphi_{FB} + \tan^{-1}a\right)\right]$$

However, when there is only a weak feedback intensity in the light returned to the laser cavity from the mirror $M_3$ the coefficient C becomes negligible, and one may write:

$$P_{Laser} \cong A + B\cos\varphi_s$$

Here, the amplitude of the modulation B∝κ, and the resulting SMI signal, for a given laser resonator cavity, depends the reflectivity of the external mirror $M_3$ and the nature of the accumulated phase $\varphi_s$. Returning to FIG. 1A, there is schematically shown a situation where the wavelength of the laser light is λ and the accumulated phase $\varphi_s$ within the returned light wave 5A corresponds to an even integer multiple, n, of half-wavelengths, and for simplicity we have set A=B, such that constructive interference modulates the laser power signal 7A, such that:

$$P_{Laser} \cong A + B\cos(\pi n) = A + B = 2A$$

Returning to FIG. 1B, there is schematically shown a situation where the scattering target object 4 has moved away from the laser resonator cavity 1 so as to increase the length of the external arm of the interferometer by λ/4 corresponding to one quarter of one wavelength of the laser light, noting that the wavelength of the laser light is λ. As a result of this movement, the accumulated phase $\varphi_s$ within the returned light wave 5B corresponds to an odd-multiple, n+1, of these half-wavelengths, such that destructive interference modulates the laser power signal 7B, such that:

$$P_{Laser} \cong A + B\cos(\pi[n+1]) = A - B = 0$$

It is to be understood that the schematic representations shown in FIG. 1A and FIG. 1B are simplified representations provided to aid understanding of the principles of self-mixing interferometry. The invention employs self-mixing interferometry for detecting particles (particulate material) and properties thereof.

In the following, several aspects of the invention are disclosed, and many desirable or preferred features are described. However, it is to be understood that the invention includes the combination of any one or more of the desirable or preferred features described below with any one or more of the aspects of the invention described below, except where such a combination is clearly impermissible or expressly avoided. Accordingly, desirable and preferred features are described as being desirable or preferable "in any aspect of the invention", In one aspect the invention proposes a particulate matter sensor based on the principle of self-mixing interferometry employing an interferometric laser providing electromagnetic wavefronts that move in different directions at different regions of a monitored region of space relative to the path of the particulate matter to be sensed within that region. This relative difference in directions may present itself in the form of electromagnetic wavefronts that are curved in space (i.e., relative to a fixed coordinate system of the interferometric laser) and therefore are curved relative to a linear path of particular matter through the monitored region. Alternatively, or in addition, this relative difference in directions may present itself in the form of electromagnetic wavefronts that are themselves substantially flat in space (i.e., relative to a fixed coordinate system of the interferometric laser) and therefore are curved relative to a curved path of particular matter through the monitored region (i.e., as seen in the moving spatial reference frame of the particulate matter, the flat electromagnetic wavefronts appear to be curved). Alternatively, or in addition, this relative difference in directions may present itself in the form of electromagnetic wavefronts that are themselves substantially flat or curved in space (i.e., relative to a fixed coordinate system of the interferometric laser) but are emitted by the electromagnetic wave source (i.e., a laser) in different relative directions in the monitored region and therefore move in different directions at different regions of a monitored region of space relative to the path of the particulate matter to be sensed.

The inventors have realised that this difference in directions, as between wavefront motion and particulate matter motion, generates a consequential structure within an interferometric signal of a self-mixing interferometer. The inventors have realised that this structure may be exploited to reveal estimates of properties of the particulate matter causing the structure. These properties include, but are not limited to: the speed of the particulate matter within the monitored region relative to the interferometric laser; the direction of motion of the particulate matter within the monitored region relative to the interferometric laser; the concentration (e.g., number density) of particulate matter within the monitored region; the size of particulate matter within the monitored region; a distribution (relative or actual) of the size of particulate matter within the monitored region.

In any aspect of the invention, the wavelength (λ) of laser light of the self-mixing interferometer may be in the visible light range or in the near-infrared (NIR) range. For example, the wavelength (λ) of laser light of the self-mixing interferometer may be in the range: 300 $\mu m \leq \lambda \leq 10$ μm. In other examples, the wavelength (λ) of laser light of the self-mixing interferometer may outside of this range. The wavelength of the laser light of the self-mixing interferometer may be selected in preference to the range of particle that the apparatus is intended to preferentially detect. This is because the mechanism the scattering of light from a particle is influenced by the ratio (α/λ) of the wavelength (λ) of scattering light and the radius (α) of the particle from which the light scatters. For example, if this ratio is much smaller than one (1) then Rayleigh scattering mechanisms dominate. "Mie scattering" mechanisms dominate in situations where the size of the scattering particles is comparable to the wavelength of the light, such that the ratio is comparable to one (1), rather than much smaller or much larger. However, geometrical optical mechanisms (GO) dominate when the ratio is much larger than one (1). By an appropriate choice of laser light wavelength, the user may select the most appropriate scattering mechanism to take place in respect of the particle size range to be sensed. The invention disclosed herein may be configured to monitor particulate material according to a ratio (α/λ) of the wavelength (λ) of the self-mixing interferometer and the radius (α) of the particles to be monitored which is, for example and without limitation, in the range: $0.1 \leq \alpha/\lambda \leq 100$.

Accordingly, in a first aspect, the invention may provide a self-mixing interferometer configured to monitor particulate material within a monitored region of space comprising a laser cavity assembly and an optical assembly configured to bathe the monitored region with laser light of the interferometer possessing wavefronts having different directions at different respective locations within the monitored region. The self-mixing interferometer includes a laser monitoring unit configured to acquire an interferometric signal generated by the interferometer in response to light returned to the laser cavity assembly from said wavefronts by said particulate material, The self-mixing interferometer also includes a processing module configured to determine a property of the particulate material within the monitored region according to changes in the frequency of a waveform within at least a part of the interferometric signal.

In this way, the inventors have realised that by providing optical wavefronts propagating/directed in different relative directions one is able to glean more information about particle properties efficiently. The bathing of the monitored region with laser light may comprise illuminating the monitored region continuously (e.g., with a continuous wave (CW) laser beam or beams) throughout a monitoring time period or interval, or may comprise illuminating the monitored region intermittently or periodically (e.g., with a succession of laser light pulses) throughout a monitoring time period or interval.

Desirably, in any aspect of the invention, the processing module is configured to determine a property of the particulate material within the monitored region according to a continuous change in the frequency of said waveform. Accordingly, the interferometer may generate light possessing wavefronts having different propagation directions such that particles interacting with the different directions of propagation, whilst being bathed by the light, cause returned light that mixes with native light in the resonator cavity of the interferometer cause an interferometric signal waveform having a non-constant frequency. The non-constant frequency may be expressed as a difference in frequency as between different parts of (e.g., different time intervals within) the waveform, such that the waveform frequency may be substantially constant during at least one finite time interval within the waveform, but may either possess one or more different substantially constant frequencies during at one or more respective other finite time intervals within the waveform or may possess a continuously changing frequency during at one or more respective other finite time intervals within the waveform.

Desirably, in any aspect of the invention, the waveform within at least a part of the interferometric signal comprises a chirped waveform. A chirped waveform may possess a continuously changing frequency during at one or more respective finite time intervals within the waveform, or throughout substantially the entire duration of the waveform. The continuous change may comprise a continuous increase or a continuous decrease in the frequency of the waveform, or a mixture of both during different respective intervals of time within the waveform. It has been found that the frequency of the waveform and the manner in which the frequency changes, contains useful information about properties of a detected item of particulate material. The use of laser light within the monitored region possessing wavefronts having different directions at different respective locations within the monitored region greatly assists in obtaining this information.

Preferably, in any aspect of the invention, the property of the particulate material comprises a property of the path thereof within the monitored region.

Desirably, in any aspect of the invention, the property of the path comprises a distance to said particulate material relative from the interferometer.

Preferably, in any aspect of the invention, the property of the path comprises a speed of said particulate material relative to the interferometer. The speed of the particulate material may comprise a magnitude of a two-dimensional velocity vector, or a magnitude of a three-dimensional velocity vector describing a velocity of the particulate material in two dimensions of space, or in three dimensions of space. The self-mixing interferometer may comprise at least two laser cavity assemblies, or at least three laser cavity assemblies, and an optical assembly (or respective optical assemblies) configured to bathe the monitored region with respective beams of laser light configured to overlap in the monitored region.

Preferably, in any aspect of the invention, the laser cavity assembly is configured to output a laser beam in each of two or more different directions, wherein the processing module is configured to determine two or three mutually orthogonal components of a velocity of particulate material through the monitored region according to changes in the frequency of a waveform within at least a part of the interferometric signals generated respectively by the laser cavity assembly when in each of the two or more different directions, and/or according to the number of wave cycles within the respective waveforms. The mutually orthogonal components of a velocity of the particulate material may be defined according to a plurality of respective angles subtended between a path of the particulate material and a longitudinal axis of a laser beam directed in a respective one of the two or more different directions.

The property of the path, in any aspect of the invention, preferably comprises a direction of said particulate material relative to the interferometer. The direction of the particulate material may comprise an angle subtended between a path of the particulate material and a longitudinal axis of a laser beam of said laser light from the laser cavity assembly. The direction of the particle may comprise an orientation of a two-dimensional velocity vector, or an orientation of a three-dimensional velocity vector describing a velocity of the particulate material in two dimensions of space or in three dimensions of space.

Desirably, in any aspect of the invention, the processing module is configured to determine a size and/or a size distribution of said particulate material within the region of space. The processing module may be configured to determine a radius of a particle of the particulate material according to a sum of the squared moduli of coefficients of a frequency-space transform of the interferometric signal (e.g., a wavelet transform). The sum of the squared moduli of coefficients may be divided by the value of the duration of the interferometric signal thereby providing a time-normalised sum. The processing module may be configured to determine a radius of a particle of the particulate material according to a ratio of the moduli of two coefficients of a wavelet transform of the interferometric signal in which the two coefficients correspond to different respective mother wavelets. Preferably, the coefficients of the ratio correspond to the same time scaling factor of the respective wavelet transform. Preferably, the coefficients of the ratio correspond to the same time positioning factor of the respective wavelet transform. The processing module may be configured to determine a radius of a particle of the particulate material according to a value of a slope, gradient or inclination of a structure in data describing the interferometric signal in a frequency-space transformation thereof. The structure may be an elongated distribution of data across the dimensions of the transform space, e.g. along a trend line or locus of points along which data is closely distributed or correlated in such a way as to define a structure (e.g., a locus, or principal component, or vector, or cluster, etc.) possessing a longitudinal axis, trend line or locus along which a direction or an orientation is definable in the dimensions of the transform space. A locus of points may comprise e.g., a line, curve or other figure formed by all the points satisfying a particular relation or correlation between coordinates.

Preferably, in any aspect of the invention, the processing module is configured to determine a concentration of said particulate material within the region of space.

The interferometric signal generated by the interferometer and acquired by the laser monitoring unit may, in any aspect of the invention, comprise a voltage waveform signal at least a part of which continuously changes in frequency and corresponds to a voltage across the electrical drive terminals of a laser cavity of the laser cavity assembly.

The interferometric signal generated by the interferometer and acquired by the laser monitoring unit may, in any aspect of the invention, comprise an optical output power signal at least a part of which continuously changes in frequency and corresponds to an optical output power of a laser cavity of the laser cavity assembly.

Preferably, in any aspect of the invention, the optical assembly is configured to bathe the monitored region with a static divergent and/or convergent beam of said laser light possessing a curved wavefront in which the monitored region comprises regions other than the/a focal region of said laser light. The optical assembly may be configured to bathe the monitored region with a laser beam possessing an angle of divergence (or convergence) not less than 5 degrees, or preferably not less than 10 degrees, or preferably not less than 15 degrees, or preferably not less than 20 degrees, or preferably not less than 25 degrees, or preferably not less than 30 degrees. The optical assembly may be configured to bathe the monitored region with a laser beam possessing an angle of divergence (or convergence) not greater than 50 degrees, or preferably not greater than 45 degrees, or preferably not greater than 40 degrees.

The processing module may be configured, in any aspect of the invention, to determine an angle of divergence of the laser beam. The angle of divergence may be calculated based on the values of different frequencies within the interferometric signal generated by the interferometer (e.g., a starting frequency at the beginning of the waveform and an ending frequency at the end of the waveform). The processing module may be configured to fit a mathematical expression describing the waveform to the waveform of the interferometric signal generated by the interferometer thereby to determine a property of the particulate path (e.g., an orientation relative to a beam axis) and/or a property of the laser beam (e.g., a beam divergence angle).

The processing module may be configured, in any aspect of the invention, to determine the values of different time points within the interferometric signal generated by the interferometer representing any one or more of: a starting time at the beginning of the waveform; an ending time at the end of the waveform; a tangential time within the waveform when particulate material reached a point on a path through the laser light corresponding to a tangent to a local wavefront of the laser light. The processing module may be configured to determine the values of a time difference between two different time points within the interferometric signal generated by the interferometer, the time points representing any two of: a starting time at the beginning of the waveform; an ending time at the end of the waveform; a tangential time within the waveform when particulate material reached a point on a path through the laser light corresponding to a tangent to a local wavefront of the laser light. The processing module may be configured to re-scale a said time difference between two different time points within the interferometric signal by rescaling the time coordinates of the data describing the structure wherein the rescaling is according to a calculated distance of a particle from the laser cavity assembly. This permits data extending over first time difference associated with a first particle at a first distance from the laser cavity assembly to be accurately compared to data extending over a second time difference associated with a second particle at a second (different) distance from the laser cavity assembly.

The processing module may, in any aspect of the invention, be configured to identify a time point within the waveform at which the frequency of the waveform vanishes as being a tangential time within the waveform when particulate material reached a point on a path through the laser light corresponding to a tangent to a local wavefront of the laser light. The processing module may be configured to determine the values of different time points based on these properties of the structure of data describing a distribution of data in a frequency transform space (e.g., in a spectrogram or scalogram). The processing module may be configured to determine properties of the particulate material using the values of different time points so determined, and/or using differences between them.

Desirably, in any aspect of the invention, the optical assembly is configured to bathe the monitored region with a beam of said laser light possessing a substantially flat wavefront moved across the monitored region to a plurality of different directions. The beam may scanned through a pre-set range of angular directions as a continuously moving beam thereby directing the wavefronts of the beam in different directions over each scan. Alternatively, or in addition, the beam may directed successively, for a given finite duration of time (e.g., a dwell time) in each one of a succession of different static angular directions selected from a pre-set range of angular directions thereby directing the wavefronts of the beam in different directions during each finite duration of time.

The laser cavity assembly may, in any aspect of the invention, be configured to output two or more laser beams comprising different respective cross-sectional beam shapes and/or different beam directions. A cross-sectional shape of a laser beam may be substantially circular, or non-circular, or substantially elliptical. A non-circular cross-sectional beam shape may be generated by the use of astigmatic optics within the optical assembly of the respective self-mixing interferometer. A cross-sectional shape of each laser beam may be substantially elliptical. The major axis of the elliptical cross-section of one such laser beam may be oblique to (e.g., substantially perpendicular to, or other angle) major axis of the elliptical cross-section of another such laser beam.

The two or more laser beams may, in any aspect of the invention, be configured to overlap within the monitored region to define an overlap region. The processing module may be configured to determine a property of the particulate material within the overlap region in response to light returned to the laser cavity assembly concurrently from said wavefronts of said two or more laser beams.

The processing module may, in any aspect of the invention, be configured to determine a property of the particulate material within the monitored region according to differences in the respective cross-sectional beam shapes. A difference in said respective cross-sectional beam shapes may comprise a difference in beam angular divergence of respective laser beams (e.g., as viewed in a given plane).

In another aspect, the invention may provide a portable electronic device comprising the self-mixing interferometer as described above. For example, the portable electronic device may comprise an air purification device. An air purification device may be any apparatus configured to purify or clean air by any means, such as any means readily available to the skilled person. For example, such a device may be configured to remove contaminants from the air in an environment (e.g., a room, etc.) to improve air quality in domestic, medical, industrial, or commercial areas and industries. Air purification may be performed by methods known in the art, such as (for example but without limitation):

- by air filter purification whereby air is forced through a filter and particles are physically captured by the filter, or
- by polarized-media electronic air cleaning which applies a voltage to establish the polarizing electric field for filtering particulate material, or
- by ionisation purification methods whereby electrically charged air or gas ions are generated to attach to airborne particles which are then electrostatically attracted to a charged collector plate.

Of course, other air purification methods and means are readily available to the skilled person. The self-mixing interferometer according to any aspect of the present invention may be used alone, or used within or conjunction with an air purification device, in order to determine properties or airborne particulate matter which may be used as parameters to determine any desired or appropriate measure of air purity or air quality. For example, the self-mixing interferometer may be configured within or upon the portable electronic device to monitor or detect one or more of: a concentration of particulate matter; a size and/or size distribution of particulate matter; a speed or velocity of particulate matter; a position or distance of particulate matter; direction of motion of particular matter. The self-mixing interferometer, or a portable electronic device, may be configured to use any one or more of these detected quantities as parameters in a determination, calculation or estimation of any desired or appropriate measure, quantification or definition of air purity or air quality. An appropriate measure, quantification or definition of air purity or air quality may include, for example (but without limitation): a concentration value (e.g., number of particles per unit volume); a number of particles within a monitored region (e.g., during a pre-set time interval); a presence (or absence) within a monitored region of particulate material having a size (e.g., radius) above or below a pre-set threshold value or within (or outside) a pre-set range of sizes; rate of motion (e.g., speed) of particulate material within a monitored region.

The air purification device may comprise a self-mixing interferometer disposed at any one of: an air inlet of the air purification device for receiving air to be subject to a purification process; an air outlet of the air purification device for outputting air that has been subject to a purification process; an internal surface of the air purification device other than an at an air input or an air output, for monitoring air while it is being subjected to a purification process; an external surface of the air purification device other than an at an air input or an air output, for monitoring ambient air. In this way, the self-mixing interferometer may be employed to monitor not only the purity of ambient air, but also to monitor the efficacy of an air purification process (e.g., to control the operation, e.g., use and duration of use, of the air purification device accordingly).

The self-mixing interferometer may be comprised within a non-portable air purification unit (e.g., for mounting to a wall, to a ceiling or a floor-standing device e.g., weighing more than, e.g., 20 kg) such as for commercial or domestic areas and uses, or within a non-fixed moveable air purification unit (e.g., weighing less than, e.g., 20 kg, or less than 10 kg in weight).

In yet another aspect, the invention may provide a wearable electronic device comprising the portable electronic device described above. In this way, the self-mixing interferometer may be employed by individuals to monitor the purity or quality of ambient air in their immediate environment, which may change as the user moves from place to place, or as time passes in one place. Thus, the self-mixing interferometer may be comprised within or upon a portable unit (e.g., weighing less than, e.g., 5 kg, or less than 1 kg, or less than 0.5 kg, or less than 0.25 kg, or less than 0.1 kg in weight). Examples include a wrist-mounted electronic device, a smartphone device, a tablet device, a laptop computer device, or a bespoke air quality monitoring device. The portable unit may comprise parts (e.g., one or more straps, clips etc.) configured for attaching or mounting the portable unit upon the body of a person, or upon/within clothing. This permits ease of use such as for personal and individual uses.

In a second aspect, the invention may provide a method for monitoring particulate material within a monitored region of space using self-mixing interferometry comprising providing an interferometer comprising a laser cavity assembly and an optical assembly and bathing the monitored region with laser light of the interferometer possessing wavefronts having different directions at different respective locations within the monitored region. The method comprises acquiring an interferometric signal generated by the interferometer in response to light returned to the laser cavity assembly from said wavefronts by said particulate material. By a processing module, the method comprises determining a property of the particulate material within the monitored region according to changes in the frequency of a waveform within at least a part of the interferometric signal.

The method, in any aspect of the invention, may comprise, by the processing module, determining a property of the particulate material within the monitored region according to a continuous change in the frequency of said waveform. The property of the particulate material may comprise a property of the path thereof within the monitored region. The property of the path may comprise a distance to said particulate material relative from the interferometer. The property of the path may comprise a speed of said particulate material relative to the interferometer. The property of the path may comprise a direction of said particulate material relative to the interferometer.

The method, in any aspect of the invention, may comprise, by the processing module, determining a size and/or a size distribution of said particulate material within the region of space.

The method, in any aspect of the invention, may comprise, by the processing module, determining a concentration of said particulate material within the region of space.

The interferometric signal may, in any aspect of the invention, comprise a voltage waveform signal at least a part of which continuously changes in frequency and corresponds to a voltage across the electrical drive terminals of a laser cavity of the laser cavity assembly, or may comprise an optical output power signal at least a part of which continuously changes in frequency and corresponds to an optical output power of a laser cavity of the laser cavity assembly.

The method, in any aspect of the invention, may comprise, by the optical assembly, bathing the monitored region with a static divergent and/or convergent beam of said laser light possessing a curved wavefront in which the monitored region comprises regions other than a/the focal region of said laser light.

The method, in any aspect of the invention, may comprise, by the optical assembly, bathing the monitored region with a beam of said laser light possessing a substantially flat wavefront moved across the monitored region to a plurality of different directions.

The method, in any aspect of the invention, may comprise, by the laser cavity assembly, outputting a laser beam in each of two or more different directions, and by the processing module, determining two or three mutually orthogonal components of a velocity of particulate material through the monitored region according to said changes in the frequency of a waveform within at least a part of the interferometric signals generated respectively by the laser cavity assembly when in each of the two or more different directions, and/or according to the number of wave cycles within the respective waveforms. The mutually orthogonal components of a velocity of the particulate material may be defined according to a plurality of respective angles subtended between a path of the particulate material and a longitudinal axis of a laser beam directed in a respective one of the two or more different directions.

The waveform within at least a part of the interferometric signal preferably comprises, in any aspect of the invention, a chirped waveform.

The method, in any aspect of the invention, may comprise, by the laser cavity assembly, outputting two or more laser beams comprising different respective cross-sectional beam shapes and/or different beam directions. A cross-sectional shape of a laser beam may be substantially circular, or non-circular, or substantially elliptical. A non-circular cross-sectional beam shape may be generated by the use of astigmatic optics within the optical assembly of the respective self-mixing interferometer. A cross-sectional shape of each laser beam may be substantially elliptical. The major axis of the elliptical cross-section of one such laser beam may be oblique to (e.g., substantially perpendicular to, or other angle) major axis of the elliptical cross-section of another such laser beam.

The method, in any aspect of the invention, may comprise, by the laser cavity assembly, directing the two or more laser beams to overlap within the monitored region to define an overlap region and, by the processing module, determining a property of the particulate material within the overlap region in response to light returned to the laser cavity assembly concurrently from said wavefronts of said two or more laser beams.

The method, in any aspect of the invention, may comprise, by the processing module, determining a property of the particulate material within the monitored region according to differences in said respective cross-sectional beam shapes. A difference in said respective cross-sectional beam shapes may comprise a difference in beam angular divergence of respective laser beams (e.g., as viewed in a given plane).

The invention may provide a particulate matter sensor, and a corresponding sensing method, as described above which is based on the principle of self-mixing interferometry and which can monitor a region in 'free-space' without the use of an air-flow channel or duct to serve as the monitored region within which to control the speed or direction of the airflow.

According to a third aspect, the invention may provide a self-mixing interferometer configured to monitor particulate material within a monitored region of space comprising a laser cavity assembly and an optical assembly configured to bathe the monitored region with laser light of the interferometer. The self-mixing interferometer comprises a laser monitoring unit configured to acquire an interferometric signal generated by the interferometer in response to light returned to the laser cavity assembly from said wavefronts by said particulate material. The self-mixing interferometer also comprises a processing module configured to determine a property of the particulate material within the monitored region according to a structure in data describing the interferometric signal in a frequency-space transformation thereof wherein at least a part of the interferometric signal comprises a waveform of changing frequency.

In this way, the inventors have realised that if at least a part of the interferometric signal comprises a waveform of changing frequency one is able to glean more information about particle properties efficiently from a structure in data describing the interferometric signal in a frequency-space transformation thereof. A structure may comprise any one or more of: a slope, gradient or inclination of a lobe in data describing the interferometric signal in a frequency-space transformation thereof. The structure may be an elongated distribution of data across the dimensions of the transform space, e.g. along a trend line or locus of points along which data is closely distributed or correlated in such a way as to define a structure (e.g., a locus, or principal component, or vector, or cluster, etc.) possessing a longitudinal axis, trend line or locus along which a direction or an orientation is definable in the dimensions of the transform space. A locus of points may comprise e.g., a line, curve or other figure formed by all the points satisfying a particular relation or correlation between coordinates. The bathing of the monitored region with laser light may comprise illuminating the monitored region continuously (e.g., with a continuous wave (CW) laser beam or beams) throughout a monitoring time period or interval, or may comprise illuminating the monitored region intermittently or periodically (e.g., with a succession of laser light pulses) throughout a monitoring time period or interval.

Desirably, in any aspect of the invention, the data describing the interferometric signal in a frequency-space transformation thereof describes a wavelet scalogram of the interferometric signal. Desirably, in any aspect of the invention, the data describing the interferometric signal in a frequency-space transformation thereof describes a Fourier spectrogram of the interferometric signal.

Preferably, in any aspect of the invention, the processing module is configured to determine a property of the particulate material within the monitored region according to a continuous change in the frequency of said waveform. The non-constant frequency may be expressed as a difference in frequency as between different parts of (e.g., different time intervals within) the waveform, such that the waveform frequency may be substantially constant during at least one finite time interval within the waveform, but may either possess one or more different substantially constant frequencies during at one or more respective other finite time intervals within the waveform or may possess a continuously changing frequency during at one or more respective other finite time intervals within the waveform.

Desirably, in any aspect of the invention, the waveform within at least a part of the interferometric signal comprises a chirped waveform. A chirped waveform may possess a continuously changing frequency during at one or more respective finite time intervals within the waveform, or throughout substantially the entire duration of the waveform. The continuous change may comprise a continuous increase or a continuous decrease in the frequency of the waveform, or a mixture of both during different respective intervals of time within the waveform. It has been found that the frequency of the waveform and the manner in which the frequency changes, contains useful information about properties of a detected item of particulate material. The use of laser light within the monitored region possessing wavefronts having different directions at different respective locations within the monitored region greatly assists in obtaining this information.

Preferably, in any aspect of the invention, the optical assembly is configured to bathe the monitored region with laser light of the interferometer possessing a wavefronts having different directions at different respective locations within the monitored region. In this way, the inventors have realised that by providing optical wavefronts propagating/directed in different relative directions one is able to glean more information about particle properties efficiently. The bathing of the monitored region with laser light may comprise illuminating the monitored region continuously (e.g., with a continuous wave (CW) laser beam or beams) throughout a monitoring time period or interval, or may comprise illuminating the monitored region intermittently or periodically (e.g., with a succession of laser light pulses) throughout a monitoring time period or interval.

The property of the particulate material may, in any aspect of the invention, comprise a property of the path thereof within the monitored region. The direction of the particulate material may comprise an angle subtended between a path of the particulate material and a longitudinal axis of a laser beam of said laser light from the laser cavity assembly. The direction of the particle may comprise an orientation of a two-dimensional velocity vector, or an orientation of a three-dimensional velocity vector describing a velocity of the particulate material in two dimensions of space or in three dimensions of space.

The property of the path may comprise a distance to said particulate material relative from the interferometer. The property of the path may comprise a speed of said particulate material relative to the interferometer. The property of the path may comprise a direction of said particulate material relative to the interferometer.

Desirably, in any aspect of the invention, the processing module is configured to determine a size and/or a size distribution of said particulate material within the region of space. The processing module may be configured to determine a radius of a particle of the particulate material according to a sum of the squared moduli of coefficients of a frequency-space transform of the interferometric signal (e.g., a wavelet transform). The sum of the squared moduli of coefficients may be divided by the value of the duration of the interferometric signal thereby providing a time-normalised sum. The processing module may be configured to determine a radius of a particle of the particulate material according to a ratio of the moduli of two coefficients of a wavelet transform of the interferometric signal in which the two coefficients correspond to different respective mother wavelets. Preferably, the coefficients of the ratio correspond to the same time scaling factor of the respective wavelet transform. Preferably, the coefficients of the ratio correspond to the same time positioning factor of the respective wavelet transform. The processing module may be configured to determine a radius of a particle of the particulate material according to a value of a slope, gradient or inclination of a structure in data describing the interferometric signal in a frequency-space transformation thereof. The structure may be an elongated distribution of data across the dimensions of the transform space, e.g. along a trend line or locus of points along which data is closely distributed or correlated in such a way as to define a structure (e.g., a locus, or principal component, or vector, or cluster, etc.) possessing a longitudinal axis, trend line or locus along which a direction or an orientation is definable in the dimensions of the transform space. A locus of points may comprise e.g., a line, curve or other figure formed by all the points satisfying a particular relation or correlation between coordinates.

Preferably, in any aspect of the invention, the processing module is configured to determine a concentration of said particulate material within the region of space.

The interferometric signal generated by the interferometer and acquired by the laser monitoring unit may, in any aspect of the invention, comprise a voltage waveform signal at least a part of which continuously changes in frequency and corresponds to a voltage across the electrical drive terminals of a laser cavity of the laser cavity assembly.

The interferometric signal generated by the interferometer and acquired by the laser monitoring unit may, in any aspect of the invention, comprise an optical output power signal at least a part of which continuously changes in frequency and corresponds to an optical output power of a laser cavity of the laser cavity assembly.

The optical assembly may, in any aspect of the invention, be configured to bathe the monitored region with a static divergent and/or convergent beam of said laser light possessing a curved wavefront in which the monitored region comprises regions other than the focal region of said laser light. The optical assembly may be configured to bathe the monitored region with a laser beam possessing an angle of divergence (or convergence) not less than 5 degrees, or preferably not less than 10 degrees, or preferably not less than 15 degrees, or preferably not less than 20 degrees, or preferably not less than 25 degrees, or preferably not less than 30 degrees. The optical assembly may be configured to bathe the monitored region with a laser beam possessing an angle of divergence (or convergence) not greater than 50 degrees, or preferably not greater than 45 degrees, or preferably not greater than 40 degrees.

The processing module may be configured, in any aspect of the invention, to determine an angle of divergence of the laser beam. The angle of divergence may be calculated based on the values of different frequencies within the interferometric signal generated by the interferometer (e.g., a starting frequency at the beginning of the waveform and an ending frequency at the end of the waveform). The processing module may be configured to fit a mathematical expression describing the waveform to the waveform of the interferometric signal generated by the interferometer thereby to determine a property of the particulate path (e.g., an orientation relative to a beam axis) and/or a property of the laser beam (e.g., a beam divergence angle).

The processing module may be configured, in any aspect of the invention, to determine the values of different time points within the interferometric signal generated by the interferometer representing any one or more of: a starting time at the beginning of the waveform; an ending time at the end of the waveform; a tangential time within the waveform when particulate material reached a point on a path through the laser light corresponding to a tangent to a local wavefront of the laser light. The processing module may be configured to determine the values of a time difference between two different time points within the interferometric signal generated by the interferometer, the time points representing any two of: a starting time at the beginning of the waveform; an ending time at the end of the waveform; a tangential time within the waveform when particulate material reached a point on a path through the laser light corresponding to a tangent to a local wavefront of the laser light. The processing module may be configured to re-scale a said time difference between two different time points within the interferometric signal by rescaling the time coordinates of the data describing the structure wherein the rescaling is according to a calculated distance of a particle from the laser cavity assembly. This permits data extending over first time difference associated with a first particle at a first distance from the laser cavity assembly to be accurately compared to data extending over a second time difference associated with a second particle at a second (different) distance from the laser cavity assembly.

The processing module may, in any aspect of the invention, be configured to identify a time point within the waveform at which the frequency of the waveform vanishes as being a tangential time within the waveform when particulate material reached a point on a path through the laser light corresponding to a tangent to a local wavefront of the laser light. The processing module may be configured to determine the values of different time points based on these properties of the structure of data describing a distribution of data in a frequency transform space (e.g., in a spectrogram or scalogram). The processing module may be configured to determine properties of the particulate material using the values of different time points so determined, and/or using differences between them.

The optical assembly may, in any aspect of the invention, be configured to bathe the monitored region with a beam of said laser light possessing a substantially flat wavefront moved across the monitored region to a plurality of different directions. The beam may scanned through a pre-set range of angular directions as a continuously moving beam thereby directing the wavefronts of the beam in different directions over each scan. Alternatively, or in addition, the beam may directed successively, for a given finite duration of time (e.g., a dwell time) in each one of a succession of different static angular directions selected from a pre-set range of angular directions thereby directing the wavefronts of the beam in different directions during each finite duration of time.

The laser cavity assembly may, in any aspect of the invention, be configured to output a laser beam in each of two or more different directions, wherein the processing module is configured to determine two or three mutually orthogonal components of a velocity of particulate material through the monitored region according to said changes in the frequency of a waveform within at least a part of the interferometric signals generated respectively by the laser cavity assembly when in each of the two or more different directions, and/or according to the number of wave cycles within the respective waveforms. The mutually orthogonal components of a velocity of the particulate material may be defined according to a plurality of respective angles subtended between a path of the particulate material and a longitudinal axis of a laser beam directed in a respective one of the two or more different directions.

The laser cavity assembly may, in any aspect of the invention, be configured to output two or more laser beams comprising different respective cross-sectional beam shapes and/or different beam directions. A cross-sectional shape of a laser beam may be substantially circular, or non-circular, or substantially elliptical. A non-circular cross-sectional beam shape may be generated by the use of astigmatic optics within the optical assembly of the respective self-mixing interferometer. A cross-sectional shape of each laser beam may be substantially elliptical. The major axis of the elliptical cross-section of one such laser beam may be oblique to (e.g., substantially perpendicular to, or other angle) major axis of the elliptical cross-section of another such laser beam.

The two or more laser beams may, in any aspect of the invention, be configured to overlap within the monitored region to define an overlap region. The processing module may be configured to determine a property of the particulate material within the overlap region in response to light returned to the laser cavity assembly concurrently from said wavefronts of said two or more laser beams.

The processing module may, in any aspect of the invention, be configured to determine a property of the particulate material within the monitored region according to differences in the respective cross-sectional beam shapes. A difference in said respective cross-sectional beam shapes may comprise a difference in beam angular divergence of respective laser beams (e.g., as viewed in a given plane).

In a further aspect, the invention may provide a portable electronic device comprising the self-mixing interferometer as described above. For example, the portable electronic device may comprise an air purification device. An air purification device may be any apparatus configured to purify or clean air by any means, such as any means readily available to the skilled person. For example, such a device may be configured to remove contaminants from the air in an environment (e.g., a room, etc.) to improve air quality in domestic, medical, industrial, or commercial areas and industries. Air purification may be performed by methods known in the art, such as (for example but without limitation):

- by air filter purification whereby air is forced through a filter and particles are physically captured by the filter, or
- by polarized-media electronic air cleaning which applies a voltage to establish the polarizing electric field for filtering particulate material, or
- by ionisation purification methods whereby electrically charged air or gas ions are generated to attach to airborne particles which are then electrostatically attracted to a charged collector plate.

Of course, other air purification methods and means are readily available to the skilled person. The self-mixing interferometer according to any aspect of the present invention may be used alone, or used within or conjunction with an air purification device, in order to determine properties or airborne particulate matter which may be used as parameters to determine any desired or appropriate measure of air purity or air quality. For example, the self-mixing interferometer may be configured within or upon the portable electronic device to monitor or detect one or more of: a concentration of particulate matter; a size and/or size distribution of particulate matter; a speed or velocity of particulate matter; a position or distance of particulate matter; direction of motion of particular matter. The self-mixing interferometer, or a portable electronic device, may be configured to use any one or more of these detected quantities as parameters in a determination, calculation or estimation of any desired or appropriate measure, quantification or definition of air purity or air quality. An appropriate measure, quantification or definition of air purity or air quality may include, for example (but without limitation): a concentration value (e.g., number of particles per unit volume); a number of particles within a monitored region (e.g., during a pre-set time interval); a presence (or absence) within a monitored region of particulate material having a size (e.g., radius) above or below a pre-set threshold value or within (or outside) a pre-set range of sizes; rate of motion (e.g., speed) of particulate material within a monitored region.

The air purification device may comprise a self-mixing interferometer disposed at any one of: an air inlet of the air purification device for receiving air to be subject to a purification process; an air outlet of the air purification device for outputting air that has been subject to a purification process; an internal surface of the air purification device other than an at an air input or an air output, for monitoring air while it is being subjected to a purification process; an external surface of the air purification device other than an at an air input or an air output, for monitoring ambient air. In this way, the self-mixing interferometer may be employed to monitor not only the purity of ambient air, but also to monitor the efficacy of an air purification process (e.g., to control the operation, e.g., use and duration of use, of the air purification device accordingly).

The self-mixing interferometer may be comprised within a non-portable air purification unit (e.g., for mounting to a wall, to a ceiling or a floor-standing device e.g., weighing more than, e.g., 20 kg) such as for commercial or domestic areas and uses, or within a non-fixed moveable air purification unit (e.g., weighing less than, e.g., 20 kg, or less than 10 kg in weight).

In a yet further aspect, the invention may provide a wearable electronic device comprising the portable electronic device described above. In this way, the self-mixing interferometer may be employed by individuals to monitor the purity or quality of ambient air in their immediate environment, which may change as the user moves from place to place, or as time passes in one place. Thus, the self-mixing interferometer may be comprised within or upon a portable unit (e.g., weighing less than, e.g., 5 kg, or less than 1 kg, or less than 0.5 kg, or less than 0.25 kg, or less than 0.1 kg in weight). Examples include a wrist-mounted electronic device, a smartphone device, a tablet device, a laptop computer device, or a bespoke air quality monitoring device. The portable unit may comprise parts (e.g., one or more straps, clips etc.) configured for attaching or mounting the portable unit upon the body of a person, or upon/within clothing. This permits ease of use such as for personal and individual uses.

In a fourth aspect, the invention may provide a method for monitoring particulate material within a monitored region of space using self-mixing interferometry comprising providing an interferometer comprising a laser cavity assembly and an optical assembly and bathing the monitored region with laser light of the interferometer. The method comprises acquiring an interferometric signal generated by the interferometer in response to light returned to the laser cavity assembly from said wavefronts by said particulate material. The method also comprises, by a processing module, determining a property of the particulate material within the monitored region according to a structure in data describing the interferometric signal in a frequency-space transformation thereof wherein at least a part of the interferometric signal comprises a waveform of changing frequency.

The waveform within at least a part of the interferometric signal may, in any aspect of the invention, comprise a chirped waveform.

The data describing the interferometric signal in a frequency-space transformation thereof preferably, in any aspect of the invention, describes a wavelet scalogram of the interferometric signal.

The method, in any aspect of the invention, may comprise, by the processing module, determining a property of the particulate material within the monitored region according to a continuous change in the frequency of said waveform.

The method, in any aspect of the invention, may comprise, by the optical assembly, bathing the monitored region with laser light of the interferometer possessing a wavefronts having different directions at different respective locations within the monitored region.

The property of the particulate material may, in any aspect of the invention, comprise a property of the path thereof within the monitored region. The property of the path may comprise a distance to said particulate material relative from the interferometer. The property of the path may comprise a speed of said particulate material relative to the interferometer. The property of the path may comprise a direction of said particulate material relative to the interferometer.

The method, in any aspect of the invention, may comprise, by the processing module, determining a size and/or a size distribution of said particulate material within the region of space.

The method, in any aspect of the invention, may comprise, by the processing module, determining a concentration of said particulate material within the region of space.

The interferometric signal may, in any aspect of the invention, comprise a voltage waveform signal at least a part of which continuously changes in frequency and corresponds to a voltage across the electrical drive terminals of a laser cavity of the laser cavity assembly.

The interferometric signal may, in any aspect of the invention, comprise an optical output power signal at least a part of which continuously changes in frequency and corresponds to an optical output power of a laser cavity of the laser cavity assembly.

The method, in any aspect of the invention, may comprise, by the optical assembly, bathing the monitored region with a static divergent and/or convergent beam of said laser light possessing a curved wavefront in which the monitored region comprises regions other than the focal region of said laser light.

The method, in any aspect of the invention, may comprise, by the optical assembly, bathing the monitored region with a beam of said laser light possessing a substantially flat wavefront moved across the monitored region to a plurality of different directions.

The method, in any aspect of the invention, may comprise, by the laser cavity assembly, outputting a laser beam in each of two or more different directions, and by the processing module, determining two or three mutually orthogonal components of a velocity of particulate material through the monitored region according to said changes in the frequency of a waveform within at least a part of the interferometric signals generated respectively by the laser cavity assembly when in each of the two or more different directions, and/or according to the number of wave cycles within the respective waveforms. The mutually orthogonal components of a velocity of the particulate material may be defined according to a plurality of respective angles subtended between a path of the particulate material and a longitudinal axis of a laser beam directed in a respective one of the two or more different directions.

The method, in any aspect of the invention, may comprise, by the laser cavity assembly, outputting two or more laser beams comprising different respective cross-sectional beam shapes and/or different beam directions.

The method, in any aspect of the invention, may comprise, by the laser cavity assembly, directing the two or more laser beams to overlap within the monitored region to define an overlap region and, by the processing module, determining a property of the particulate material within the overlap region in response to light returned to the laser cavity assembly concurrently from said wavefronts of said two or more laser beams.

The method, in any aspect of the invention, may comprise, by the processing module, determining a property of the particulate material within the monitored region according to differences in said respective cross-sectional beam shapes.

In a fifth aspect, the invention may provide a self-mixing interferometer configured to monitor particulate material within a monitored region of space comprising a laser cavity assembly and an optical assembly configured to bathe the monitored region with laser light of the interferometer. The self-mixing interferometer comprises a laser monitoring unit configured to acquire an interferometric signal generated by the interferometer in response to light returned to the laser cavity assembly from said wavefronts by said particulate material. The self-mixing interferometer also comprises a processing module configured to determine a property of the particulate material within the monitored region according to a wavelet transformation of the interferometric signal at least a part of which comprises a waveform of changing frequency.

In this way, the inventors have realised that if at least a part of the interferometric signal comprises a waveform of changing frequency one is able to glean more information about particle properties efficiently from a wavelet transform of the interferometric signal. The bathing of the monitored region with laser light may comprise illuminating the monitored region continuously (e.g., with a continuous wave (CW) laser beam or beams) throughout a monitoring time period or interval, or may comprise illuminating the monitored region intermittently or periodically (e.g., with a succession of laser light pulses) throughout a monitoring time period or interval.

The processing module, in any aspect of the invention, is preferably configured to determine a property of the particulate material within the monitored region according to a continuous change in the frequency of said waveform. The non-constant frequency may be expressed as a difference in frequency as between different parts of (e.g., different time intervals within) the waveform, such that the waveform frequency may be substantially constant during at least one finite time interval within the waveform, but may either possess one or more different substantially constant frequencies during at one or more respective other finite time intervals within the waveform or may possess a continuously changing frequency during at one or more respective other finite time intervals within the waveform.

The waveform within at least a part of the interferometric signal may comprise a chirped waveform. A chirped waveform may possess a continuously changing frequency during at one or more respective finite time intervals within the waveform, or throughout substantially the entire duration of the waveform. The continuous change may comprise a continuous increase or a continuous decrease in the frequency of the waveform, or a mixture of both during different respective intervals of time within the waveform. It has been found that the frequency of the waveform and the manner in which the frequency changes, contains useful information about properties of a detected item of particulate material. The use of laser light within the monitored region possessing wavefronts having different directions at different respective locations within the monitored region greatly assists in obtaining this information.

The optical assembly, in any aspect of the invention, may be configured to bathe the monitored region with laser light of the interferometer possessing a wavefronts having different directions at different respective locations within the monitored region. Accordingly, the interferometer may generate light possessing wavefronts having different propagation directions such that particles interacting with the different directions of propagation, whilst being bathed by the light, cause returned light that mixes with native light in the resonator cavity of the interferometer cause an interferometric signal waveform having a non-constant frequency.

The property of the particulate material may, in any aspect of the invention, comprise a property of the path thereof within the monitored region, and/or may comprise a distance to said particulate material relative from the interferometer.

The property of the path may, in any aspect of the invention, comprise a speed of said particulate material relative to the interferometer, and/or may comprise a direction of said particulate material relative to the interferometer. The speed of the particulate material may comprise a magnitude of a two-dimensional velocity vector, or a magnitude of a three-dimensional velocity vector describing a velocity of the particulate material in two dimensions of space, or in three dimensions of space. The self-mixing interferometer may comprise at least two laser cavity assemblies, or at least three laser cavity assemblies, and an optical assembly (or respective optical assemblies) configured to bathe the monitored region with respective beams of laser light configured to overlap in the monitored region.

The processing module, in any aspect of the invention, is preferably configured to determine a size and/or a size distribution of said particulate material within the region of space. The processing module may be configured to determine a radius of a particle of the particulate material according to a sum of the squared moduli of coefficients of a frequency-space transform of the interferometric signal (e.g., a wavelet transform). The sum of the squared moduli of coefficients may be divided by the value of the duration of the interferometric signal thereby providing a time-normalised sum. The processing module may be configured to determine a radius of a particle of the particulate material according to a ratio of the moduli of two coefficients of a wavelet transform of the interferometric signal in which the two coefficients correspond to different respective mother wavelets. Preferably, the coefficients of the ratio correspond to the same time scaling factor of the respective wavelet transform. Preferably, the coefficients of the ratio correspond to the same time positioning factor of the respective wavelet transform. The processing module may be configured to determine a radius of a particle of the particulate material according to a value of a slope, gradient or inclination of a structure in data describing the interferometric signal in a frequency-space transformation thereof. The structure may be an elongated distribution of data across the dimensions of the transform space, e.g. along a trend line or locus of points along which data is closely distributed or correlated in such a way as to define a structure (e.g., a locus, or principal component, or vector, or cluster, etc.) possessing a longitudinal axis, trend line or locus along which a direction or an orientation is definable in the dimensions of the transform space. A locus of points may comprise e.g., a line, curve or other figure formed by all the points satisfying a particular relation or correlation between coordinates.

The processing module may, in any aspect of the invention, be configured to determine a concentration of said particulate material within the region of space.

The interferometric signal generated by the interferometer and acquired by the laser monitoring unit may, in any aspect of the invention, comprise a voltage waveform signal at least a part of which continuously changes in frequency and corresponds to a voltage across the electrical drive terminals of a laser cavity of the laser cavity assembly.

The interferometric signal generated by the interferometer and acquired by the laser monitoring unit may, in any aspect of the invention, comprise an optical output power signal at least a part of which continuously changes in frequency and corresponds to an optical output power of a laser cavity of the laser cavity assembly.

The optical assembly may, in any aspect of the invention, be configured to bathe the monitored region with a static divergent and/or convergent beam of said laser light possessing a curved wavefront in which the monitored region comprises regions other than the focal region of said laser light. The optical assembly may be configured to bathe the monitored region with a laser beam possessing an angle of divergence (or convergence) not less than 5 degrees, or preferably not less than 10 degrees, or preferably not less than 15 degrees, or preferably not less than 20 degrees, or preferably not less than 25 degrees, or preferably not less than 30 degrees. The optical assembly may be configured to bathe the monitored region with a laser beam possessing an angle of divergence (or convergence) not greater than 50 degrees, or preferably not greater than 45 degrees, or preferably not greater than 40 degrees.

The processing module may be configured, in any aspect of the invention, to determine an angle of divergence of the laser beam. The angle of divergence may be calculated based on the values of different frequencies within the interferometric signal generated by the interferometer (e.g., a starting frequency at the beginning of the waveform and an ending frequency at the end of the waveform). The processing module may be configured to fit a mathematical expression describing the waveform to the waveform of the interferometric signal generated by the interferometer thereby to determine a property of the particulate path (e.g., an orientation relative to a beam axis) and/or a property of the laser beam (e.g., a beam divergence angle).

The processing module may be configured, in any aspect of the invention, to determine the values of different time points within the interferometric signal generated by the interferometer representing any one or more of: a starting time at the beginning of the waveform; an ending time at the end of the waveform; a tangential time within the waveform when particulate material reached a point on a path through the laser light corresponding to a tangent to a local wavefront of the laser light. The processing module may be configured to determine the values of a time difference between two different time points within the interferometric signal generated by the interferometer, the time points representing any two of: a starting time at the beginning of the waveform; an ending time at the end of the waveform; a tangential time within the waveform when particulate material reached a point on a path through the laser light corresponding to a tangent to a local wavefront of the laser light. The processing module may be configured to re-scale a said time difference between two different time points within the interferometric signal by rescaling the time coordinates of the data describing the structure wherein the rescaling is according to a calculated distance of a particle from the laser cavity assembly. This permits data extending over first time difference associated with a first particle at a first distance from the laser cavity assembly to be accurately compared to data extending over a second time difference associated with a second particle at a second (different) distance from the laser cavity assembly.

The processing module may, in any aspect of the invention, be configured to identify a time point within the waveform at which the frequency of the waveform vanishes as being a tangential time within the waveform when particulate material reached a point on a path through the laser light corresponding to a tangent to a local wavefront of the laser light. The processing module may be configured to determine the values of different time points based on these properties of the structure of data describing a distribution of data in a frequency transform space (e.g., in a spectrogram or scalogram). The processing module may be configured to determine properties of the particulate material using the values of different time points so determined, and/or using differences between them. The optical assembly may, in any aspect of the invention, be configured to bathe the monitored region with a beam of said laser light possessing a substantially flat wavefront moved across the monitored region to a plurality of different directions. The beam may scanned through a pre-set range of angular directions as a continuously moving beam thereby directing the wavefronts of the beam in different directions over each scan. Alternatively, or in addition, the beam may directed successively, for a given finite duration of time (e.g., a dwell time) in each one of a succession of different static angular directions selected from a pre-set range of angular directions thereby directing the wavefronts of the beam in different directions during each finite duration of time.

The laser cavity assembly may, in any aspect of the invention, be configured to output a laser beam in each of two or more different directions, wherein the processing module is configured to determine two or three mutually orthogonal components of a velocity of particulate material through the monitored region according to said changes in the frequency of a waveform within at least a part of the interferometric signals generated respectively by the laser cavity assembly when in each of the two or more different directions, and/or according to the number of wave cycles within the respective waveforms. The mutually orthogonal components of a velocity of the particulate material may be defined according to a plurality of respective angles subtended between a path of the particulate material and a longitudinal axis of a laser beam directed in a respective one of the two or more different directions.

The laser cavity assembly may, in any aspect of the invention, be configured to output two or more laser beams comprising different respective cross-sectional beam shapes and/or different beam directions. A cross-sectional shape of a laser beam may be substantially circular, or non-circular, or substantially elliptical. A non-circular cross-sectional beam shape may be generated by the use of astigmatic optics within the optical assembly of the respective self-mixing interferometer. A cross-sectional shape of each laser beam may be substantially elliptical. The major axis of the elliptical cross-section of one such laser beam may be oblique to (e.g., substantially perpendicular to, or other angle) major axis of the elliptical cross-section of another such laser beam.

The two or more laser beams may, in any aspect of the invention, be configured to overlap within the monitored region to define an overlap region. The processing module may be configured to determine a property of the particulate material within the overlap region in response to light returned to the laser cavity assembly concurrently from said wavefronts of said two or more laser beams.

The processing module may, in any aspect of the invention, be configured to determine a property of the particulate material within the monitored region according to differences in the respective cross-sectional beam shapes. A difference in said respective cross-sectional beam shapes may comprise a difference in beam angular divergence of respective laser beams (e.g., as viewed in a given plane).

In an additional aspect, the invention may provide a portable electronic device comprising the self-mixing interferometer described above. For example, the portable electronic device may comprise an air purification device. An air purification device may be any apparatus configured to purify or clean air by any means, such as any means readily available to the skilled person. For example, such a device may be configured to remove contaminants from the air in an environment (e.g., a room, etc.) to improve air quality in domestic, medical, industrial, or commercial areas and industries. Air purification may be performed by methods known in the art, such as (for example but without limitation):

- by air filter purification whereby air is forced through a filter and particles are physically captured by the filter, or
- by polarized-media electronic air cleaning which applies a voltage to establish the polarizing electric field for filtering particulate material, or
- by ionisation purification methods whereby electrically charged air or gas ions are generated to attach to airborne particles which are then electrostatically attracted to a charged collector plate.

Of course, other air purification methods and means are readily available to the skilled person. The self-mixing interferometer according to any aspect of the present invention may be used alone, or used within or conjunction with an air purification device, in order to determine properties or airborne particulate matter which may be used as parameters to determine any desired or appropriate measure of air purity or air quality. For example, the self-mixing interferometer may be configured within or upon the portable electronic device to monitor or detect one or more of: a concentration of particulate matter; a size and/or size distribution of particulate matter; a speed or velocity of particulate matter; a position or distance of particulate matter; direction of motion of particular matter. The self-mixing interferometer, or a portable electronic device, may be configured to use any one or more of these detected quantities as parameters in a determination, calculation or estimation of any desired or appropriate measure, quantification or definition of air purity or air quality. An appropriate measure, quantification or definition of air purity or air quality may include, for example (but without limitation): a concentration value (e.g., number of particles per unit volume); a number of particles within a monitored region (e.g., during a pre-set time interval); a presence (or absence) within a monitored region of particulate material having a size (e.g., radius) above or below a pre-set threshold value or within (or outside) a pre-set range of sizes; rate of motion (e.g., speed) of particulate material within a monitored region.

The air purification device may comprise a self-mixing interferometer disposed at any one of: an air inlet of the air purification device for receiving air to be subject to a purification process; an air outlet of the air purification device for outputting air that has been subject to a purification process; an internal surface of the air purification device other than an at an air input or an air output, for monitoring air while it is being subjected to a purification process; an external surface of the air purification device other than an at an air input or an air output, for monitoring ambient air. In this way, the self-mixing interferometer may be employed to monitor not only the purity of ambient air, but also to monitor the efficacy of an air purification process (e.g., to control the operation, e.g., use and duration of use, of the air purification device accordingly).

The self-mixing interferometer may be comprised within a non-portable air purification unit (e.g., for mounting to a wall, to a ceiling or a floor-standing device e.g., weighing more than, e.g., 20 kg) such as for commercial or domestic areas and uses, or within a non-fixed moveable air purification unit (e.g., weighing less than, e.g., 20 kg, or less than 10 kg in weight).

In a yet further aspect, the invention may provide a wearable electronic device comprising the portable electronic device described above. In this way, the self-mixing interferometer may be employed by individuals to monitor the purity or quality of ambient air in their immediate environment, which may change as the user moves from place to place, or as time passes in one place. Thus, the self-mixing interferometer may be comprised within or upon a portable unit (e.g., weighing less than, e.g., 5 kg, or less than 1 kg, or less than 0.5 kg, or less than 0.25 kg, or less than 0.1 kg in weight). Examples include a wrist-mounted electronic device, a smartphone device, a tablet device, a laptop computer device, or a bespoke air quality monitoring device. The portable unit may comprise parts (e.g., one or more straps, clips etc.) configured for attaching or mounting the portable unit upon the body of a person, or upon/within clothing. This permits ease of use such as for personal and individual uses.

In a sixth aspect, the invention may provide a method for monitoring particulate material within a monitored region of space using self-mixing interferometry comprising providing an interferometer comprising a laser cavity assembly and an optical assembly and bathing the monitored region with laser light of the interferometer. The method comprises acquiring an interferometric signal generated by the interferometer in response to light returned to the laser cavity assembly from said wavefronts by said particulate material. The method also comprises, by a processing module, determining a property of the particulate material within the monitored region according to a wavelet transformation of the interferometric signal at least a part of which comprises a waveform of changing frequency.

The method, in any aspect of the invention, may comprise, by the processing module, determining a property of the particulate material within the monitored region according to a continuous change in the frequency of said waveform. The waveform within at least a part of the interferometric signal may comprise a chirped waveform.

The method, in any aspect of the invention, may comprise, by the optical assembly, bathing the monitored region with laser light of the interferometer possessing a wavefronts having different directions at different respective locations within the monitored region.

The property of the particulate material may, in any aspect of the invention, comprise a property of the path thereof within the monitored region, and/or may comprise a distance to said particulate material relative from the interferometer.

The property of the path may, in any aspect of the invention, comprise a speed of said particulate material relative to the interferometer, and/or may comprise a direction of said particulate material relative to the interferometer.

The method may, in any aspect of the invention, comprise, by the processing module, determining a size and/or a size distribution of said particulate material within the region of space.

The method may, in any aspect of the invention, comprise, by the processing module, determining a concentration of said particulate material within the region of space.

The interferometric signal may, in any aspect of the invention, comprise a voltage waveform signal at least a part of which continuously changes in frequency and corresponds to a voltage across the electrical drive terminals of a laser cavity of the laser cavity assembly.

The interferometric signal may, in any aspect of the invention, comprise an optical output power signal at least a part of which continuously changes in frequency and corresponds to an optical output power of a laser cavity of the laser cavity assembly.

The method, in any aspect of the invention, may comprise, by the optical assembly, bathing the monitored region with a static divergent and/or convergent beam of said laser light possessing a curved wavefront in which the monitored region comprises regions other than the focal region of said laser light.

The method, in any aspect of the invention, may comprise, by the optical assembly, bathing the monitored region with a beam of said laser light possessing a substantially flat wavefront moved across the monitored region to a plurality of different directions.

The method, in any aspect of the invention, may comprise, by the laser cavity assembly, outputting a laser beam in each of two or more different directions, and by the processing module, determining two or three mutually orthogonal components of a velocity of particulate material through the monitored region according to said changes in the frequency of a waveform within at least a part of the interferometric signals generated respectively by the laser cavity assembly when in each of the two or more different directions and/or according to the number of wave cycles within the respective waveforms. The mutually orthogonal components of a velocity of the particulate material may be defined according to a plurality of respective angles subtended between a path of the particulate material and a longitudinal axis of a laser beam directed in a respective one of the two or more different directions.

The method, in any aspect of the invention, may comprise, by the laser cavity assembly, outputting two or more laser beams comprising different respective cross-sectional beam shapes and/or different beam directions.

The method, in any aspect of the invention, may comprise, by the laser cavity assembly, directing the two or more laser beams to overlap within the monitored region to define an overlap region and, by the processing module, determining a property of the particulate material within the overlap region in response to light returned to the laser cavity assembly concurrently from said wavefronts of said two or more laser beams.

The method, in any aspect of the invention, may comprise, by the processing module, determining a property of the particulate material within the monitored region according to differences in said respective cross-sectional beam shapes.

SUMMARY OF THE FIGURES

Embodiments and experiments illustrating the principles of the invention will now be discussed with reference to the accompanying figures in which:

FIGS. 11A-11H show examples of a spectrogram or scalogram for self-mixing interferometric signals.

FIG. 12A shows a schematic representations of a self-mixing interferometer.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 2A:
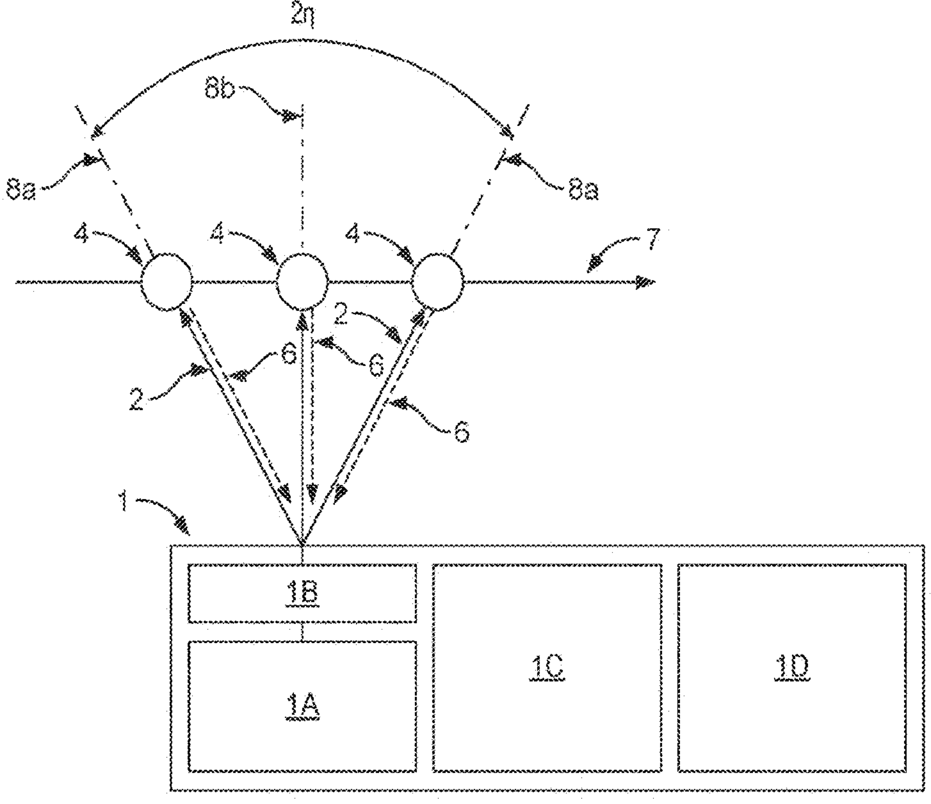
FIGS. 2A-2D each show a schematic representations of a self-mixing interferometer.

FIG. 2A schematically illustrates a self-mixing interferometer device 1 for detecting particulate material, according to an embodiment of the invention.

The device is configured to monitor particulate material 4 within a monitored region of space. It comprises a laser cavity assembly 1A and an optical assembly 1B configured to bathe the monitored region with laser light 2 of the interferometer possessing wavefronts having different directions at different respective locations within the monitored region. The self-mixing interferometer includes a laser monitoring unit 1C configured to acquire an interferometric signal generated by the interferometer in response to light returned to the laser cavity assembly 1A from the wavefronts by the particulate material. The self-mixing interferometer also includes a processing module 1D configured to determine a property of the particulate material within the monitored region according to changes in the frequency of a waveform within at least a part of the interferometric signal.

In the example shown, the particulate matter 4 is represented as a spherical particle and is shown in each one of three successive positions along the path 7 of the particle within the laser beam 2. Each one of the three successive positions corresponding to a respective one of three successive times on the motion of the particle 4 along its path. The laser beam, in this example, comprises a conically diverging laser beam possessing conical beam edges 8*a* and a central beam axis 8*b*. The angular divergence of the conical laser beam is 2$\eta$ degrees in full, this corresponding to a divergence such that each conical beam edge 8*a* subtends an angle $\eta$ relative to the central axis 8*b* of the laser beam.

Figures 1A, 1B:
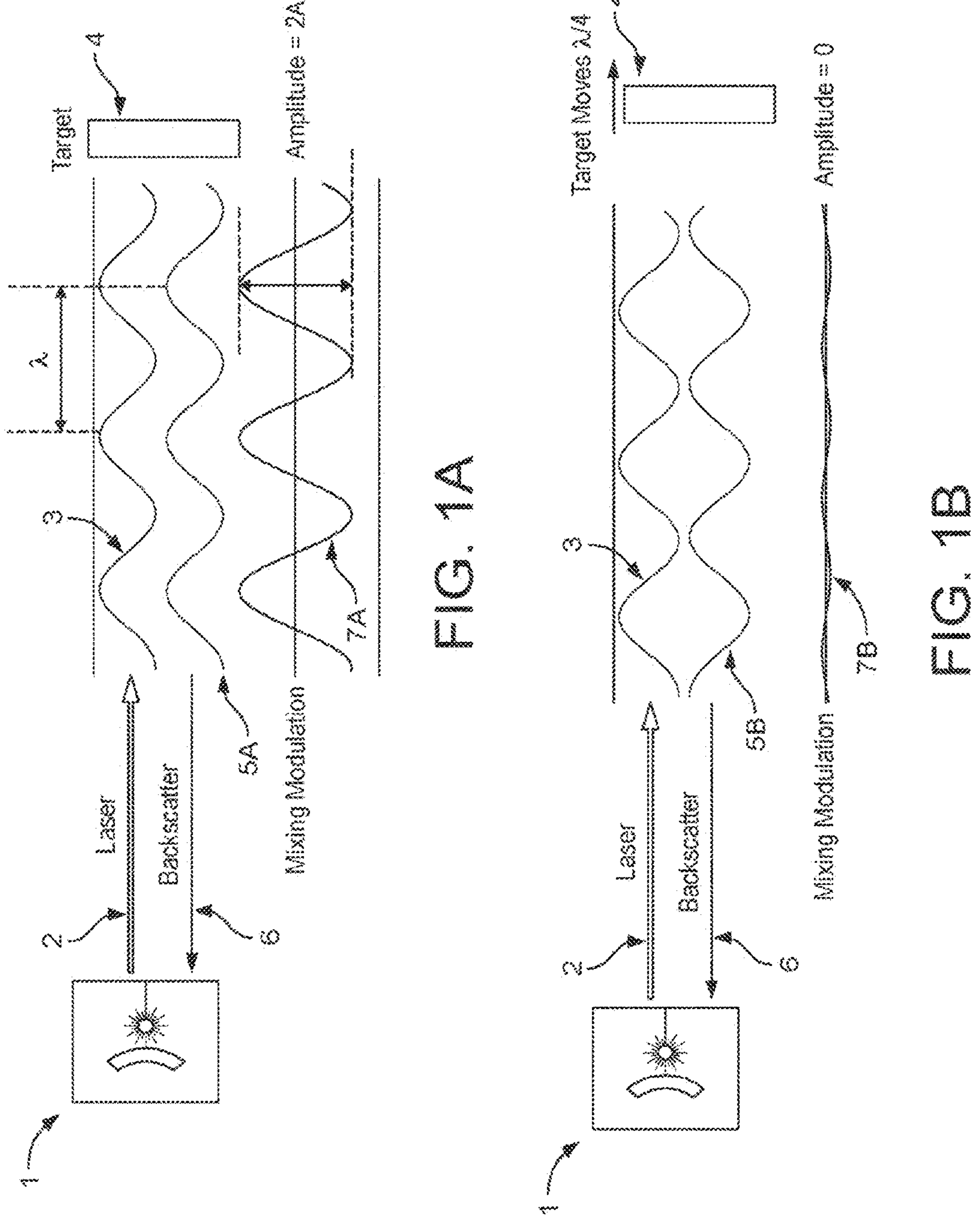
FIGS. 1A and 1B show schematic representations of a self-mixing interferometer.
Figure 1C:
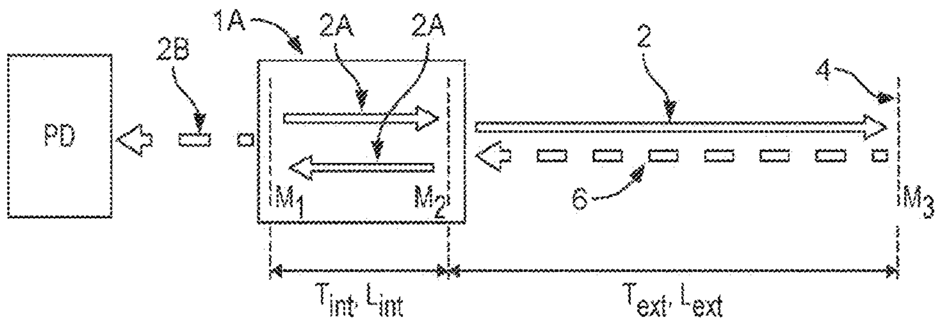
FIG. 1C shows a schematic representation of a self-mixing interferometer.

At the point in time when particle 4 had entered the conical laser beam (8*a* right hand side, FIG. 2A), and a surface part, or facet, of the particle has become parallel to an advancing wavefront of the laser beam as shown, at that point in time a portion 6 of the laser beam incident upon that surface part or facet is back-reflected and/or back-scattered to the optical resonator cavity 1A of the device 1. As a result of this, and in response to the light 6 returned to the laser cavity assembly 1A from these wavefronts by the particulate material, a self-mixing interferometric signal is generated by the optical resonator cavity 1A, as described above. The laser monitoring unit 1C acquires this interferometric signal. The laser monitoring unit may be a photodiode (e.g., PD of FIG. 1C) configured to generate an electrical signal in response to an optical output from the back mirror (e.g., $M_1$ of FIG. 1C) of the laser resonator cavity 1A, as discussed above. The laser monitoring unit may be a voltage monitor configured to generate an electrical signal in response to the voltage across electrical drive terminals of the laser resonator cavity 1A, as discussed above.

The self-mixing interferometer also includes a processing module 1D configured to determine a property of the particulate material within the monitored region according to changes in the frequency of a waveform within at least a part of the interferometric signal. The laser monitoring unit 1C is configured to output the acquired interferometric signal to the processing module 1D for processing thereby, to determine a property of the particulate material. The nature of tis processing will be explained in detail below.

However, while the embodiment shown in FIG. 2A employs an optical assembly 1B configured to bathe the monitored region with laser light 2 of the interferometer possessing wavefronts having different directions at different respective locations within the monitored region, this is not the only way in which to configure the laser light for bathing the monitored region.

For example, the self-mixing interferometer described in any embodiment herein may be comprised within or upon a portable electronic device (not shown). The self-mixing interferometer may be comprised within a non-portable unit (not shown) for mounting to a wall, to a ceiling or a floor-standing device such as an air purification device for commercial or domestic areas and uses, or within a non-fixed moveable air purification unit, or within a portable or wearable electronic device. Examples of portable or wearable devices include a wrist-mounted electronic device, a smartphone device, a tablet computer device, a laptop computer device, or a bespoke air quality monitoring device.

In particular, FIG. 2B, FIG. 2C, FIG. 2D and FIG. 4 show alternative arrangements consistent with aspects of the invention. The schematic diagram of FIG. 2B corresponds to the arrangement shown in FIG. 2A. Here it can be seen that the optical assembly is configured to structure the laser beam such that it possesses curved wavefronts 10. The optical path length between the optical resonator cavity 1A and any point on a wavefront 10 is constant. This means that any spacing Δ, in a direction perpendicular to a given wavefront 10, between a point on that wavefront and a position of the particle at a particular instant of time along its part 7 through the laser beam, is equivalent to an optical path difference between light at the optical wavefront and light having reached the particle and about to be reflected from it back to the laser resonator cavity. Because the speed of light is so very much greater than the speed of the particle, the position of a given wavefront 10 when the particle enters the laser beam may be used as a reference wavefront with which to determine how the value of the spacing, Δ, changes as the particle progresses along its path. In other words, a wavefront corresponding to a particular phase of the electromagnetic wave of the laser light can be considered to be always present at the position of the reference wavefront.

Figures 2B, 2C, 2D:
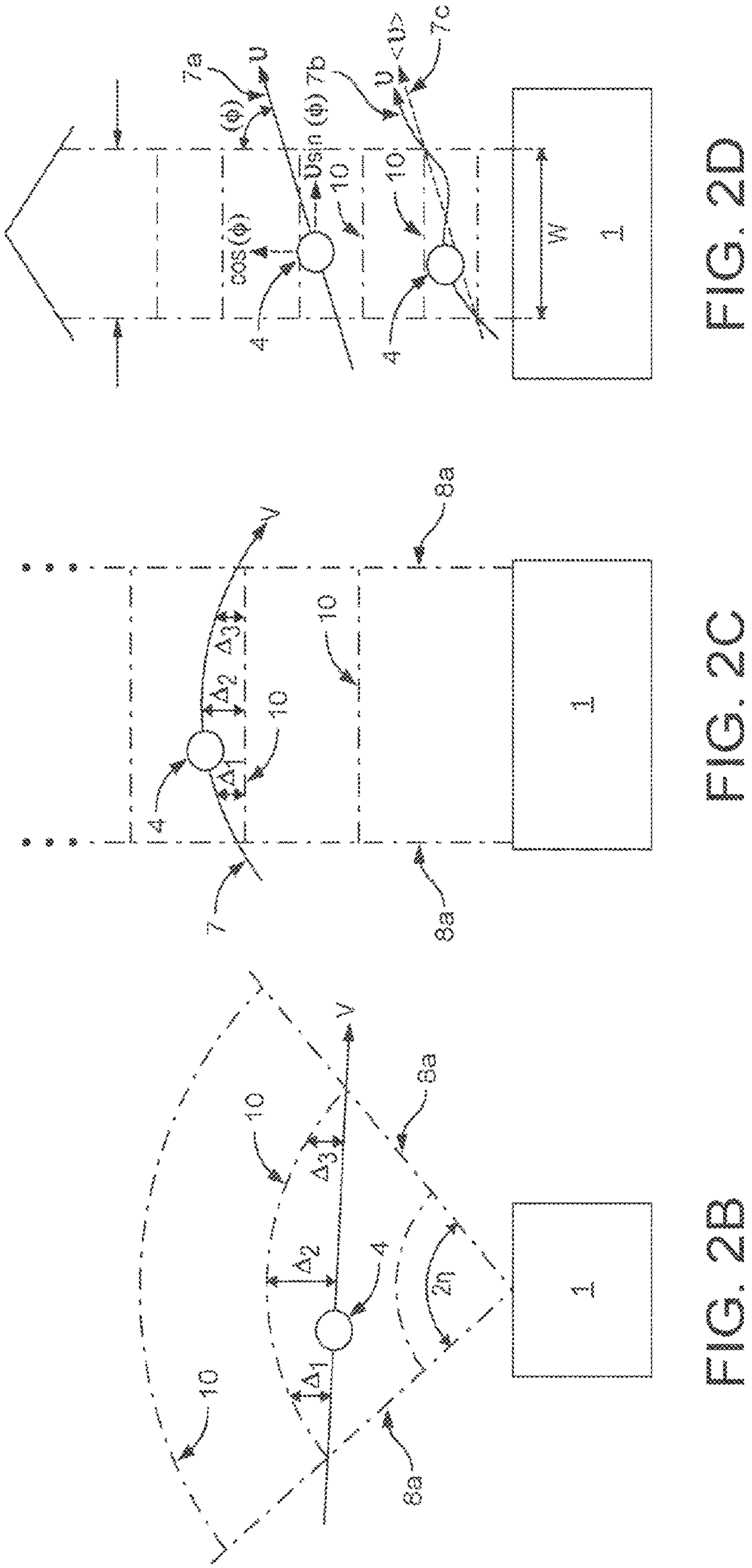

As shown in FIG. 2B, the value of the spacing, Δ, changes continuously ($\Delta \rightarrow \Delta_1 \rightarrow \Delta_2 \rightarrow \Delta_3$ . . . etc.) as the linear path of the particle 7 first coincides with a reference wavefront upon entering the laser beam, then moves further away from the reference wavefront as the particle approaches the central axis of the laser beam, due to the outward curvature of the reference wavefront. Subsequently, the linear path of the particle 7 moves towards the reference wavefront as the particle moves away from the central axis of the laser beam until it finally coincides with the reference wavefront upon exiting the laser beam.

As shown in FIG. 2C, it can be seen that the optical assembly is configured to structure the laser beam such that it possesses substantially flat wavefronts 10, corresponding to a collimated laser beam. However, the path 7 of the particle through the laser beam is non-linear. In the example shown the path of the particle is curved with a substantially constant curvature. It can be seen that the value of the spacing, Δ, between the path of the particle and a reference wavefront changes not because of any curvature of the reference wavefront—there is none—but because of a curvature of the path of the particle. The spacing, Δ, changes continuously ($\Delta \rightarrow \Delta_1 \rightarrow \Delta_2 \rightarrow \Delta_3$ . . . etc.) as the curved path 7 of the particle first coincides with a flat reference wavefront upon entering the laser beam, then moves further away from the flat reference wavefront as the particle approaches the centre of the laser beam, due to the outward curvature of the particle path 7. Subsequently, the curved path 7 of the particle moves towards the flat reference wavefront as the particle moves away from the centre of the laser beam until it finally coincides with the flat reference wavefront upon exiting the laser beam. The curvature of the path 7 of the particle may be cause, for example a non-linear flow of gas (e.g., by turbulence within the gas), such as air, through which the particle moves.

FIG. 2D shows a schematic example of the use of a laser possessing flat wavefronts (e.g., a collimated laser beam) as in FIG. 2C, but in which the path 7*a* of the particle is linear. The spacing, Δ, between the linear path 7*a* of the particle and a flat reference wavefront once more changes continuously as the linear path 7*a* of the particle progresses through the laser beam. The apparently linear path 7*a* of the particle may be not simply linear, but instead may be a path 7*b* that fluctuates around an average linear path 7*c*. This may occur, for example, if the particle is within a highly turbulent gas (e.g., air) and/or if the particle is sufficiently small (e.g., a pollen particle) that its path 7*b* is significantly buffeted or deviated by gas molecules in the manner of a Brownian motion or the like. In this case, the average speed, (v), of the particle, along its average linear path 7*c*, may be estimated as being the ratio of the linear distance between the points of entry into, and exit from, the laser beam at sides 8*a* of the beam, and the time interval between these events. The spacing, Δ, between the non-linear path 7*b* of the particle and a reference flat wavefront once more changes continuously as the non-linear path 7*b* of the particle progresses through the laser beam.

In the examples shown in FIG. 2C and FIG. 2D, the interferometer device 1 possesses an optical assembly 1B configured to bathe the monitored region with laser light of the interferometer possessing wavefronts having the same directions (i.e., substantially flat wavefronts) at different respective locations within the monitored region. In addition, in the examples shown in FIG. 2B, FIG. 2C and FIG. 2D (path 7*b*), the spacing, Δ, between the path (7, 7*b*) of the particle and a reference wavefront changes continuously and non-linearly over time as the particle progresses through the laser beam. As will be discussed below, the inventors have realised that a consequence of this is that the frequency of a waveform in the interferometric signal of the self-mixing interferometer 1 is caused to change over time in at least a part of the interferometric signal, often appearing in the form of a 'chirp' or the like, in some part of the signal, sometimes in much of the signal, and sometimes in substantially all of the signal depending upon circumstances.

The inventors have realised that, in some aspects of the invention, this changing frequency of waveform in the interferometric signal can be used to provide information about properties of the particle causing the signal.

Figure 4:
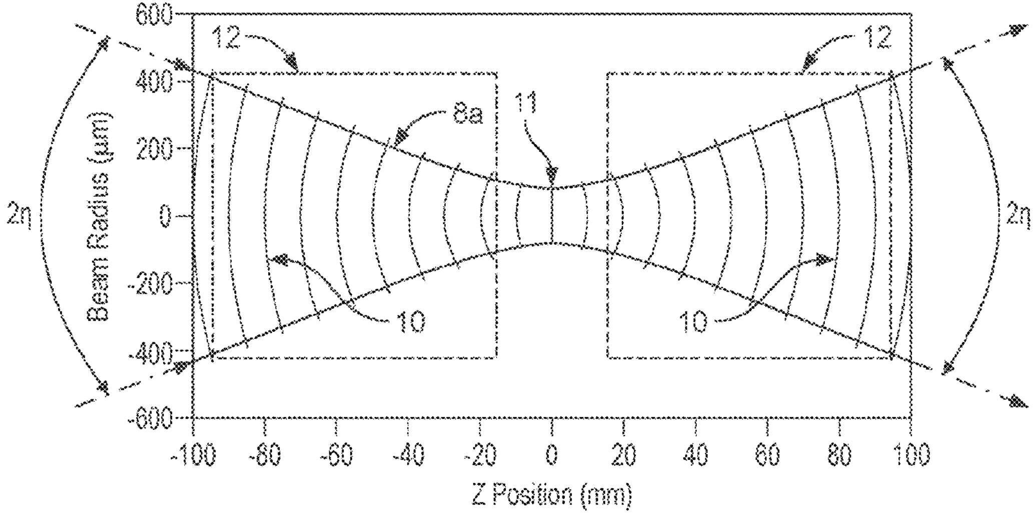
FIG. 4 shows a schematic representations of curved wavefronts of a laser beam at either side of a focal region of the beam.

In addition, the inventors have also realised that, in some aspects of the invention, by providing an optical assembly configured to bathe the monitored region with laser light of the interferometer possessing wavefronts having different directions at different respective locations within the monitored region, one may use wavefront geometry to provide information about properties of the particle causing the signal. This configuration has the effect of significantly increasing the likelihood that a changing frequency of waveform in the interferometric signal will be observed. This configuration also has the effect of significantly increasing the volume of the region of space the that can be monitored by the self-mixing interferometer 1. As shown in FIG. 4, the laser beam may be configured to converge, with beam converging edges 8*a* towards a focal region 11 at some desired distance within the monitored region beyond the self-mixing interferometer 1, and to subsequently, naturally, diverge at distances beyond the focal region 11. In both the converging region and the diverging region, the laser beam possesses curved wavefronts having different directions at different respective locations within the monitored region 12, either side of the focal region 11. Notably, the focal region 11 of the laser beam, by virtue of being a laser beam focus, has a flat wavefront.

Figure 3:
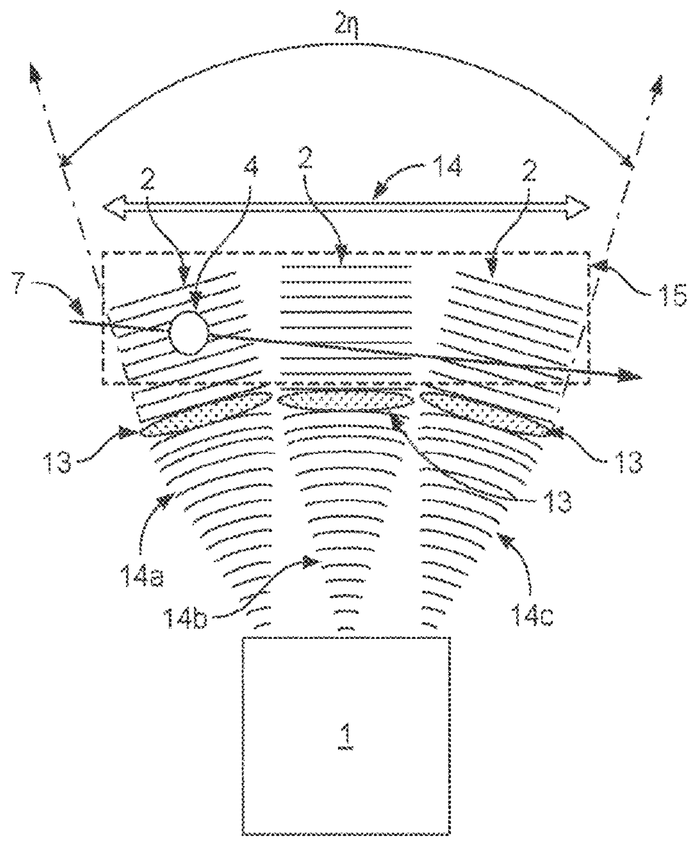
FIG. 3 shows a schematic representations of a self-mixing interferometer.

FIG. 3 schematically illustrates a further alternative arrangement for the self-mixing interferometer device 1 for detecting particulate material, according to an embodiment of the invention. The device is configured to monitor particulate material 4 within a monitored diverging region 15 of space of angular range 2η. In this embodiment, the optical assembly 1B shown in FIG. 2A is configured to bathe the monitored region with laser light 2 of one collimated laser beam possessing flat wavefronts having different directions at different respective locations within the monitored region. The collimated laser beam is moved through a range 14 of different angular positions (e.g., 14*a* to 14*b* to 14*c* etc.) through the monitored region thereby to move the substantially flat wavefronts through a range of different directions across the monitored region. The range 14 of different angular positions spans, for example, an angular range 2η. In other words, the angular divergence of the range of different angular positions of the collimated laser beam is 2η degrees in full. This corresponds to a divergence such that the two extreme angular positions of the beam (14*a*, 14*c*) subtend an angle η relative to the central angular position 14*b* of the laser beam. This angular movement of the laser beam may be achieved by a corresponding angular movement of the optical axis of collimating optics of the optical assembly 1B configured to form a collimated laser beam from laser light received thereby from the laser resonator cavity. In the example shown schematically in FIG. 3, the collimating optics comprises an angularly moveable collimating lens 13, however other collimating optics may be used, such as an angularly moveable mirror (not shown) arranged to receive a collimated laser beam from a static collimating lens, and to reflect the received collimated beam through the range of different angular positions.

FIG. 4A schematically illustrates a sequence of steps performed by the self-mixing interferometer 1 to determine a property of the particulate material 4 within the monitored region. This method corresponds to those aspects of the invention in which the monitored region is bathed with laser light of the interferometer possessing wavefronts having different directions at different respective locations within the monitored region, and in which the property of the particulate material is determined according to changes in the frequency of a waveform within at least a part of the interferometric signal. The method comprises the following steps:

Step S1A: By the laser resonator cavity 1A and optical assembly 1B of the interferometer 1, bathing the monitored region with laser light of the interferometer possessing wavefronts having different directions at different respective locations within the monitored region.

Step S2A: By the monitoring unit 1C, acquiring an interferometric signal generated by the laser resonator cavity 1A of the interferometer 1 in response to light returned to the laser cavity assembly from wavefronts of the laser beam by the particulate material 4.

Step S3A: By a processing module 1C, receiving the acquired interferometric signal from the monitoring unit 1C and therewith determining a property of the particulate material 4 within the monitored region according to changes in the frequency of a waveform within at least a part of the interferometric signal.

The self-mixing interferometer 1 may be configured to implement this method in, for example but without limitation to, any one of the arrangements schematically illustrated in FIG. 2A, FIG. 2B, FIG. 4 or FIG. 3. As will be discussed in more detail below, this methodology promotes the appearance of a waveform within at least a part of the interferometric signal that changes in frequency. The inventors have found that these changes may be used to determine properties of the particle within the laser beam.

FIG. 4B schematically illustrates a sequence of steps performed by the self-mixing interferometer 1 to determine a property of the particulate material 4 within the monitored region. This method corresponds to those aspects of the invention in which at least a part of the interferometric signal comprises a waveform of changing frequency. This may occur either because the monitored region is bathed with laser light of the interferometer possessing wavefronts having different directions at different respective locations within the monitored region, or because the particulate material follows a path having different directions at different respective locations within the monitored region. In either case, a property of the particulate material is determined according to a structure in data describing the interferometric signal in a frequency-space transformation thereof wherein at least a part of the interferometric signal comprises a waveform of changing frequency. The method comprises the following steps:

Step S1B: By the laser resonator cavity 1A and optical assembly 1B of the interferometer 1, bathing the monitored region with laser light of the interferometer.

Step S2B: By the monitoring unit 1C, acquiring an interferometric signal generated by the laser resonator cavity 1A of the interferometer 1 in response to light returned to the laser cavity assembly from wavefronts of the laser beam by the particulate material 4.

Step S3B: By a processing module 1C, receiving the acquired interferometric signal from the monitoring unit 1C and therewith determining a property of the particulate material within the monitored region according to a structure in data describing the interferometric signal in a frequency-space transformation thereof wherein at least a part of the interferometric signal comprises a waveform of changing frequency.

The self-mixing interferometer 1 may be configured to implement this method in, for example but without limitation to, any one of the arrangements schematically illustrated in FIG. 2A, FIG. 2B, FIG. 2C, FIG. 4 or FIG. 3. As will be discussed in more detail below, this methodology is particularly sympathetic to, or complements, the appearance of a waveform within at least a part of the interferometric signal that changes in frequency. The inventors have found that these changes may create structure in data describing the interferometric signal in a frequency-space transformation, and this structure may be used to determine properties of the particle within the laser beam.

FIG. 4C schematically illustrates a sequence of steps performed by the self-mixing interferometer 1 to determine a property of the particulate material 4 within the monitored region. This method corresponds to those aspects of the invention in which at least a part of the interferometric signal comprises a waveform of changing frequency. This may occur either because the monitored region is bathed with laser light of the interferometer possessing wavefronts having different directions at different respective locations within the monitored region, or because the particulate material follows a path having different directions at different respective locations within the monitored region. In either case, a property of the particulate material is determined according to a wavelet transformation of the interferometric signal at least a part of which comprises a waveform of changing frequency. The method comprises the following steps:

Step S1C: By the laser resonator cavity 1A and optical assembly 1B of the interferometer 1, bathing the monitored region with laser light of the interferometer.

Step S2C: By the monitoring unit 1C, acquiring an interferometric signal generated by the laser resonator cavity 1A of the interferometer 1 in response to light returned to the laser cavity assembly from wavefronts of the laser beam by the particulate material 4.

Step S3C: By a processing module 1C, receiving the acquired interferometric signal from the monitoring unit 1C and therewith determining a property of the particulate material within the monitored region according to a wavelet transformation of the interferometric signal at least a part of which comprises a waveform of changing frequency.

The self-mixing interferometer 1 may be configured to implement this method in, for example but without limitation to, any one of the arrangements schematically illustrated in FIG. 2A, FIG. 2B, FIG. 2C, FIG. 2D, FIG. 4 or FIG. 3. As will be discussed in more detail below, this methodology is particularly sympathetic to, or complements, the appearance of a waveform within at least a part of the interferometric signal that changes in frequency. The inventors have found that a wavelet transformation of the interferometric signal is surprisingly effective at accurately and efficiently representing genuine changes in the frequency of the interferometric signal as opposed to misrepresenting noise within the signal as a genuine part of the signal. The inventors have found that a wavelet transformation of the interferometric signal can achieve these benefits and improvement to an extent that other frequency transformations cannot. By using a wavelet transformation of the interferometric signal, the inventors have realised that information may be obtained with which to determine properties of the particle within the laser beam.

Examples of the application of these general principles, as exemplified by the methodologies defined in FIG. 5A, FIG. 5B and FIG. 5C, will be explained in more detail below. In aspects of the invention, the processing module of the self-mixing interferometer may be configured to determine a property of particulate material, e.g., as disclosed herein.

Figure 5A:
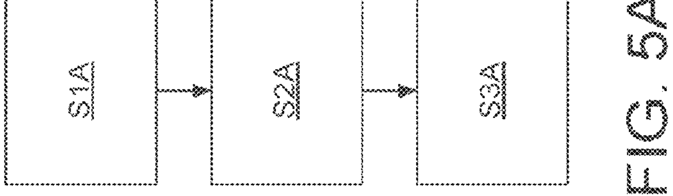
FIGS. 5A-5C show steps in a method implemented by a self-mixing interferometer.
Figure 5B:
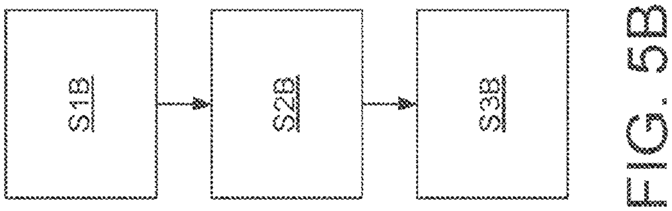
Figure 5C:
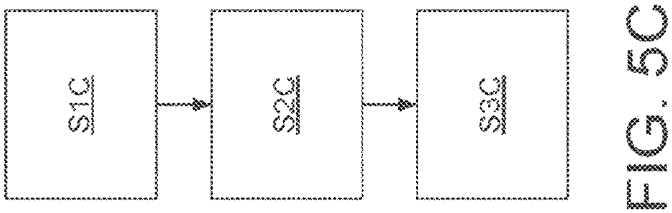

As a first example, consider the methodology of FIG. 5C as applied to the circumstances illustrated schematically in FIG. 2D. Here, the optical assembly 1B of the self-mixing interferometer 1 is configured to provide a collimated laser beam 8*a* possessing substantially flat wavefronts 10. Consider a particle 4 passing through the laser beam along a non-linear path 7*b* within the laser beam which fluctuates around a "time-averaged path" 7*c* which is linear and corresponds to average linear velocity $\langle v \rangle$ of the particle 4. In this sense, the time-averaged path is equivalent to a notional linear particle path 7*a* of the particle 4 with a notional linear velocity $v=\langle v \rangle$. This notional linear velocity has a direction subtending an angle $\phi$ relative to the axis of the laser beam. Both the subtended angle $\phi$ and the notional linear velocity $\langle v \rangle$ may be determined as follows.

The angular frequency, $\omega_s$, of the interferometric signal corresponds to the rate of change of the accumulated phase $\phi_s$ within the light wave of the laser light (6, FIG. 2A) re-injected into the optical cavity 1A of the laser by reflection or back-scattering from the particle 4. Noting that a change dos in the accumulated phase $\varphi_s$ arises because of a change dl in the difference between the position of the particle 4 and a reference wavefront of the laser beam (as discussed in detail above), we may write:

$$\omega_s = \left(\frac{d\varphi_s}{dt}\right) = \frac{4\pi}{\lambda}\frac{dl}{dt} = \frac{4\pi\langle v\rangle}{\lambda}\cos\phi$$

Given that the duration $\Delta T$ of the transit of the particle 4 across the laser beam of width W is:

$$\Delta T = \frac{W}{v\sin\phi}$$

One may combine these two equations to yield:

$$\phi = \tan^{-1}\left[\frac{4\pi W}{\lambda\omega_s\Delta T}\right]$$

$$\langle v\rangle = \frac{1}{\Delta T}\sqrt{\frac{W\lambda}{4\pi\left(1+\left[\frac{4\pi W}{\lambda\omega_s\Delta T}\right]\right)^2}}$$

The quantities W and $\lambda$ are properties of the laser system and are known. The quantities $\Delta T$ and $\omega_s$ may be accurately estimated by applying a wavelet transformation to the interferometric signal. FIG. 10 shows a schematic example of a wavelet scalogram representation of a wavelet transform applied to the interferometric signal, having axes for time, t, signal frequency (i.e., wavelet scale), $\omega_s$, and wavelet coefficient value. The wavelet coefficient value corresponds to a dimension perpendicular to the plane of the figure. The scalogram shows the results of applying a wavelet transformation to three separate interferometric signals. A first interferometric signal was dominated by waveform having an average angular frequency, $\langle\omega_s\rangle=\omega_1$, which is the lowest amongst the three signals and a duration which is the greatest amongst the three signals. This corresponds to a slowest average particle speed (NB. $\omega_s\propto\langle v\rangle$) amongst the three particles. A third interferometric signal was dominated by waveform having an average angular frequency, $\langle\omega_s\rangle=\omega_3$, which is the highest amongst the three signals and a duration which is the lowest amongst the three signals. This corresponds to a fastest average particle speed amongst the three particles. A second interferometric signal was dominated by waveform having an average angular frequency, $\langle\omega_s\rangle=\omega_2$, which is intermediate amongst the three signals and a duration, $\Delta T_2$, which is intermediate amongst the three signals. This corresponds to an intermediate average particle speed amongst the three particles. Because of the fluctuating direction of the path (7*b*, FIG. 2D) of the particle 4, the frequency of the interferometric signal will also fluctuate. This means that the frequency value, $w_s$, of data points within the scalogram for any one particle path will fluctuate around the average value, $\langle\omega_s\rangle$, of the interferometric signal frequency in the form of a scatter of data. The inventors have found that the wavelet transformation is able to model these fluctuations in signal frequency and this results in a surprisingly robust representation of data within the scalogram which is much less susceptible to data scatter due to signal noise being misrepresented as a signal frequency fluctuation. This means that a more accurate determination of an average angular frequency, $\langle\omega_s\rangle$ and a signal duration, $\Delta T$, can be determined from the data. Consequently, more accurate values of the properties of the particle, such as average speed $\langle v\rangle$, and average path orientation $\phi$ across the beam, may be determined. The advantages of a wavelet transformation may also be applied, if desired, similarly to the methodologies describe above with reference to FIG. 5A and/or FIG. 5B.

Figure 6B:
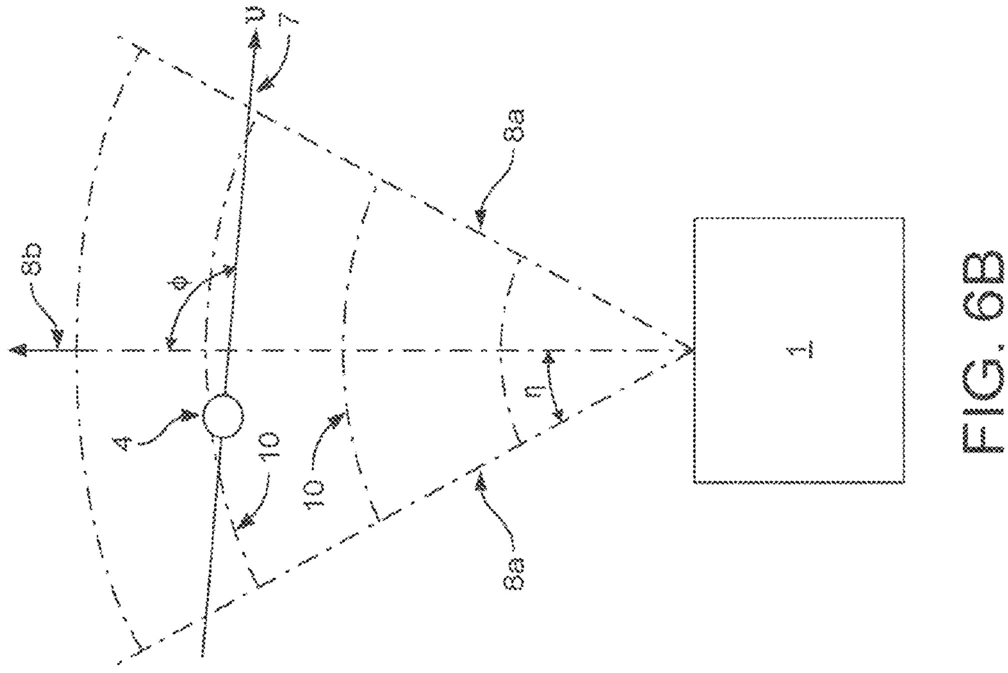
FIGS. 6A-6B show schematic representations of a self-mixing interferometer.

As a second example, consider the methodology of FIG. 5A as applied to the circumstances illustrated schematically in FIG. 2A, FIG. 2B, FIG. 4 or FIG. 3. In aspects of the invention, the processing module of the self-mixing interferometer may be configured to determine a property of particulate material, e.g., as disclosed herein. Here, the optical assembly 1B of the self-mixing interferometer 1 is configured to provide a laser beam 8*a* possessing wavefronts 10 having different directions at different respective locations within the monitored region. As an example, consider a diverging cone of laser light as illustrated schematically in FIG. 6A and in FIG. 6B. This is presented in order to illustrate principles of certain aspects of the invention, but the principles discussed below apply equally to a laser beam with flat wavefronts moved to different directions at different parts of a monitored region, such as in FIG. 3.

Figure 6A:
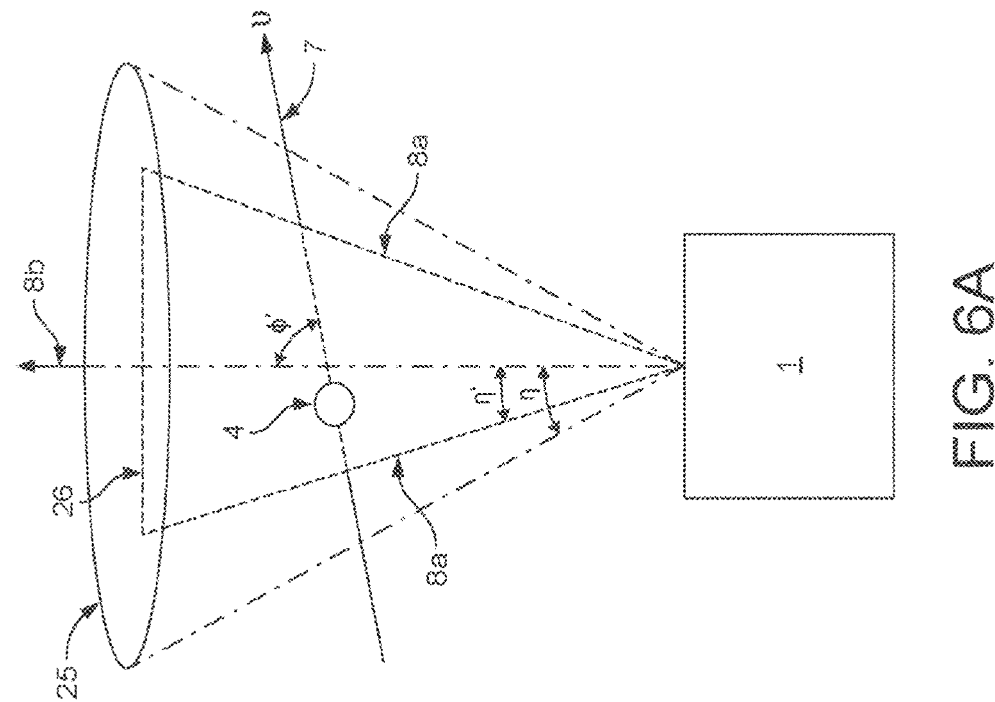

FIG. 6A shows a diverging cone 25 of laser light emanating from the self-mixing interferometer 1. The cone of light is centred upon a cone axis 8*b*. The angle of divergence of the laser beam relative to the cone axis is η. Consider a particle 4 following a linear path (or a "time-averaged" linear path) 7 passing through the cone of laser light at speed v (or average speed (v)) the direction of which subtends an angle ϕ relative to the cone axis 8*b*. FIG. 6A shows a generalised situation in which the path 7 of the particle 4 does not necessarily reside in a plane also containing the central cone axis 8*b* of the laser beam. For example, the particle path 7 may be offset from, but parallel to, a plane containing the central cone axis 8*b*. In this way, the path 7 of the particle 4 may reside within the plane of a triangular slice 26 of the light cone onto which the cone axis 8*b* projects to define the axis of symmetry of the triangular slice 26. The divergence of the triangular slice relative to the projected axis is η'≤η. The direction of the path of the particle subtends an angle ϕ'=ϕ relative to the projected cone axis 8*b*. Though the following discussion applies equally to the more general situation shown in FIG. 6A, the following analysis will consider the simpler situation schematically illustrated in FIG. 6B in which the path 7 of the particle 4 resides in the plane also containing the central cone axis 8*b* of the laser beam.

Figures 7A, 7B:
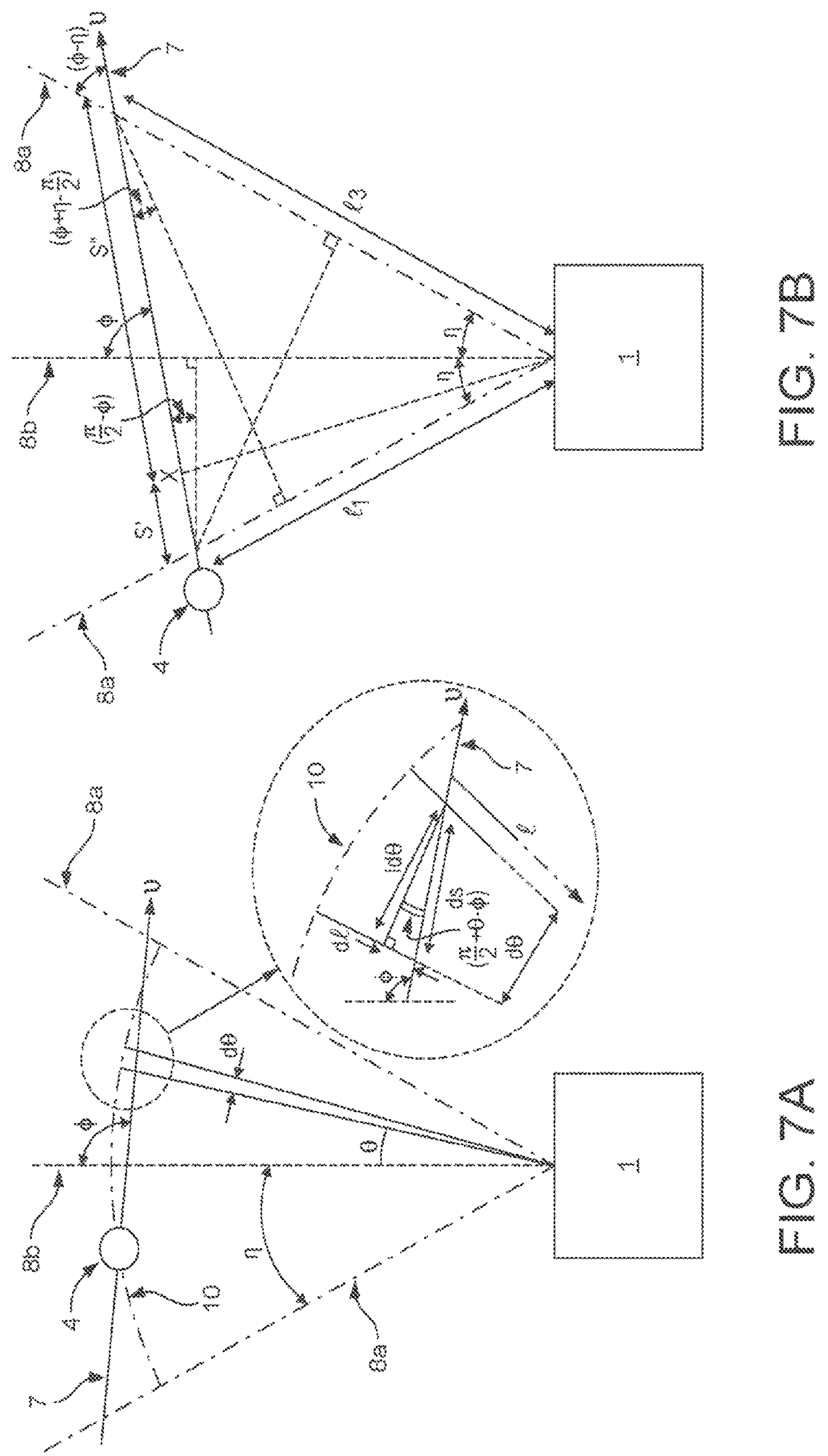
FIGS. 7A-7B show schematic representations of a self-mixing interferometer.

Referring to FIG. 7B one can see that the following relations exist in relation to a change dl in the distance between the particle 4 and a reference wavefront 10 of the laser beam (8*a*, 8*b*), measured in a direction perpendicular to the reference wavefront, as determined from two different points on the path 7 of the particle 4 separated by a linear distance ds.

$$\frac{dl}{ds} = \sin\left(\frac{\pi}{2} + \theta - \phi\right);\ \frac{1}{l}\frac{dl}{ds} = \cos\left(\frac{\pi}{2} + \theta - \phi\right);$$

$$\frac{1}{l}\frac{dl}{d\theta} = \tan\left(\frac{\pi}{2} + \theta - \phi\right);\ v = \frac{ds}{dt}$$

Given that the speed of the particle 4 is v, one may write:

$$ds = vdt$$

$$\frac{dl}{ds} = \frac{1}{v}\frac{dl}{dt} = \sin\left(\frac{\pi}{2} + \theta - \phi\right)$$

$$\frac{dl}{dt} = v\sin\left(\frac{\pi}{2} + \theta - \phi\right)$$

Referring to FIG. 7B, the following relations exist between the geometry of the conical laser beam of divergence angle η, the angle ϕ subtended by the path 7 of the particle relative to the central axis 8*b* of the conical laser beam, the times $t_1$ and $t_3$ of entering and exiting, respectively, the conical laser beam, the intermediate time $t_2$ of reaching a tangential position ("X") at which the part of 7 of the particle is instantaneously parallel to the reference wavefront such that the rate of change dl/dt of the distance between the particle 4 and a reference wavefront 10 of the laser beam momentarily vanishes:

$$\frac{s'}{s} = \left[\frac{t_2 - t_1}{t_3 - t_1}\right] = \frac{\sin\left(\phi + \eta - \frac{\pi}{2}\right)\sin(\phi - \eta)}{\sin(2\eta)}$$

Here, s' is the part of the path 7 of the particle 4 extending between the point of entry of the particle into the conical laser beam, when at a distance $l_1$ from the laser resonator cavity 1A, and the tangential position. The quantity s", illustrated in FIG. 7B, is the part of the path 7 of the particle 4 extending between the point of exit of the particle from the conical laser beam, when at a distance 13 from the laser resonator cavity 1A, and the tangential position. Consequently, the quantity s is the full linear path length of the particle within the conical laser beam, such that:

$$s = s' + s''$$

One can see that:

$$\frac{l_3}{l_1} = \frac{\cos\left(\phi + \eta - \frac{\pi}{2}\right)}{\sin(\phi - \eta)}$$

More generally, for a given instant in time, t, we may identify the angular position of the particle, relative to the central beam axis 8*b* as:

$$\theta = \tan^{-1}\left\{\frac{\left[\frac{t_2 - t}{t_2 - t_1}\right]\tan\eta}{1 + \left[1 - \left(\frac{t_2 - t}{t_2 - t_1}\right)\right]\tan\eta\tan(\phi - \pi/2)}\right\}$$

Consequently, we may conclude that the rate of change of the distance between the particle 4 and a reference wavefront 10 of the laser beam (8*a*, 8*b*), measured in a direction perpendicular to the reference wavefront, is:

$$\frac{dl}{dt} = v\sin\left[\tan^{-1}\left\{\frac{\left[\frac{t_2 - t}{t_2 - t_1}\right]\tan\eta}{1 + \left[1 - \left(\frac{t_2 - t}{t_2 - t_1}\right)\right]\tan\eta\tan(\phi - \pi/2)}\right\} - \phi + \frac{\pi}{2}\right]$$

Using the following known trigonometric relation:

$$\sin\left(x + \tan^{-1}(A/B)\right) = \frac{A}{\sqrt{A^2 + B^2}}\cos(x) + \frac{B}{\sqrt{A^2 + B^2}}\sin(x)$$

And defining $$\tan^{-1}(A/B) = \frac{\pi}{2} - \phi$$

Gives $$\frac{A}{B} = \tan\left(\frac{\pi}{2} - \phi\right) = \beta$$

Therefore $$\frac{dl}{dt} = v\sin\left[\tan^{-1}\{\gamma\} + \frac{\pi}{2} - \phi\right] = \frac{v\beta}{\sqrt{1+\beta^2}}\cos\left(\tan^{-1}\{\gamma\}\right) + \frac{v}{\sqrt{1+\beta^2}}\sin\left(\tan^{-1}\{\gamma\}\right)$$

Here $$\gamma = \frac{\left[\frac{t_2 - t}{t_2 - t_1}\right]\tan\eta}{1 + \left[1 - \left(\frac{t_2 - t}{t_2 - t_1}\right)\right]\tan\eta\tan(\phi - \pi/2)}$$

Given the known trigonometric relation:

$$\cos\left(\tan^{-1}\{\gamma\}\right) = \frac{1}{\sqrt{1+\gamma^2}};\ \sin\left(\tan^{-1}\{\gamma\}\right) = \frac{\gamma}{\sqrt{1+\gamma^2}}$$

We may write that:

$$\frac{dl}{dt} = \frac{v\beta}{\sqrt{1+\beta^2}} \cdot \frac{1}{\sqrt{1+\gamma^2}} + \frac{v}{\sqrt{1+\beta^2}} \cdot \frac{\gamma}{\sqrt{1+\gamma^2}} = v\left[\frac{\beta+\gamma}{\sqrt{1+\beta^2}\sqrt{1+\gamma^2}}\right]$$

As discussed above, the response of the laser cavity of the interferometer can be expressed in the following terms:

$$P_{Laser} = A + B\cos\varphi_{FB}$$

$$\varphi_{FB} = \varphi_s + C\sin\left(\varphi_{FB} + \tan^{-1}\alpha\right)$$

$$P_{Laser} = A + B\cos\left[\varphi_s + C\sin\left(\varphi_{FB} + \tan^{-1}\alpha\right)\right]$$

However, when there is only a weak intensity in the light returned to the laser cavity from the particle the coefficient C becomes negligible, and one may write:

$$P_{Laser} \cong A + B\cos\varphi_s$$

We may also define the phase $\varphi_s$ as:

$$\varphi_s = \left(\frac{d\varphi_s}{dt}\right)t + \varphi_0$$

Therefore, the laser interferometric signal becomes:

$$P_{Laser} = A + B\cos\left[\left(\frac{d\varphi_s}{dt}\right)t + \varphi_0\right] = A + B\cos(\omega_s t + \varphi_0)$$

In other words, the rate of change of the phase $\varphi_s$ is equivalent to an instantaneous value of the frequency of the laser interferometric signal:

$$\omega_s = \left(\frac{d\varphi_s}{dt}\right)$$

It can be seen that this frequency, $\omega_s$, is proportional to the speed, v, of the particle, as well as aspects of the geometry, $\eta$, of the laser beam and the orientation, $\phi$, of the path of the particle relative to the axis of the laser beam. Noting again that:

$$\omega_s = \frac{4\pi}{\lambda}\frac{dl}{dt} = \frac{4\pi v}{\lambda}\left[\frac{\beta+\gamma}{\sqrt{1+\beta^2}\sqrt{1+\gamma^2}}\right]$$

we may use the above known trigonometric relation to express the term in square brackets as follows:

$$\frac{\beta+\gamma}{\sqrt{1+\beta^2}\sqrt{1+\gamma^2}} = \sin\left(\phi + \tan^{-1}[1/\gamma]\right)$$

Consequently, the signal frequency may be alternatively express as succinctly as follows:

$$\omega_s = \frac{4\pi v}{\lambda}\sin\left(\phi + \tan^{-1}[1/\gamma]\right)$$

Here:

$$\gamma = \frac{\left[\frac{t_2 - t}{t_2 - t_1}\right]\tan\eta}{1 + \left[1 - \left(\frac{t_2 - t}{t_2 - t_1}\right)\right]\beta\tan\eta};$$

$$\beta = \tan\left(\frac{\pi}{2} - \phi\right)$$

For conciseness, we may write the term $\gamma$ as a simple algebraic function of time, t, as follows:

$$\gamma = \frac{c_1 + c_2 t}{c_3 + c_4 t}$$

In this way, the term $\gamma$ is a simple polynomial function of time. Here, the terms $c_1$, $c_2$, $c_3$ and $c_4$ take the following form:

$$c_1 = t_2;$$

$$c_2 = -1;$$

$$c_3 = \frac{t_2 - t_1}{\tan\eta} + \beta t_1;$$

$$c_4 = -\beta$$

In the situation where the particle crosses the laser beam axis in a direction perpendicular to the axis, then $\phi=\pi/2$ and $\beta=0$, such that $\gamma \to \gamma_\perp = (c_1+c_2 t)/c_3$, and:

$$\omega_s(t) = \frac{4\pi v}{\lambda}\left[\frac{\gamma_\perp}{\sqrt{1+\gamma_\perp^2}}\right];$$

$$\gamma_\perp = \left[\frac{t_2 - t}{t_2 - t_1}\right]\tan\eta$$

In the situation where the particle crosses the laser beam in a direction which forms a tangent to a wavefront of the laser beam at a point in time $t=t_2$ whilst within the laser beam, then at that point $\gamma_\perp=0$, and $\omega_s(t=t_2)=0$.

In the situation where the particle progresses directly along the laser beam axis in a direction parallel to the axis, then $\phi=0$ such that $\gamma=0$, and:

$$\omega_s(t) = \left(\frac{d\varphi_s}{dt}\right) \to \frac{4\pi v}{\lambda}\left[\frac{\beta}{\sqrt{1+\beta^2}}\right] = \frac{4\pi v}{\lambda}\sin\left(\frac{\pi}{2}-\phi\right) = \frac{4\pi v}{\lambda}\cos(\phi) = \frac{4\pi v}{\lambda}$$

Particles crossing the laser beam axis in directions between these two extremes will produce instantaneous values of the frequency of the laser interferometric signal between these two extremes:

$$0 \le \omega_s(t) \le \frac{4\pi v}{\lambda}$$

In the situation where the particle crosses the laser beam axis in a direction which forms a tangent to a wavefront of the laser beam at a point in time $t=t_2$ whilst within the laser beam, then at that point $\gamma=0$, and $0<\phi<\pi$; $\phi\neq\pi/2$:

$$\omega_s(t=t_1) = \frac{4\pi v}{\lambda}\left[\frac{\beta}{\sqrt{1+\beta^2}}\right] = \frac{4\pi v}{\lambda}\sin\left(\frac{\pi}{2}-\phi\right) = \frac{4\pi v}{\lambda}\cos\phi$$

Figures 8A, 8B:
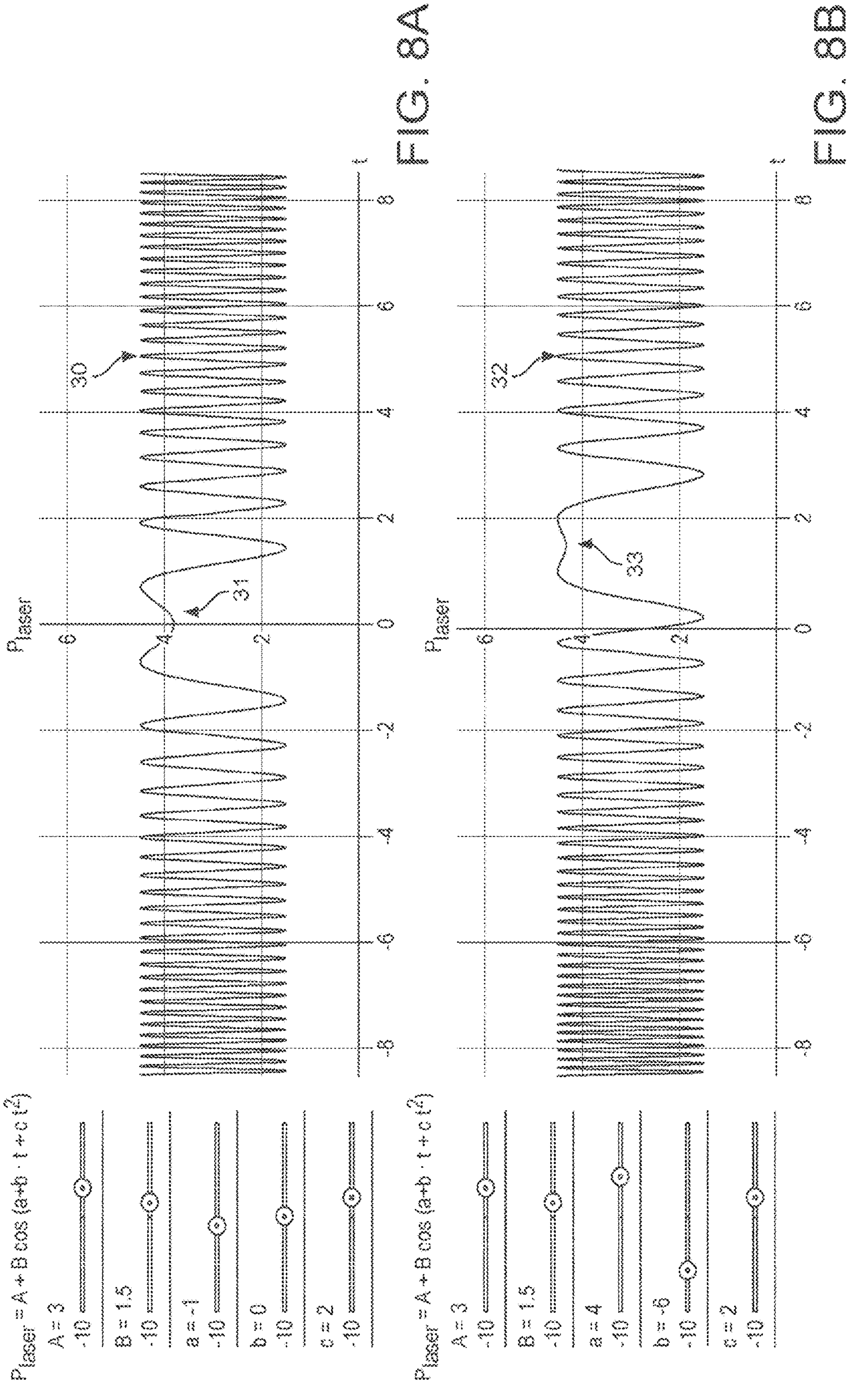
FIGS. 8A-8B show examples of a self-mixing interferometric signal.

FIG. 8A and FIG. 8B show examples of this waveform in the interferometric signal, $P_{Laser}$, of the laser:

$$P_{Laser} = A + B\cos(\omega_s t + \varphi_0)$$

Here, $$\omega_s = \frac{4\pi v}{\lambda}\left[\frac{\beta+\gamma}{\sqrt{1+\beta^2}\sqrt{1+\gamma^2}}\right];$$

$$\gamma = \frac{c_1 + c_2\cdot t}{c_3 + c_4\cdot t} \approx a + b\cdot t + c\cdot t^2$$

In aspects of the invention, the processing module of the self-mixing interferometer may be configured to determine a property of particulate material using an interferometric signal of this form, e.g., as disclosed herein. In this example, we have expanded the term $\gamma$ as a polynomial function of time variable, t, including terms of order no higher than the second order. FIG. 8A shows this waveform in which a=−1, b=0 and c=2. FIG. 8B shows this waveform in which a=1.5, b=−6 and c=2. In both FIG. 8A and FIG. 8B, A=3 and B=1.5. In this way, the value of B represents an amplitude of a modulation of the interferometric signal, $P_{Laser}$, of the laser. The different values of a, b and c represent differences in the terms $c_1$, $c_2$, $c_3$ and $c_4$ defined above which, in turn are determined by the known divergence angle $\eta$ of the laser beam, the measurable times $t_1$, $t_0$ of the entry of the particle into the laser beam and the time at which the tangential position is momentarily achieved, and the angle $\phi$ of the particle path 7 relative to the central axis of the laser beam. As described above, the time at which the tangential position is momentarily achieved corresponds to a moment at which the frequency $\omega_s$ of the interferometric signal, $P_{Laser}$, becomes zero. This is indicated by the turning point 31 of the waveform 30 of FIG. 8A, and by the turning point 32 of the waveform 32 of FIG. 8B. Because the values of a, b and c for FIG. 8B differ from the values of a, b and c for FIG. 8A, then so do the respective positions of the turning points in the associates waveforms (30, 32). Similarly, the frequency each waveform changes continuously, and the frequency of the waveform in FIG. 8B changes more rapidly than does the frequency of the waveform in FIG. 8A.

These differences, and other differences, in the shape and structure of the waveform, are the result of differ from the values of a, b and c which, in turn are the result of differences in the speed v of the particle 4 within the laser beam and the angle $\phi$ its path 7 subtends to the central axis 8*b* of the laser beam. The processing module 1D may be configured to generate an estimate for the speed v of the particle and its path angle $\phi$, by a process of fitting an equation given above for:

$$P_{Laser} = A + B\cos(\omega_s t + \varphi_0)$$

This may be achieved by applying an optimisation routine which varies the values of the speed v of the particle and its path angle $\phi$ within this analytical expression, iteratively in such a way as to minimise a difference, $\Delta P$, between the measured interferometric signal waveform, $$P_{Laser}^M,$$

and the analytical expression for the interferometric signal waveform, $P_{Laser}$, given above:

$$\Delta P = P_{Laser}^M - P_{Laser}$$

Once a sufficiently low value of $\Delta P$ is achieved, the corresponding values of v and $\phi$ required to achieve that condition may be identified as acceptable estimates of the true speed of the particle and its path angle, respectively. In aspects of the invention, the processing module of the self-mixing interferometer may be configured to determine a property of particulate material, e.g., as disclosed herein.

Referring to FIG. 12A, let the velocity vector, $\vec{v}$, of a particle within the laser beam may be estimated to be:

$$\vec{v} = v_x\hat{x} + v_y\hat{y} + v_z\hat{z}$$

Here, the velocity vector is resolved in to three orthogonal velocity components which comprise components directed along a respective one of three orthogonal unit vectors $\hat{x}$, $\hat{y}$, $\hat{z}$. Here, assume that the axis of the laser beam is directed in a first direction $\hat{u}_1$ which is parallel to a plane containing two of three orthogonal unit vectors $\hat{x}$, $\hat{z}$ such that the unit vector $\hat{u}_1$ is defined as:

$$\hat{u}_1 = \sin(\theta_1)\hat{x} + \cos(\theta_1)\hat{z}$$

The angle $\theta_1$ is measured relative to the $\hat{z}$ direction. Next, assume that the axis of the laser beam is moved so as to be directed in a second direction $\hat{u}_2$ which is also parallel to the plane containing these two orthogonal unit vectors $\hat{x}$, $\hat{z}$ such that the unit vector $\hat{u}_2$ is defined as:

$$\hat{u}_2 = \sin(\theta_2)\hat{x} + \cos(\theta_2)\hat{z}$$

Here, the angle $\theta_2$ is also measured relative to the $\hat{z}$ direction. In this way, the first and second directions of the axis of the laser beam subtend an angle $(\theta_2-\theta_1)$.

Next, assume that the axis of the laser beam is moved again so as to be directed in a third direction $\hat{u}_3$ which is not parallel to the plane containing the two orthogonal unit vectors $\hat{x}$, $\hat{z}$ such that the unit vector $\hat{u}_2$ is defined as:

$$\hat{u}_3 = \sin(\theta_3)\hat{x} + \sin(\varepsilon_3)\hat{y} + \cos(\theta_3)\hat{z}$$

Here, the angle $\theta_3$ and the angle $\varepsilon_3$ are both measured relative to the $\hat{z}$ direction in a plane perpendicular to the plane containing the two orthogonal unit vectors $\hat{x}$, $\hat{z}$. Taking the dot product of the particle velocity vector and the three different laser beam axis directions gives the cosine of the angle $\phi_{1,2,3}$ subtended by the particle path 7 and the laser beam axis at these three different beam directions:

$$\vec{v}\cdot\hat{u}_1 = v_x\sin(\theta_1) + v_z\cos(\theta_1) = \cos(\phi_1)$$

$$\vec{v}\cdot\hat{u}_2 = v_x\sin(\theta_2) + v_z\cos(\theta_2) = \cos(\phi_2)$$

$$\vec{v}\cdot\hat{u}_3 = v_x\sin(\theta_3)\cos(\varepsilon_3) + v_y\sin(\theta_3)\sin(\varepsilon_3) + v_z\cos(\theta_3) = \cos(\phi_3)$$

This may be written in matrix form:

$$\begin{pmatrix}\cos(\phi_1)\\ \cos(\phi_2)\\ \cos(\phi_3)\end{pmatrix} = \begin{pmatrix}\sin(\theta_1) & 0 & \cos(\theta_1)\\ \sin(\theta_2) & 0 & \cos(\theta_2)\\ \sin(\theta_3)\cos(\varepsilon_3) & \sin(\theta_3)\sin(\varepsilon_3) & \cos(\theta_3)\end{pmatrix}\begin{pmatrix}v_x\\ v_y\\ v_z\end{pmatrix}$$

Thus, by inverting the above equation, a vector estimating the velocity vector for the particle may be determined based on the known values of the laser beam angles $\theta_1$, $\theta_2$, $\theta_3$, $\varepsilon_3$ and the respective three estimated values $\phi_1$, $\phi_2$, $\phi_3$ of the angle subtended by the particle path and the laser beam axis at these three different beam directions:

$$\begin{pmatrix}v_x\\ v_y\\ v_z\end{pmatrix} = \begin{pmatrix}\sin(\theta_1) & 0 & \cos(\theta_1)\\ \sin(\theta_2) & 0 & \cos(\theta_2)\\ \sin(\theta_3)\cos(\varepsilon_3) & \sin(\theta_3)\sin(\varepsilon_3) & \cos(\theta_3)\end{pmatrix}^{-1}\begin{pmatrix}\cos(\phi_1)\\ \cos(\phi_2)\\ \cos(\phi_3)\end{pmatrix}$$

In aspects of the invention, the processing module of the self-mixing interferometer may be configured to determine a property of particulate material, e.g., as disclosed herein. In this way, by moving the laser beam to re-position its central beam axis on three different directions, or by using three separate laser beams each pointed in a respective direction satisfying these angular requirements, then one may calculate an estimate of the velocity of the particle. The processing module 1D may be configured to generate an estimate for the velocity v of the particle accordingly, given the estimated angles $\phi_{1,2,3}$ subtended by the particle path 7 and the laser beam axis, and the known values of the laser beam direction angles $\theta_1$, $\theta_2$, $\theta_3$, $\varepsilon_3$.

Notably, if path of particle intersects central beam axis (i.e., $\eta=\eta_{Max}$), then one may let $\varepsilon_3=0$; $\theta_3=\theta_2$:

$$\begin{pmatrix}v_x\\ v_z\end{pmatrix} = \begin{pmatrix}\sin(\theta_1) & \cos(\theta_1)\\ \sin(\theta_2) & \cos(\theta_2)\end{pmatrix}^{-1}\begin{pmatrix}\cos(\phi_1)\\ \cos(\phi_2)\end{pmatrix}$$

$$v_y = \sqrt{v^2 - (v_x^2 + v_z^2)}$$

Here, v is the estimate of the speed of the particle obtained as described above. In this circumstance it is only necessary to move the laser beam to re-position its central beam axis on two (not three) different directions, or by using two (not three) separate laser beams each pointed in a respective direction satisfying these angular requirements. The processing module 1D may be configured to generate an estimate for the velocity $\vec{v}$ of the particle accordingly, given the estimated angles $\phi_{1,2}$ subtended by the particle path 7 and the laser beam axis, the estimated particle speed v, and the known values of the laser beam direction angles $\theta_1$, $\theta_2$.

Figure 9A:
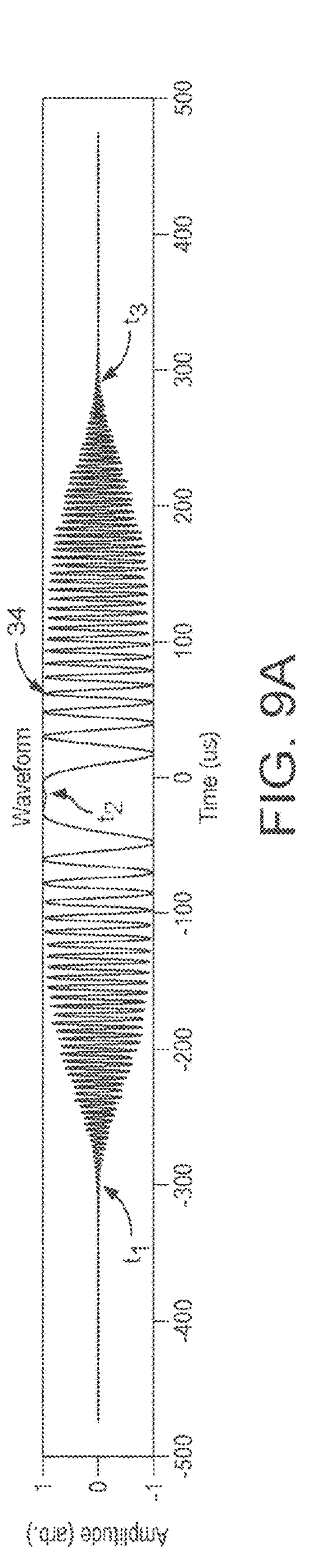
FIG. 9A shows an example of a self-mixing interferometric signal.

FIG. 9A shows a measured waveform, $$P_{Laser}^{M},$$

for an interferometric signal 34 according to an example of the invention. Here it can be seen that the measured waveform has the same functional form as is shown in the examples of the analytical expression shown in FIG. 8A and FIG. 8B.

Notably, however, the modulation amplitude of the measured waveform 34, corresponding to the amplitude term B in the analytical expression:

$$P_{Laser} = A + B\cos(\omega_s t + \varphi_0)$$

shows a systematic rise from a value B=0 at time $t=t_1$ when the particle entered the laser beam, to a constant value of $B=B_{Max}$ before subsequently decaying again to a value B=0 at time $t=t_3$, when the particle exited the laser beam. In between these two time points, the particle reached a tangential position at time $t=t_2$ when the frequency of the interferometric signal momentarily falls to zero: $\omega_s(t=t_2)=0$. The rise and fall of the modulation amplitude B is the result of the distribution of laser light intensity across the laser beam, in which the greater intensity is within the central regions of the laser beam, and the light intensity of the laser beam falls to zero at the edge of the laser beam in a smooth fashion rather than in an instantaneous or abrupt 'edge' as has been assumed in the analytical expression shown in FIG. 8A and FIG. 8B. When in regions of greater light intensity, the optical coupling between the light within the laser resonator cavity and the light re-injected into the laser resonator cavity as reflected/scattered from the particle, is greater and this results in a greater modulation amplitude B. This enables one to identify the times $t=t_1$, and $t=t_3$ as those times when the interferometric signal 34 begins and ends. The time $t=t_2$ can also be identified as the time when the frequency of the interferometric signal momentarily falls to zero: $\omega_s(t=t_2)=0$. In aspects of the invention, the processing module of the self-mixing interferometer may be configured to determine these times, e.g., as disclosed herein.

The inventors have found that by applying a frequency-space transformation to the interferometric signal, such as a Fourier transformation or a wavelet transformation has a number of particular benefits in allowing useful information about properties of the particle 4 to be extracted from the structure of the interferometric signal. This is particularly relevant to the methodology discussed above with reference to FIG. 5B and FIG. 5C in terms of determining a property of the particulate material within the monitored region according to a structure in data describing the interferometric signal in a frequency-space transformation (e.g., a Fourier transformation or a wavelet transformation) thereof wherein at least a part of the interferometric signal comprises a waveform of changing frequency.

Figure 9B:
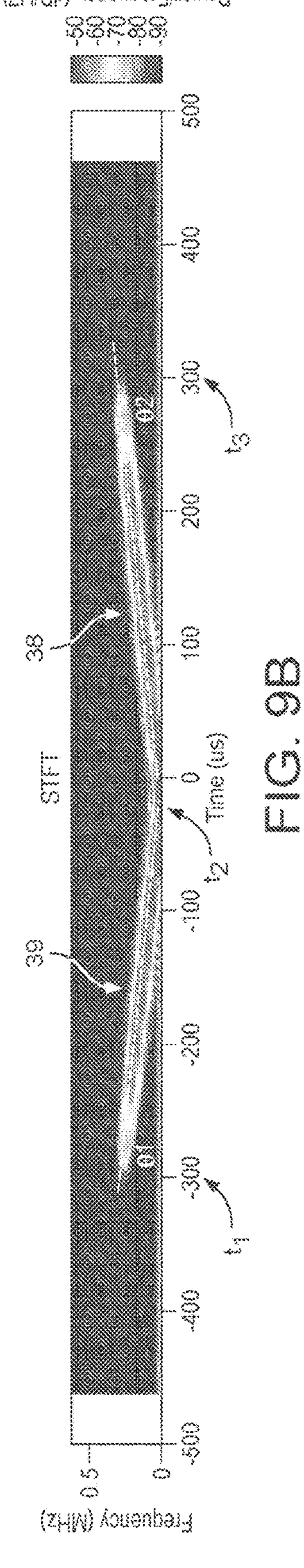
FIG. 9B shows an example of a Fourier scalogram (e.g., spectrogram) for a self-mixing interferometric signal.
Figures 9C, 10:
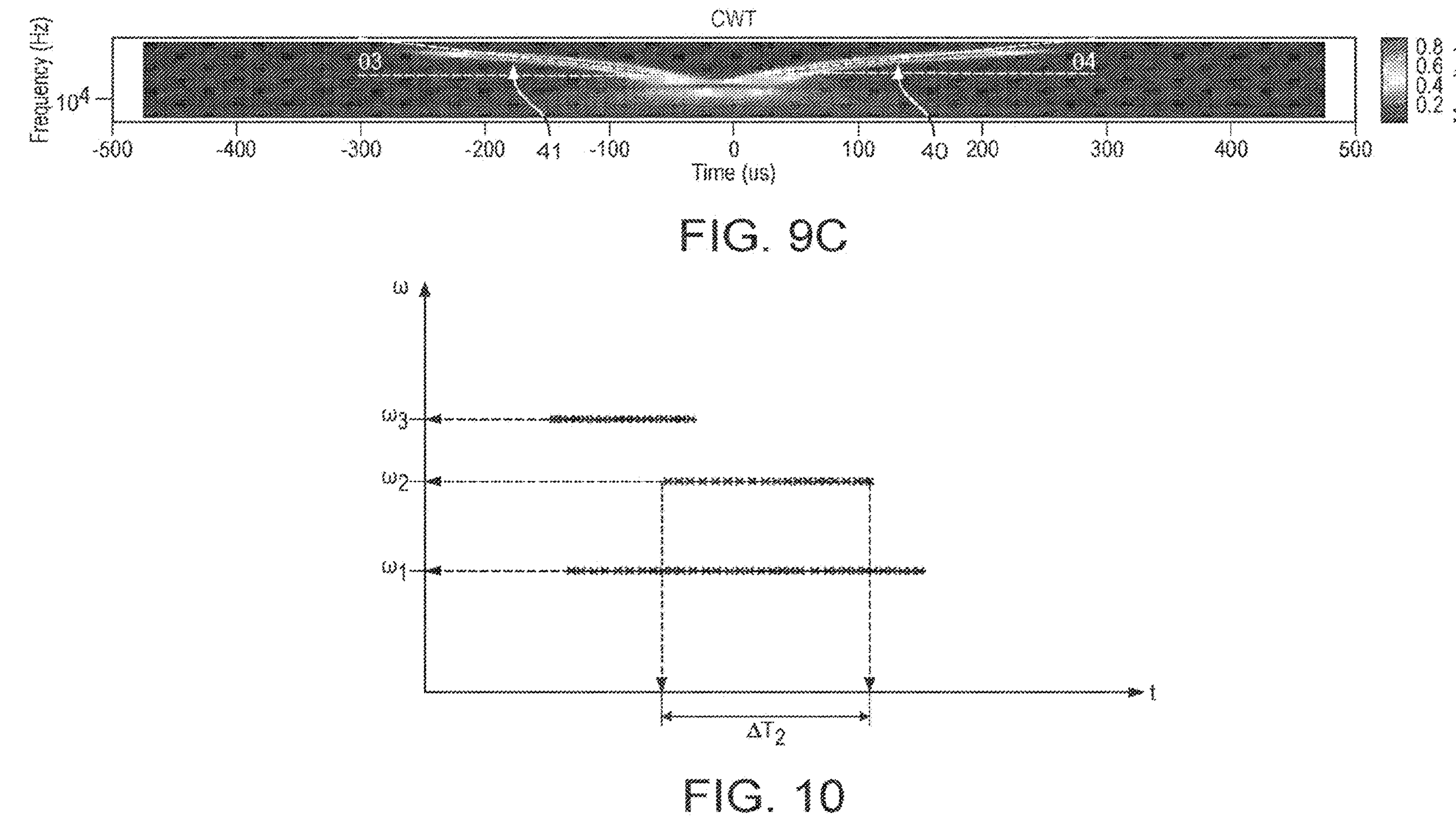
FIG. 9C shows an example of a wavelet scalogram for a self-mixing interferometric signal.
FIG. 10 shows an example of a wavelet scalogram for a self-mixing interferometric signal.

For example, referring to FIG. 9B, here is shown a Fourier "scalogram" (e.g., spectrogram) of the data describing the result of applying a Fourier transformation to the interferometric signal of FIG. 9A. The "scalogram" (e.g., spectrogram) is a visual representation of the Fourier transform data, having axes for time (horizontal axis), frequency (vertical axis), and power/frequency value (axis perpendicular to the page of the figure). In aspects of the invention, the processing module of the self-mixing interferometer may be configured to generate data describing a Fourier "scalogram" (e.g., spectrogram), e.g., as disclosed herein.

Here, one can see that the times $t=t_1$, and t=13 are easy to determine accurately in terms of a time point at which the magnitude of the power/frequency value of the Fourier "scalogram" (e.g., spectrogram) exceeds a pre-set threshold value suitably selected to exclude (or exceed) the effects of signal noise. The time $t=t_2$ can also be identified as the time when the frequency of the Fourier "scalogram" (e.g., spectrogram) momentarily falls to zero: @s $(t=t_2)=0$. Notably, one can see that the Fourier "scalogram" (e.g., spectrogram) displays a V-shaped structure having two inclined lobes (38, 39) of the distribution of data each extending, in opposite respective directions, away from a common vertex centred upon the time point $t=t_2$.

By locating the time position of this vertex, one may accurately estimate a value of $t_2$. This may be done, for example, by applying a regression algorithm to the data of either lobe (or each lobe separately), and determining a linear regression line for that data. The time point at which the given linear regression line crosses the time axis (i.e., $\omega_s=0$) provides an estimate of the value of $t_2$. This may be applied to each of the two data lobes (38, 39) to provide two separate estimates of the value of $t_2$, and the final estimate be calculated as the average of the two separate estimates.

It is also noted that the two inclined lobes (38, 39) of the distribution of data, and the respective linear regression lines thereof, subtend respective inclination angles θ1 and θ2 relative to the time axis.

FIG. 9C, shows a wavelet "scalogram" of the data describing the result of applying a wavelet transformation to the interferometric signal of FIG. 9A. In aspects of the invention, the processing module of the self-mixing interferometer may be configured to generate data describing a wavelet "scalogram", e.g., as disclosed herein. The "scalogram" is a visual representation of the wavelet transform data, having axes for time (horizontal axis), frequency (vertical axis), and wavelet coefficient magnitude value (axis perpendicular to the page of the figure). It is also noted that the distribution of data in the wavelet scalogram also has two inclined lobes (40, 41), and a respective linear regression line or data trend line thereof subtends respective inclination angles θ3 and θ4 relative to the time axis. The wavelet transformation in this example was a continuous wavelet transformation (CWT) of a time-series interferometric signal, s(t), of the form:

$$W_s(\alpha, \beta) = \frac{1}{\sqrt{\alpha}} \int s(t)\Psi^*\left(\frac{t-\beta}{\alpha}\right) dt$$

Here, the quantity $W_s(\alpha,\beta)$ represents the wavelet coefficient value, and $|W_s(\alpha,\beta)|$ the magnitude of this value. The quantity $\Psi^*([t-\beta]/\alpha)$ is the complex conjugate of the so-called 'mother wavelet' and the quantities α and β are the scale of the scale and translation values. In other examples, a discrete wavelet transformation may be used, or some other form of wavelet transformation readily available to the skilled person. The inventors have found that a wavelet transformation provides a particularly effective means of reliably representing the variable-frequency structure of the interferometric signal in ways that are compact, and robust against misrepresenting noise as a signal component.

Without wishing to be bound by theory, it is believed that this may be because of the nature of the path 7 of a particle through the laser beam. As mentioned above, if the particle path is fluctuates around a 'time-averaged' path that is linear, then the fluctuating path directions will result in corresponding fluctuations in the instantaneous value of the frequency of the interferometric signal. As discussed above with reference to the scalogram of FIG. 10, this fluctuation in signal frequency will result in a broadening of the estimated signal frequency around an average value (e.g. $\omega_2$) of the fluctuating frequency. Given the variable scale factor built into the wavelet transformation, these fluctuations can be robustly represented by associated fluctuations in the scale factor. In this way, it is suggested, the wavelet transformation may be better able to represent such signals. The inventors have found that this advantage is surprisingly effective when the modulation amplitude B of the interferometric signal becomes very small. This occurs when the re-injected light reflected/scattered from the particle 4 is very weak or sparse. The inventors have found that other frequency-space transformations, such as the Fourier transformations, do not share this quality and are far more susceptible to mistaking signal noise for signal frequency fluctuation when signal modulation amplitudes B become small.

It is noted that the scalogram shown in FIG. 10 corresponds to a case in which the particle 4 has a linear path, or linear 'time averaged' path, through a laser beam possessing flat wavefronts 10, as schematically shown in FIG. 2D. The scalogram data for a given particle trajectory, in that case, is distributed along a substantially horizontal line, albeit with scatter in the data around the line, centred on a constant average signal frequency value. This is because the orientation (π/2−ϕ) of the path (or the time-averaged path) of the particle 4 relative to the flat wavefronts is substantially constant and therefore the component (v cos ϕ) of the velocity v of the particle perpendicular to the wavefronts, is constant. In aspects of the invention, the processing module of the self-mixing interferometer may be configured to generate data describing such a "scalogram", e.g., as disclosed herein.

However, the scalogram of FIG. 9C corresponds to a case in which the particle 4 has a linear path, or linear 'time averaged' path, through a laser beam possessing wavefronts 10 that have different directions in different parts of the monitored region, such as schematically shown in FIG. 2A, FIG. 2B, FIG. 4 and FIG. 3. In addition, the scalogram of FIG. 9C also corresponds to a case in which the particle 4 has a curved path through a laser beam possessing flat wavefronts 10 such as schematically shown in FIG. 2C. The scalogram data for a given particle trajectory, in these cases, is distributed along a curve that asymptotically (i.e., as $t\rightarrow\infty$) approaches a substantially horizontal line centred on a constant signal frequency value. This is because the orientation ($\pi/2-\phi$) of the linear (or curved) path of the particle 4 relative to the curved/changing (or flat) wavefronts only approaches a condition of being substantially constant as $t\rightarrow\infty$. Of course, the particle cannot remain in the beam forever and so the data trend line of the lobes (40, 41) of the distribution of data within the wavelet scalogram of FIG. 9C subtend smaller inclination angles (θ3 and θ4) relative to the time axis when the particle path is closer to satisfying tis asymptotic condition. In other words, the smaller the value if the inclination angle of a data lobe of the wavelet scalogram, the smaller is the value of the particle path angle, $\phi$, and the closer is the value of $v \cos \phi$ to v (i.e., the closer $\cos \phi$ is to 1.0). This analysis applies equally to the inclination angles of the data distribution in the Fourier scalogram (e.g., spectrogram) of FIG. 9B, (i.e., θ1 and θ2) relative to the time axis.

The inventors have realised that these observations may be used to provide an estimate of the speed v of the particle 4 within the laser beam, as follows.

Referring to FIG. 11A to FIG. 11H, here is schematically shown a set of eight different wavelet scalograms produced by the self-mixing interferometer 1 of eight different interferometer signals obtained in response to a respective one of eight different paths 7 of a particle 4 through the monitoring laser beam 8*a*. In aspects of the invention, the processing module of the self-mixing interferometer may be configured to generate data describing any such "scalogram", e.g., as disclosed herein.

A first wavelet scalogram is schematically illustrated in FIG. 11A. The lobes of the data distribution of the scalogram are substantially symmetrical about the intermediate time $t=t_2$. Either side of this intermediate time, each lobe terminates at a time $t=t_1$ or a time $t=t_3$ corresponding to the same interferometric signal frequency. This corresponds to the symmetric geometry of the particle path 7 relative to the cone of the laser beam 8*a* in which $\phi=\pi/2$, and is a schematic representation of the wavelet scalogram of FIG. 9C.

A second wavelet scalogram is schematically illustrated in FIG. 11B. The lobes of the data distribution of the scalogram are asymmetrical about the intermediate time $t=t_2$. Either side of this intermediate time, each lobe terminates at a time $t=t_1$ or a time $t=t_3$ corresponding to different interferometric signal frequencies. This corresponds to an asymmetric geometry of the particle path 7 relative to the cone of the laser beam 8*a*, in which the particle path 7 subtends an angle $\phi\sim\pi/2$ but differing from $\pi/2$. In this example, the particle path is directed slightly away from the self-mixing interferometer 1 such that the time interval ($t_2-t_1$) between entering the laser beam and reaching the tangential position, is less than the time interval ($t_3-t_2$) between entering the tangential position and exiting the laser beam. Consequently, the orientation of the particle path 7 has had a greater time to approach the condition in which the path orientation is perpendicular to the wavefronts of the laser beam 8*a*, and the interferometric signal frequency is higher as the particle 4 exits the laser beam.

A third wavelet scalogram is schematically illustrated in FIG. 11C. The data distribution of this scalogram has only one lobe and no intermediate time $t=t_2$ at which a tangential position is reached (i.e., that position is never reached). The single lobe starts at a time $t=t_1$ and ends at a time $t=t_3$ corresponding to different interferometric signal frequencies. This corresponds to a more asymmetric geometry of the particle path 7 relative to the cone of the laser beam 8*a*, in which the particle path 7 subtends an angle $\phi<<\pi/2$. In this example, the particle path is directed further away from the self-mixing interferometer 1 such that the time interval ($t_2-t_3$) is simply the interval between entering the laser beam and exiting the laser beam. Consequently, the orientation of the particle path 7 has had a greater time to approach the condition in which the path orientation is perpendicular to the wavefronts of the laser beam 8*a*, and the interferometric signal frequency is higher as the particle 4 exits the laser beam. Notably, the angle of inclination of the single lobe relative to the time axis is lower than the angle of inclination of any of the lobes shown in FIG. 11B and FIG. 11A. The reason is as described above, relating to the condition that the smaller is the value of the particle path angle, $\phi$, and the closer is the value of $v \cos \phi$ to v (i.e., the closer $\cos \phi$ is to 1.0).

A fourth wavelet scalogram is schematically illustrated in FIG. 11D. This corresponds to a similar situation as described with reference to FIG. 11C, but in which the particle path angle is small and $\phi\approx0$. Notably, the angle of inclination of the single lobe relative to the time axis is lower than the angle of inclination of any of the lobes shown in FIG. 11A, FIG. 11B or FIG. 11C.

A fifth wavelet scalogram is schematically illustrated in FIG. 11E. The lobes of the data distribution of the scalogram are asymmetrical about the intermediate time $t=t_2$. Either side of this intermediate time, each lobe terminates at a time $t=t_1$ or a time $t=t_3$ corresponding to different interferometric signal frequencies. This corresponds to an asymmetric geometry of the particle path 7 relative to the cone of the laser beam 8*a*, in which the particle path 7 subtends an angle $\phi\sim\pi/2$ but differing from $\pi/2$. In this example, the particle path is directed slightly away from the self-mixing interferometer 1 such that the time interval ($t_2-t_1$) between entering the laser beam and reaching the tangential position, is less than the time interval ($t_3-t_2$) between entering the tangential position and exiting the laser beam. Consequently, the orientation of the particle path 7 has had a greater time to approach the condition in which the path orientation is perpendicular to the wavefronts of the laser beam 8*a*, and the interferometric signal frequency is higher as the particle 4 exits the laser beam. The time interval ($t_3-t_1$) is the interval between entering the laser beam and exiting the laser beam, and this is relatively large. This is in conjunction with relatively small values of interferometric signal frequency at each respective end of the two data lobes. This indicated that the speed v of the particle 4 is low. In other words, a low particle speed results in a low maximal interferometric signal frequency and a long time duration for the particle to traverse the laser beam.

Figure 11F:
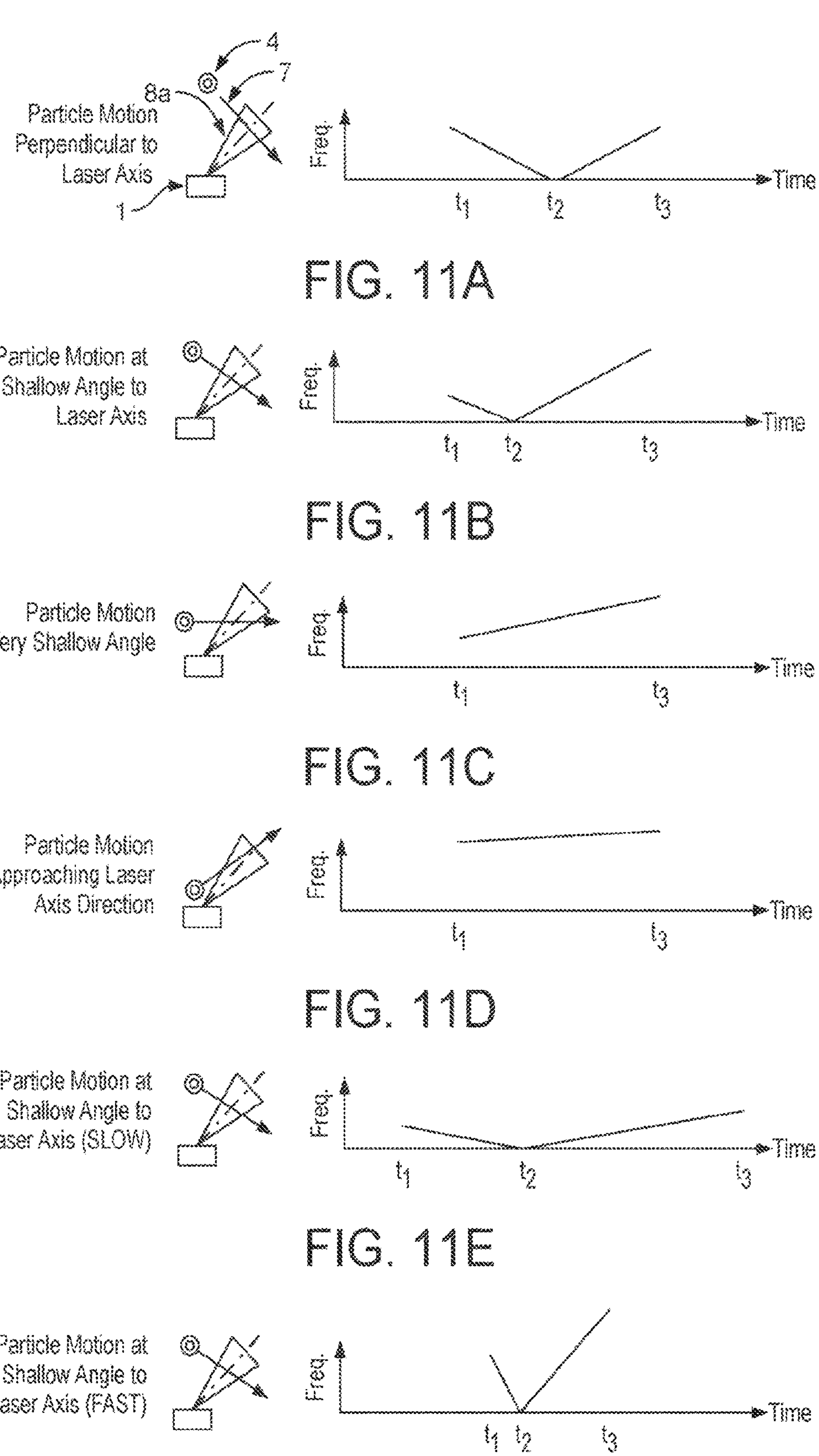

A sixth wavelet scalogram is schematically illustrated in FIG. 11F. This corresponds to the same circumstances described above with reference to FIG. 11E, but with the modification that the particle speed is relatively fast. This fact reveals itself in the smaller duration of the time interval $t_3-t_1$ together with the higher values of maximal interferometric signal frequency at the terminal ends of the data lobes.

seventh wavelet scalogram is schematically illustrated in FIG. 11G. An eighth wavelet scalogram is schematically illustrated in FIG. 11H. The maximum value of frequency $\omega_{Max2}$ present in the interferometric signal waveform, and therefore presented within the data describing the scalogram of that waveform, is indicated in FIG. 11G and FIG. 11H schematically.

These schematics illustrate how the structure of the data describing the wavelet scalogram of the interferometric signal may be used to estimate properties of the particle (e.g., the orientation of its path 7, particle speed v, particle size). It is to be understood that the same principles apply to structure of the data describing the Fourier scalogram (e.g., a spectrogram) of the interferometric signal, or to scalograms or spectrograms of other frequency transformations of the interferometric signal possessing these structural properties.

Figures 12B, 12C:
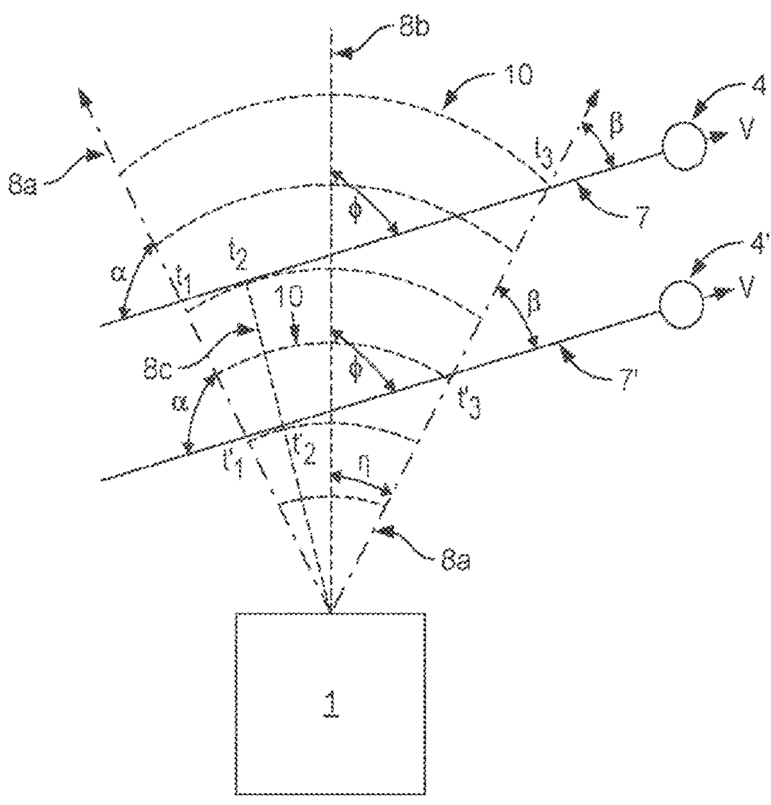
FIG. 12B and FIG. 12C show, schematically two different but parallel paths of a particle through a laser beam (FIG. 12B), and the resulting self-mixing interferometric signals and the respective wavelet scalograms for the self-mixing interferometric signals.

FIG. 12B and FIG. 12C show, schematically two different but parallel paths of a particle through a laser beam (FIG. 12B), and the resulting self-mixing interferometric signals and the respective wavelet scalograms for the self-mixing interferometric signals. The angle ($\alpha=\pi-\phi-\eta$) at which that the linear path of a particle (7 or 7') approaches, and enters, the conical edge of the diverging beam 8*a* of laser light determines the frequency of the waveform of the interferometric signal generated by the laser interferometer 1 at that moment ($t=t_1$) in time. Similarly, the angle ($\beta=\phi-_n$) that the same path of a particle approaches, and exits, the opposite conical edge of the diverging beam 8*a* of laser light determines the frequency of the waveform of the interferometric signal generated by the laser interferometer at that subsequent moment ($t=t_3$) in time. The entry and exit angles are independent of the distance of the distance of the particle from the laser interferometer at those times. Consequently, the frequency of the waveform of the interferometric signal at its beginning and at its end, corresponding to the moments of entry and exit, respectively, of the particle into the conical laser beam, are also independent of the distance of the distance of the particle from the laser interferometer. The frequencies present within the interferometric signal waveform (90, 91) are determined by the rate at which a particle traverses successive wavefronts of the laser light that intersect the path (7, 7') of the particle through the laser beam. One full wave cycle within the interferometric signal waveform is achieved upon the particle passing through two successive wavefronts of the laser light (i.e., two wavefronts separated by one wavelength of the laser light).

Wavefronts, by definition, extend in a direction perpendicular to the direction of forward travel (i.e., the light ray direction) of the light wave. Consequently, a particle path subtending a given angle, $\alpha$, of incidence to the light rays defining the bounding edges of the laser beam also subtend a related angle, $\beta$, relative to the wavefronts of the laser light at the bounding light ray (i.e., FIG. 12B: $\beta=\phi-\eta$). This related angle determines that initial rate at which the particle, of a given speed, can traverses successive wavefronts of the laser light that intersect the path and, therefore, determined the initial frequency of the interferometric waveform. The same holds true for the exit angle subtended by the particle path relative to the bounding ray of the laser light beam.

However, a closer particle 4' traverses a shorter path 7' through the conical beam, whereas a more distant particle 4 traverses a longer path within the conical beam. For a given speed v of particle, the time taken to traverse the conical beam increases in proportion to an increase in the distance of the distance of the particle from the laser interferometer. For a given speed v of particle, a more distant particle 4 has a path 7 that enters the cone of the laser beam at time: $t=t_1$, and exits the cone of the laser beam at time: $t=t_3$. At the intermediate time: $t=t_2$, the path 7 become tangential to the wavefronts of the laser light signifying the closest approach of the particle to the laser resonator cavity of the interferometer. For the same given speed v of particle, a nearer particle 4' has a path 7' that enters the cone of the laser beam at time: t=t'1, and exits the cone of the laser beam at time: t=t'3. At the intermediate time: t=t'2, the path 7' become tangential to the wavefronts of the laser light signifying the closest approach of the particle to the laser resonator cavity of the interferometer.

Each particle path crosses a number of curved wavefronts 10 of the laser light as that path (7, 7') crosses the laser beam. Each wavefront crossing corresponds to a full wave cycle in the waveform (90, 91) of the interferometric signal generated by the laser interferometer. A particle path 7 twice as far from the laser cavity of the interferometer may generate twice as many wave cycles within the interferometric waveform as are produced in the interferometric waveform generated by the same laser interferometer by a particle following a parallel path at half the distance from the laser. For example, in the schematic diagram of FIG. 12B, the more distant path 7 of the particle 4 is approximately (but not exactly) twice as far from the laser resonator cavity 1 as is the less distant path 7' of the particle 4'. For this reason, the number of wave cycles in the waveform of the interferometric signal 90 corresponding to the more distant path 7 is approximately twice the number of cycles in the interferometric signal 91 corresponding to the less distant path 7. Each waveform of these two interferometric signals starts (at $t=t_1$ or $t=t'_1$) with the same initial frequency $\omega_{Max1}$ when the particle enters the conical laser beam, reduces in frequency to an intermediate minimum value $\omega_{Min}\approx 0$ (c and subsequently ends (at $t=t_3$ or $t=t'_3$) with the same final frequency $\omega_{Max}$ when the particle exits the beam. Because $[t_3-t_2]>[t'_3-t'_2]$, this means that the angle:

$$\theta=\tan^{-1}([\omega_{Max2}-\omega_{Min}]/[t_3-t_2])$$

subtended by the distribution of the data describing the parts of the scalogram 92 associated with the more distant particle part 7, is less than the angle:

$$\theta'=\tan^{-1}([\omega_{Max2}-\omega_{Min}]/[t'_3-t'_2])$$

subtended by the distribution of the data describing the parts 94 of the scalogram associated with the less distant particle part 7'. The same is true of the angles (not shown) subtended by the distribution of the data describing the parts 93 and 95 of the scalograms associated with the parts of the interferometer signals (90, 91) preceding the times $t=t_1$ $$(\text{or } t=t'_1)$$

and the times $t=t_2$ $$(\text{or } t = t_2').$$

In aspects of the invention, the processing module of the self-mixing interferometer may be configured to determine the value of an angle subtended by the distribution of the data describing a selected part of the scalogram, e.g., as disclosed herein.

Figure 14:
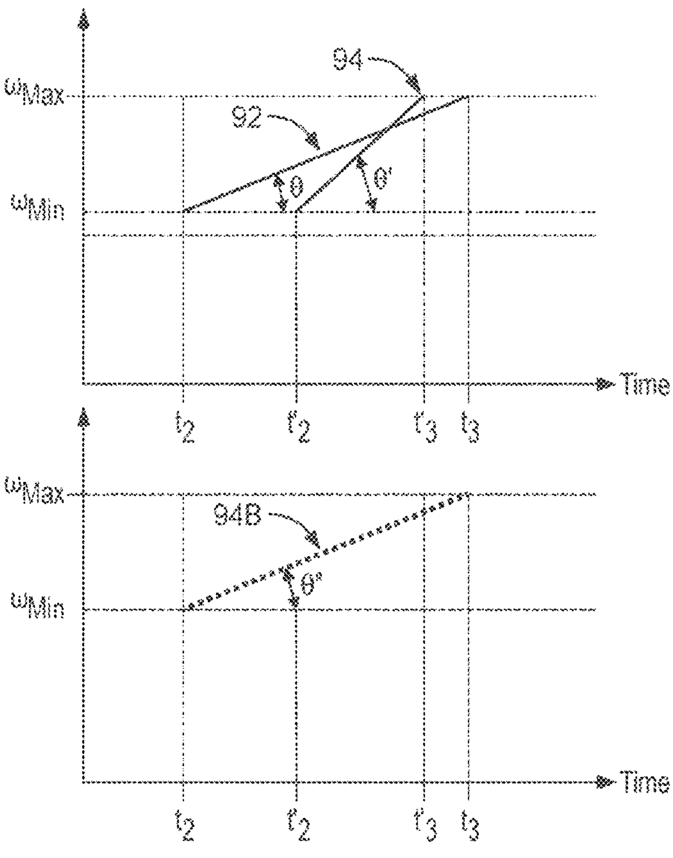
FIG. 14 shows examples of a spectrogram or scalogram for self-mixing interferometric signals.

The scalogram data may be normalised, or re-calibrated, in order to mitigate against this effect of different distances of particle paths, for particles of a given speed v, upon the angle subtended by the distribution of the data describing the scalogram. FIG. 14 shows a scalogram (e.g., a wavelet scalogram) in which three data sets are represented concurrently to aid understanding and comparison. A first data set describes the scalogram data distribution 92, also shown in FIG. 12C, corresponding to the interferometric signal 90 arising from the more distant path 7 of the particle 4 traversing the laser beam 8*a* at speed v. This first data set produces a scalogram data distribution extending in a direction that subtends a first angle θ relative to the time axis of the scalogram. A second data set describes the scalogram data distribution 94, also shown in FIG. 12C, corresponding to the interferometric signal 91 arising from the less distant path 7' of the particle 4' traversing the laser beam 8*a* at speed v. This second data set produces a scalogram data distribution extending in a direction that subtends a second angle θ' relative to the time axis of the scalogram.

As is noted in more detail below, the following relation exists:

$$\frac{T}{d_0} = \frac{1}{v}\left[\frac{\sin(2\eta)}{\sin(\phi-\eta)\sin(\phi+\eta)}\right] = \frac{T'}{d_0'}$$

Here, $$T' = [t_3' - t_2']$$

and $T=[t_3-t_2]$. The quantities $d_0$ and $$d_0'$$

are the distances of closest approach of the more distant particle path 7 and the less distant particle path 7', occurring at times $t=t_2$ and $$t = t_2',$$

respectively. Thus, if we assign the time interval T and particle distance $d_0$ to be reference values, $T^{(R)}$ and $$d_0^{(R)},$$

then a given interval of time T' may be re-scaled to a normalising reference time scale defined by:

$$T^{(R)} = T'\left(\frac{d_0^{(R)}}{d_0'}\right)$$

More generally, a re-scaling may be applied according to:

$$T' \to NT'$$

Here, the quantity $$N = \left(d_0^{(R)}/d_0'\right)$$

is a re-scaling coefficient. In this way, the time interval T' over which the second data set 94 extends may be normalised to mitigate against the effect upon the scalogram data distribution caused by the lesser distance $$d_0'.$$

The effect is to stretch or compress (i.e., re-scale) the time interval described by the data such that the re-scaled scalogram data distribution 94B extends in a direction that subtends a re-scaled angle θ" relative to the time axis of the scalogram. This re-scaling may achieve the result: θ"@θ relating to the fact that, in this example, the particles in question (4, 4') share the same speed v. In this way, the normalised angles (θ", θ) subtended relative to the time axis of the scalogram that separate data sets produce in a respective scalogram data distribution may be used consistently in an estimation of the speed v of the particles in question. In aspects of the invention, the processing module of the self-mixing interferometer may be configured to determine the value of a re-scaling coefficient and therewith to normalise of the data describing a selected part of the scalogram, e.g., as disclosed herein.

Figure 13A:
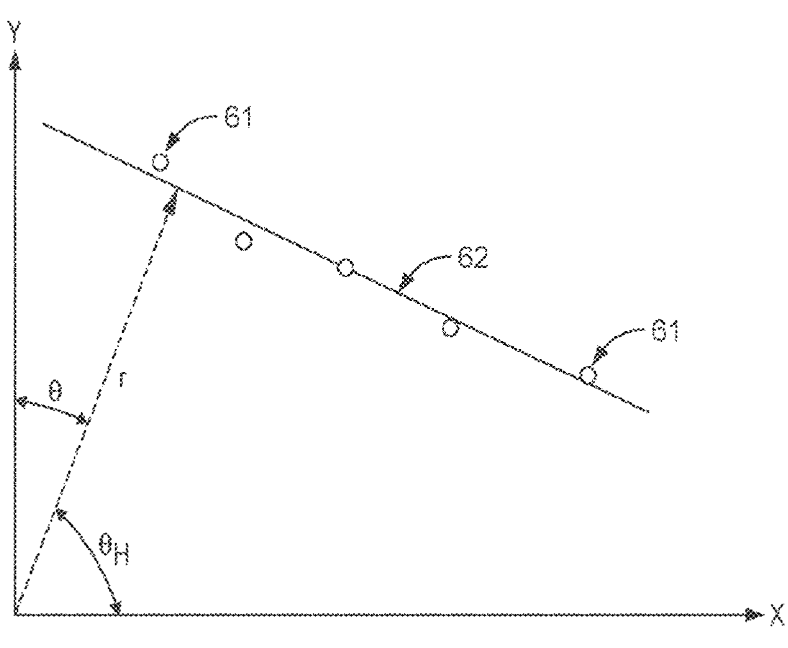
FIGS. 13A-13B show graphical representations of stages in the implementation of a Hough transformation in an algorithm implemented by a self-mixing interferometer.
Figure 13B:
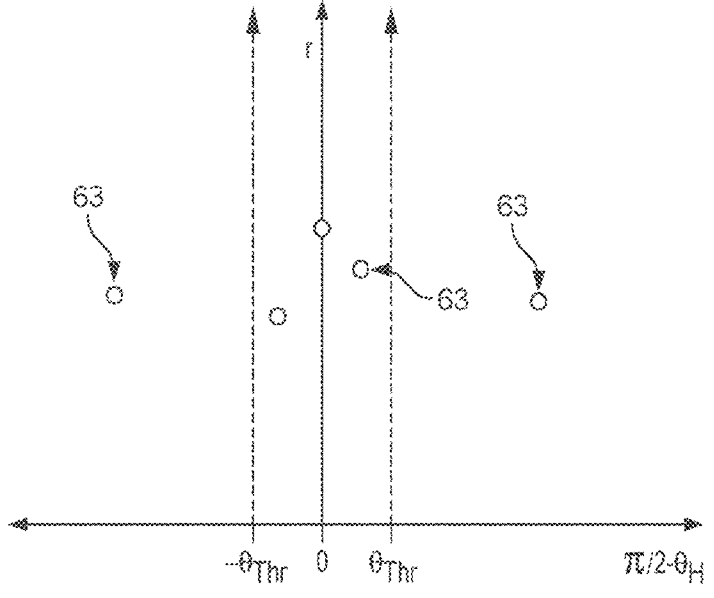

An angle subtended by the distribution of the data describing parts of the scalograms may be determined by applying a Hough transformation to the data representing the scalogram data. FIGS. 13A and 13B show graphical representations of stages in the implementation of a Hough transformation in an algorithm implemented by a self-mixing interferometer according to aspects of the invention. The Hough transformation seeks to identify a best-fitted regression line 61 through data points 61 in terms of the perpendicular distance "r" of the line from the origin of coordinates, and the angle $\theta_H$ subtended by that perpendicular distance and the x-axis of the coordinate system. The output of the Hough transformation is a set of one of more points 63 within the Hough transform space each having a coordinate (r, $\theta_H$). A threshold value $\theta_{Thr}$) may be set as shown in FIG. 13B.

Figure 18:
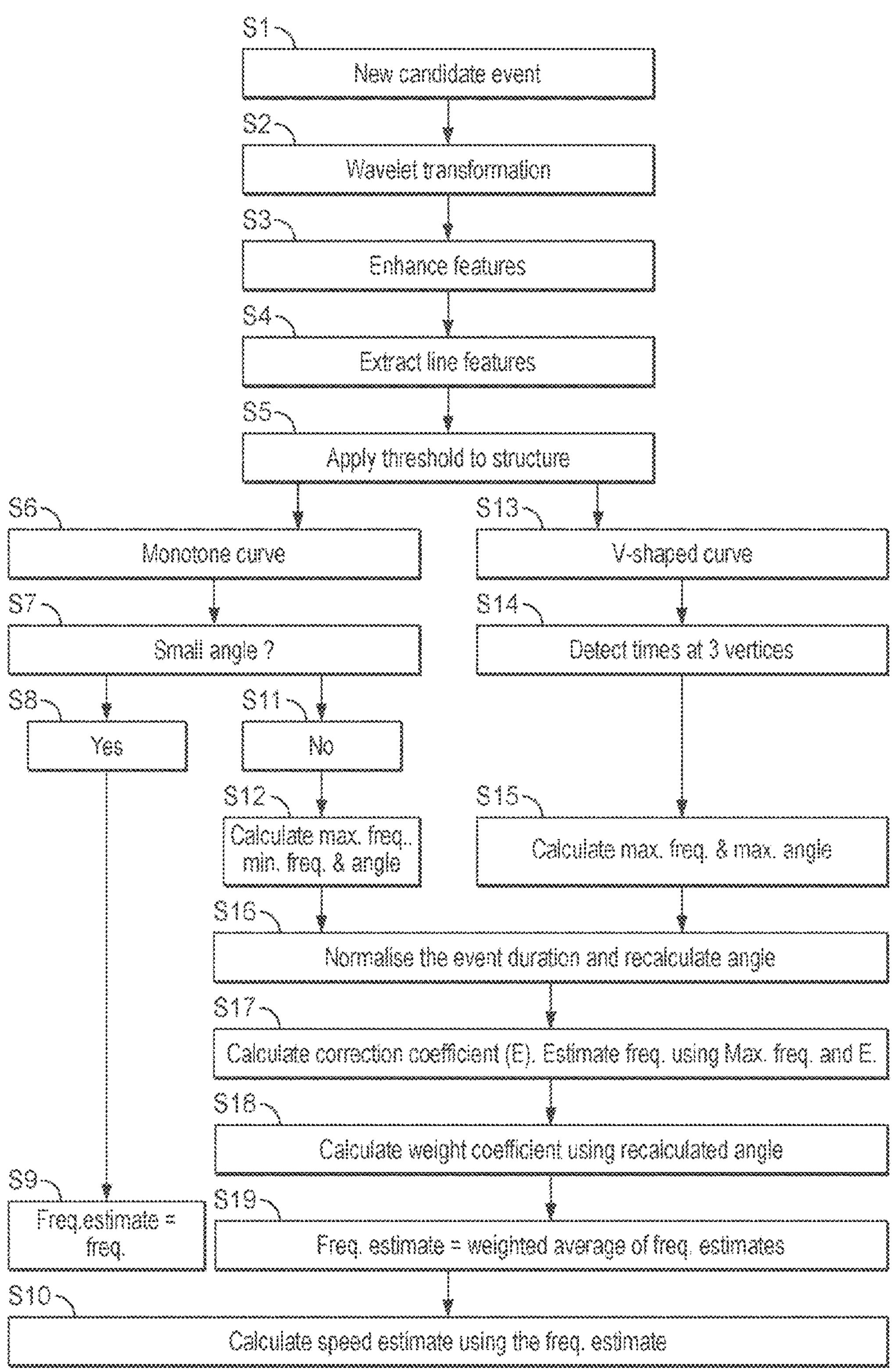
FIG. 18 shows a flow-chart if steps in an algorithm implemented by a self-mixing interferometer.

The processing module 1D may be configured to use structures in the scalograms by implementing the following algorithm in order to generate an estimate of the speed v of the particle passing through the laser beam. Referring to FIG. 18, here is shown a sequence of the following steps in this algorithm.

Step S1: Acquire an interferometric signal corresponding to a new 'candidate event'. Her the term 'candidate event' refers to the event of a particle traversing the laser beam and causing generation of an interferometric signal.

Step S2: Apply a wavelet transformation to the interferometric signal to obtain data describing a wavelet scalogram.

Step S3: Apply a filter to the data describing the wavelet scalogram in order to enhance edge features of structures (e.g., data lobes) within the data describing the wavelet scalogram. For example, a kernel based filter may be used, such as a "Canny Edge" filter or the like. Extract line features from the filtered data. A Hough transform can be used for this Step S4: purpose, for example, as described below in more detail with reference to FIGS. 13A and 13B.

Step S5: Identify whether the inclination of the extracted linear feature is sufficiently small. For example, one may determine if an angle $$\left(\frac{\pi}{2}-\theta_H\right)$$

detected via the Hough transform space has a magnitude value below a pre-set threshold value (i.e., see, FIG. 13B, $$\left|\frac{\pi}{2}-\theta_H\right|>\theta_{Thr}).$$

It is noted that the angle of inclination ($\theta_{Inc}$) of the extracted linear feature is related to the angle ($\theta_H$) detected in the Hough transform space as follows: $\theta_{Inc}=\pi/2-\theta_H$. Thus, a sufficiently large value of $\theta_H$ may correspond to a desirably small value of angle of inclination ($\theta_{Inc}$).

Step S6: If only one angle value is detected in the Hough transform space then determine that the scalogram data distribution possesses only one lobe ("Monotone Curve"). FIG. 11C and FIG. 11D are examples of this.

Step S7: If "Monotone Curve" is determined at Step S6, then determine if the value of angle of inclination (mnc) is sufficiently small. This may be done by comparing the magnitude of the value of angle of inclination to a threshold inclination angle value (e.g., is $$|\theta_{Inc}|<\theta_{Thr}^{Inc}$$

?).

Step S8: If the value of angle of inclination ($\theta_{Inc}$) is sufficiently small then . . . , Step S9: Use the frequency of the interferometric signal as an acceptable frequency estimate with which to calculate the particle speed v. Here it is assumed that the frequency of the interferometric signal corresponds to a condition approaching the asymptotic condition described above. In other words, the smaller the value if the inclination angle of a data lobe of the wavelet scalogram, the smaller is the value of the particle path angle, $\phi$, and the closer is the value of v cos $\phi$ to v (i.e., the closer cos $\phi$ is to 1.0).

Step S10 Calculate an estimate of the particle speed using the accepted frequency, $\omega_s$, of the interferometric signal according to:

$$v=\frac{\lambda\omega_s}{4\pi}$$

Step S11: If the value of angle of inclination ($\theta_{Inc}$) is not sufficiently small then . . . , Step S12: Detect extremes of the event: If the extracted linear feature has a falling inclination, then detect the frequency maximum value at the start of the linear feature (i.e.

$$\omega_s^{Max}$$

at $t_1$), and detect the frequency minimum value at the end of the linear feature (i.e.

$$\omega_s^{Min}$$

at $t_3$). These correspond to the maximum and minimum frequency values present in the data single lobe of the scalogram. If the data lobe has a rising inclination in time, then detect the frequency maximum value at the end of the linear feature (i.e.

$$\omega_s^{Max}$$

at $t_3$), and detect the frequency maximum value at the start of the linear feature (i.e.

$$\omega_s^{Min}$$

at $t_1$).

Step S13: If Step 5 reveals that two angle values are detected in the Hough transform space then determine that the scalogram data distribution possesses two lobes ("V-Shape"). FIG. 11A and FIG. 11B, as well as FIGS. 11E to 11H are examples of this.

Step S14: Detect the vertices of the V-shape. If the extracted linear feature has a falling inclination, then detect the frequency maximum value at the start of the first linear feature (i.e.

$$\omega_s^{Max1}$$

at $t_1$), and detect the frequency minimum value within the V-shape where the two linear features meet linear feature (i.e.

$$\omega_s^{Min}$$

at $t_2$), and detect the frequency maximum value at the end of the second linear feature (i.e.

$$\omega_s^{Max2}$$

at $t_3$). These correspond to the maximum and minimum frequency values present in the two data lobes of the scalogram.

Step S15: Select the greater of the two values $$\omega_s^{Max1}$$

and $$\omega_s^{Max2}.$$

Select the angle of inclination as the angle associated with the linear feature associated with the selected angle.

Step S16: Normalise the event duration $(t_3-t_1) \rightarrow N \cdot (t_3-t_1)$, where N is a normalisation factor and recalculate the angle of inclination using the renormalised event duration as:

$$\theta_{Inc} = \tan^{-1}\left[\frac{\omega_s^{Max} - \omega_s^{Min}}{N \cdot (t_3 - t_1)}\right]$$

In this step, the time scale of the extracted linear feature of the scalogram is re-scaled such that all events after this step are expressed in terms of this normalised time scale. This step serves to mitigate against a distance dependence otherwise present in the inclination angle of the extracted linear feature of the data lobe, as discussed above with reference to FIGS. 11A to 11H. The normalisation factor may be implemented using coefficients stored in pre-prepared look-up tables based on $$\omega_s^{Max},$$

for "Monotone" and "V-Shape" data distributions.

Step S17: Calculate a correction coefficient, E (where E>1), using a pre-stored correction coefficient look-up table. Each correction coefficient within this table is associated with a corresponding value of an inclination angle. Thus, the value of the new angle calculated at Step S16 may be associated with a corresponding correction coefficient within the table. This is done for both "Monotone" and "V-Shape" data distributions. Then, calculate the frequency estimate of the event as:

$$\omega_s^i = E_i \cdot \omega_s^{Max}$$

Step S18: Calculate a weight coefficient ($w_i$<1) using pre-stored a weight coefficient look-up table. Each weight correction coefficient within this table is associated with a corresponding value of an inclination angle. Thus, the value of the new angle calculated at Step S16 may be associated with a corresponding correction coefficient within the table. This is done for both "Monotone" and "V-Shape" data distributions.

Step S19: Calculate a new frequency estimate as the weighted average of previous frequency estimates $$\omega_s^i$$

using the weight coefficients $w_i$ according to:

$$\omega_s = \frac{\sum_i w_i \omega_s^i}{\sum_i w_i}$$

This frequency estimate is then used to calculate the particle speed according to:

$$v = \frac{\lambda \omega_s}{4\pi}$$

Finally, at the end of Steps S10 and S19, the list of terms in the weighted average may be updated. The updating relates to the summation operators used in the weighted average. The list of terms ($w_i$ and $$\omega_s^i$$

employed in these summations may be stored by the processing module of the self-mixing interferometer implemented in hardware using a memory buffer allotted a finite storage capacity. At a certain point in time the allotted storage capacity may be reached such that not enough memory resources exist to store all of the terms previously acquired. In such a case, the processing module of the self-mixing interferometer may be configured to limit the list of terms to a selection of terms, by discarding non-selected terms. For example, the processing module of the self-mixing interferometer may be configured to discard the earliest-acquired terms within the list as in a First In First Out (FIFO) buffer until the remaining number of terms are within the allotted storage capacity. In a different example, the processing module of the self-mixing interferometer may be configured to discard terms associated with a lesser weight (the terms in which we have a least confidence) by discarding terms associated with the lowest weight value from amongst all of the weight values within the list of terms, thereby prioritising terms associated with a greater weight (the terms in which we have a greater confidence). The discarding of lowest-weight terms may continue until the number of remaining terms are within the allotted storage capacity. In aspects of the invention, the processing module of the self-mixing interferometer may be configured to implement such updating, e.g., as disclosed herein.

Particle Cross-Section

In the frequency domain, an incident plane wave of laser light of angular frequency $\omega_L$ propagating along the z-axis through an isotropic medium of refractive index $n_0$, can be expanded by Legendre functions and Hankel functions:

$$e^{ikz}=\sum_{l=0}^{\infty}(2l+1)\frac{i^l}{2}\left[h_l^{(1)}(k_0r)+h_l^{(2)}(k_0r)\right]P_l(\cos\mu)$$

Here $k_0=\omega_L n_0/c$ is the wavevector of the laser light, and the angle μ is measured relative to the spatial z-axis. When the plane wave is scattered by a spherical obstacle (i.e., a particle) of radius a located at the origin, the total wave outside of the sphere is axially symmetric about the z-axis:

$$u(r,\mu,\omega_L)=\sum_{l=0}^{\infty}(2l+1)\frac{i^l}{2}\left[S_l(\omega_L)h_l^{(1)}(k_0r)+h_l^{(2)}(k_0r)\right]P_l(\cos\mu)$$

Here, $$u(r,\mu,\omega_L)=\int_{-\infty}^{\infty}\hat{u}(r,\mu,t)e^{i\omega_L t}dt$$

The coefficient $S_l(\omega_L)$ is determined from the boundary conditions requires of the scattering wave at the surface of the scattering particle, ensuring continuity of the wave across the boundary from within the particle to outside it. At large distances relative to the dimensions of the laser wavelength and the scattering particle, such that $k_0r>>1$, the asymptotic behaviour of the laser light wave traveling at an angle μ relative to the spatial axis z, and including the portion of light wave scattered by the particle, is given by:

$$u(r,\mu,\omega_L)\approx\sum_{l=0}^{\infty}(2l+1)\frac{1}{2ik_0r}\left[S_l(\omega_L)e^{ik_0r}+(-1)^{l+1}e^{-ik_0r}\right]P_l(\cos\mu)$$

$$u(r,\mu,\omega_L)\approx e^{ik_0z}+\frac{e^{ik_0r}}{r}\frac{1}{2ik_0}\sum_{l=0}^{\infty}(2l+1)[S_l(\omega_L)-1]P_l(\cos\mu)$$

$$u(r,\mu,\omega_L)\approx e^{ik_0z}+f(\mu,\omega_L)\frac{e^{ik_0r}}{r}$$

Here, $$f(\mu,\omega_L)=\frac{1}{2ik_0}\sum_{l=0}^{\infty}(2l+1)[S_l(\omega_L)-1]P_l(\cos\mu)$$

Also, r is the distance of the wave from the scattering particle, and $f(\mu, \omega_L)$ is the scattering amplitude. The boundary conditions determining the value of $S_l(\omega_L)$ provide continuity of $u(r,\mu,\omega_L)$ and $\partial u(r,\mu,\omega_L)$ on the spherical surface (r=a) which requires that:

$$S_l(\omega_L)=\frac{k_0j_l(k_1a)h_l^{(2)\prime}(k_0a)+k_1j_l'(k_1a)h_l^{(2)}(k_0a)}{k_1j_l'(k_1a)h_l^{(1)}(k_0a)+k_0j_l(k_1a)h_l^{(1)\prime}(k_0a)}$$

The result is that:

$$f(\mu,\omega_L)=\frac{i}{k_0}\frac{k_0j_l(k_1a)j_l'(k_0a)+k_1j_l'(k_1a)j_l(k_0a)}{k_0j_l(k_1a)h_l^{(1)\prime}(k_0a)+k_0j_l'(k_1a)h_l^{(1)}(k_0a)}$$

Here $k_1=w_L n_1/c$ is the wavevector of the laser light within the particle comprised of a material of refractive index $n_1$. The functions $$j_l,\ j_l',\ h_l^{(1)},\ h_l^{(1)\prime},\ h_l^{(2)},\ h_l^{(2)\prime}$$

are, respectively, a spherical Bessel function of the first kind (order l), the derivative of a spherical Bessel function of the first kind (order l), a spherical Hankel function of the first kind (order l), the derivative of a spherical Hankel function of the first kind (order l), a spherical Hankel function of the second kind (order l), the derivative of a spherical Hankel function of the second kind (order l).

The key fact to note from this result is that the scattering amplitude $f(\mu, \omega_L)$ is a function of the properties of the scattering particle, as well as the properties of the scattered laser light. In particular, the magnitude of the scattering amplitude depends upon the magnitude of the radius, a, of the scattering particle. The differential scattering cross-section of the scattering particle is given by:

$$\frac{d\sigma(\mu,\omega_L)}{d\Omega}=|f(\mu,\omega_L)|^2$$

The integral of this quantity over the whole solid angle gives the total scattering cross-section as:

$$\sigma_0(\mu,\omega_L)=\int\frac{d\sigma(\mu,\omega_L)}{d\Omega}d\Omega=\int|f(\mu,\omega_L)|^2d\Omega$$

The inventors have realised that an estimate of the radius, a, of the scattering particle may be obtained from the coefficients of a frequency-domain transformation (e.g., a wavelet transformation) of the self-mixing interferometric signal modulation of the laser:

$$P_{Laser}=A+B\cos(\omega_s\cdot t+\varphi_0)$$

In other words, the magnitude of the modulating coefficient B, is found to depend upon the differential scattering cross-section $|f(\mu, \omega_L)|^2$ which, in turn, depends upon the scattering amplitude $f(\mu, \omega_L)$ which is a function of the properties of the scattering particle. The inventors have realised that the modulating coefficient B is a measure of the strength of coupling between the light returned by the scattering particle, and the internal laser cavity of the interferometer, and that the strength of coupling is determined by the amount of returned light and, therefore, by the magnitude of the differential scattering cross-section $|f(\mu, \omega_L)|^2$ in the back-scattering direction from the particle back to the laser cavity (i.e., the scattering angle μ=π such that $|f(\mu, \omega_L)|^2=|f(\pi, \omega_L)|^2$).

The inventors have appreciated that because the scattering amplitude comprises a sum of Legendre functions each having a particular coefficient, then this will be reflected in the coupling of the scattered laser light within the interferometer laser cavity via the modulating coefficient B. Since a frequency-domain transformation of the self-mixing interferometric signal comprises a transformation of the modulating coefficient B, then the coefficients of the frequency-domain transformation captures information regarding the coefficients of the terms forming the scattering amplitude:

$$f(\mu, \omega_L) = \frac{1}{2ik_0}\sum_{l=0}^{\infty}(2l+1)[S_l(\omega_L)-1]P_l(\cos\mu)$$

The inventors have realised that an estimate of the radius of a scattering particle may be made from a summation of the squared modulus of the magnitudes of the coefficients $$\left(W_{k,Laser}^{j}\right)$$

of the frequency-domain transformation applied to the self-mixing interferometric signal of the laser:

$$\sum_{j,k}\left|W_{k,Laser}^{j}\right|^2 \propto |f(\pi, \omega_L)|^2$$

Here, for example, one may use a wavelet transformation, with desired mother wavelet $$\Psi^*\left(\frac{t-b}{a}\right),$$

as follows:

$$W_{k,Laser}^{j}(\alpha, \beta) = \frac{1}{\sqrt{\alpha}}\int P_{Laser}(t)\Psi^*\left(\frac{t-\beta}{\alpha}\right)dt$$

Here, $\alpha=2^j$ and $\beta=k2^j$. Of course, $P_{Laser}(t)=A+B\cos(\omega_s t+\varphi_0)$ as noted above. The integer j is the scale parameter and the integer k is the shift parameter. Other wavelet transformations may be used. Indeed, the coefficients ($W_{Laser}$) of a frequency transformation of the self-mixing interferometric signal may be used.

For example, the radius, a, of the scattering particle may be estimated according to:

$$a = \frac{\gamma}{\Delta T}\sum_{j,k}\left|W_{k,Laser}^{j}\right|^2$$

Here, the coefficient $\gamma$ is a pre-set calibration coefficient, and the time interval $\Delta T$ is the time interval of the self-mixing interferometric signal over which the frequency-domain transformation is applied. In aspects of the invention, the processing module of the self-mixing interferometer may be configured to determine a value of the radius of particulate material, e.g., as disclosed herein. As discussed below, this division by the time interval $\Delta T$ is a time normalisation process that ensures a correspondence between the energy in within the self-mixing interferometric signal and the energy within the frequency-domain transformation that is applied to that signal. The time normalisation process takes account of the fact that different energies exist at different time scales of a frequency transformation of the self-mixing interferometric signal. For example, with reference to FIG. 12C, this time interval may be: $\Delta T=t_3-t_2$. The value of the pre-set calibration coefficient may be determined by pre-calibration performed in controlled conditions wherein a range of particles of varying known radius and speed are passed through the laser beam at a range of different known path directions/orientations and distances from the laser which produces a laser beam of specified beam geometry and beam intensity. The sum of the squared modulus of the magnitudes of the coefficients $$\left(W_{k,Laser}^{j}\right)$$

of the frequency-space transformation of the self-mixing interferometric signal may be measured for each individual combination of: radius; speed; path direction/orientation; distance from the laser, included in the pre-calibration process. A look-up table or other addressable data array may be generated in which an input value of the sum of the squared modulus of the magnitudes of the coefficients $$\left(W_{k,Laser}^{j}\right)$$

of the frequency-space transformation of the self-mixing interferometric signal results in an output value, from the look-up table, of the pre-set calibration coefficient $\gamma$ associated with that input value. This pre-set calibration coefficient $\gamma$ may also be associated with pre-calibrated values of: speed; path direction/orientation; distance from the laser for a particle. Accordingly, a combination of input values comprising two or more of: the sum of the squared modulus of the magnitudes of the coefficients $$\left(W_{k,Laser}^{j}\right)$$

of the frequency-space transformation; the associated measured particle speed; the associated measured particle path direction/orientation; the associated measured particle distance from the laser, may be used to return a pre-set calibration coefficient $\gamma$ from the look-up table or addressable data array using these measurements.

Windowed Fourier Transform

The Windowed Fourier transform (WFT), or Short-time Fourier transform (STFT), is an example of a Fourier transformation tool for extracting local-frequency information from a signal x(t). For a continuous-time WFT/STFT, the data to be transformed is multiplied by a window function, w, defining a sliding segment of length T which is nonzero for only a short period of time:

$$WFT[x(t)] = W(T, \omega) = \int_{-\infty}^{\infty} x(t)w(t-T)e^{-i\omega t}dt$$

For a discrete-time WFT/STFT, the discrete data $x_n$ to be transformed may be broken up into frames:

$$WFT[x_n] = W(m, \omega) = \sum_{n=-\infty}^{\infty} x_n w[n-m] e^{-i\omega m}$$

The segments can be windowed with an arbitrary function, (w(t−T) or w[n−m]), such as a Gaussian window or a boxcar (no smoothing) window. In the present invention the signal $x(t)=P_{Laser}(t)$, and the discrete data $x_n$ corresponds to discrete data samples $[P_{Laser}]_n$ taken at discrete time points (n) within the self-mixing laser interferometer signal. The process of applying a WFT/STFT to a time-series of data is well known to the skilled person and will not be discussed in detail here. However, it is noted that the Fourier transform is performed on the sliding segment from a time series of time step δt and total length Not, thus returning frequencies from (T−1) to (2δt−1) at each time step. The WFT/STFT imposes a scale T into the analysis, and the inventors have realised that this can result in some aliasing of low-frequency and high-frequency components that do not fall within the frequency range of the window. The inventors have found that in aspects of the present invention, analyses using a variable scale rather than a fixed or predetermined scaling is more effective because of the presence of a range of frequencies within the self-mixing interferometer signal. It has been found that a method of time-frequency analysis that is scale independent, such as wavelet analysis, is very effective in the context of the aspects of the present invention. In aspects of the invention, the processing module of the self-mixing interferometer may be configured to determine a property of particulate material using a Windowed Fourier transform (WFT), or Short-time Fourier transform (STFT), e.g., as disclosed herein.

Wavelet Transform

The wavelet transform may be used to analyse time-series data that contain power at many different frequencies. In a time series, $x_n$, with equal time spacing St and n=0 . . . . N−1, one may employ a 'mother' wavelet function which is a function of a non-dimensional 'time' parameter, Γ, such that:

$$\Psi(\Gamma);\ \Gamma = \frac{t-\beta}{\alpha}$$

An example is the Morlet wavelet, consisting of a plane wave, of dimensionless 'frequency' $\omega_0$, modulated by a Gaussian modulation envelope:

$$\Psi(\Gamma) = \pi^{-1/4} e^{i\omega_0 \Gamma} e^{-\Gamma^2/2}$$

The term "wavelet basis" refers only to an orthogonal set of functions. The use of an orthogonal basis implies the use of the discrete wavelet transform, while a nonorthogonal wavelet function can be used with either the discrete or the continuous wavelet transform. In the present disclosure, only the continuous transform is used in the examples given, however it is to be understood that all of the results and methods involving the continuous transform are applicable to the discrete wavelet transform.

The wavelet transform of a discrete time sequence of data, $x_n$, is defined as the convolution of $x_n$ with a scaled and translated version of Ψ(Γ), such that:

$$W_n(\alpha) = \sum_{n'=0}^{N-1} x_{n'} \Psi^*\left(\frac{[n-n']\delta t}{\alpha}\right)$$

Here, N is the number of points in the time series. By varying the wavelet scale, a, and translating it along the localised time index, n, one may determine the wavelet amplitudes of any features vary with scale and time. To approximate the continuous wavelet transform, the above convolution may be done N times for each scale, α. The convolution theorem allows all N convolutions to be calculated in Fourier space using a discrete Fourier transform (DFT). The DFT of $x_n$ is:

$$\hat{x}_k = \frac{1}{N} \sum_{n=0}^{N-1} x_n e^{-i2\pi kn/N}$$

Here, k=0 . . . . N−1 is the frequency index. Given that the Fourier transform of a function Ψ(t/α) is equal to $\hat{\Psi}(\alpha\omega)$, and applying the convolution theorem, the wavelet transform is the product of the Fourier transforms as follows:

$$W_n(\alpha) = \sum_{k=0}^{N-1} \hat{x}_k \hat{\Psi}^*(\alpha\omega_k) e^{-i\omega_k n\delta t}$$

Here, $$\omega_k = \begin{cases} \frac{2\pi k}{N\delta t}: & k \le N/2 \\ -\frac{2\pi k}{N\delta t}: & k > N/2 \end{cases}$$

Examples of wavelet basis functions suitable for use in aspects of the present invention include, but are not limited to, the following: Morlet; Meyer; Paul; Derivative of Gaussian (DOG); Mexican Hat; Daubechies. The Morlet wavelet basis functions may be complex. The Daubechies wavelet basis functions may be of any suitable order (e.g., order=1 (Haar wavelet); order=2, order=4, order=8, etc.). In aspects of the invention, the processing module of the self-mixing interferometer may be configured to determine a property of particulate material using a continuous wavelet transform (CWT), or discrete wavelet transform (DWT), e.g., as disclosed herein.

Transform Energy and Particle Scattering Cross-Section

Suppose a time series f(t) of data represented by a wavelet basis:

$$\psi_n^j(t) = \frac{1}{\sqrt{2^j}} \Psi\left(\frac{t-n2^j}{2^j}\right)$$

Here j and n are integers. The scale is $\alpha=2^j$ and the integer n gives the time location as $\beta=n2^j$. The range of the time location factor n is $2^j$. Here, Ψ is the mother wavelet that forms an orthonormal set with respect to j and n. The wavelet transform of f(t), and the reconstruction of f(t) from its wavelet transform coefficients are, respectively, given by:

$$\hat{f}_n^j = \int f(t)\, \psi_n^j(t)\, dt$$

$$f(t) = f_0 + \sum_{j=0}^{\infty} \sum_{n=0}^{2^j-1} \hat{f}_n^j \psi_n^j(t)$$

Here, $j \geq 0, 1 \ldots 2^j-1$, and $f_0$ is related to scales greater than the time span of the data. Note that, on a specific scale level j, the reconstruction of the time series is the projection of f(t) onto the subspace containing only features of scale $2^{-j}$, and is given by:

$$f^j(t) = \sum_{n=0}^{2^j-1} \hat{f}_n^j \psi_n^j(t)$$

such that:

$$f(t) = f_0 + \sum_{j=0}^{\infty} f^j(t)$$

According to Parseval's relation:

$$\int_0^t \left[f^j(t)\right]^2 dt = \sum_{n=0}^{2^j-1} \left[\hat{f}_n^j\right]^2$$

The left-hand-side of the above equation represents the energy within $j^{th}$ component of the time-series signal f(t) associated with features of scale level $2^{-j}$. The right-hand-side of the equation is the sum of the $2^j=N$ parts each of which represents the energy on a small interval centred around the time $t_n=n/2^j$, having a time duration of $\Delta t_j=1/N=1/2^j$. Noting that the right-hand-side can be expressed as a Riemann sum over N parts, according to the 'middle value' theorem, we have:

$$\int_0^t \left[f^j(t)\right]^2 dt = \sum_{n=0}^{2^j-1} \left[f^j(t_n)\right]^2 \Delta t_j$$

Thus, $[f^j(t_n)]^2$ is the energy $$E_n^j$$

at location n for scale $2^j$. Comparing this result with Parseval's relation gives:

$$\sum_{n=0}^{2^j 1} \left[f^j(t_n)\right]^2 \Delta t_j = \sum_{n=0}^{2^j 1} \left[\hat{f}_n^j\right]^2$$

This means that:

$$E_n^j = \frac{\left[\hat{f}_n^j\right]^2}{\Delta t_j}$$

Accordingly, $$\sum_{j=0}^{\infty} \sum_{n=0}^{2^j-1} \left[\hat{f}_n^j\right]^2 = \sum_{j=0}^{\infty} \Delta t_j \sum_{n=0}^{2^j-1} E_n^j$$

If the value of the energy is approximately evenly distributed across the scales, j, of the features of the signal, then the energy values $$E_n^j$$

are approximately independent of the scale integer j and one may reverse the order of summation as follows:

$$\sum_{j=0}^{\infty} \sum_{n=0}^{2^j-1} \left[\hat{f}_n^j\right]^2 = \sum_{n=0}^{2^j-1} E_n^j \sum_{j=0}^{\infty} \Delta t_j = \Delta t \sum_{n=0}^{2^j-1} E_n^j$$

Therefore, $$\sum_{n=0}^{2^j-1} E_n^j = \text{Total Energy} = \frac{1}{\Delta t} \sum_{j=0}^{\infty} \sum_{n=0}^{2^j-1} \left[\hat{f}_n^j\right]^2$$

Here, $$\Delta t = \sum_{j=0}^{\infty} \Delta t_j \propto \Delta T$$

The inventors have realised that by summing, over scales and time positions (i.e., all n and j), the square of the modulus of the wavelet coefficients (i.e., let $$\hat{f}_n^j = W_{n,Laser}^j$$

generated by applying a frequency transformation (e.g., a wavelet transform) to the self-mixing interferometer signal (i.e., let $f(t)=P_{Laser}(t)$), and dividing the result by the duration ($\Delta T$) of that interferometer signal, one may generate a consistent estimate of the energy of the time-series signal. The time normalisation factor ($\Delta T$) takes account of the fact that different energies exist at different time scales of a frequency transformation of the self-mixing interferometric signal. From that energy estimate, and noting the correlation between the signal energy and the scattering cross-section of the particle responsible for providing the returned light causing the self-mixing interferometer signal to arise, one may generate an estimate of the particle radius as noted above, as follows:

$$a = \frac{\gamma}{\Delta T}\sum_{j=0}^{\infty}\sum_{n=0}^{2^j-1}\left|W^f_{k,Laser}\right|^2$$

It is noted that self-mixing interferometric signals of relatively longer duration will generally include wavelet coefficients of relatively longer/larger time scales, meaning inclusion of significant coefficient terms with larger values of the scale integer j associated with the scale factor $\alpha=2^j$. The time normalisation factor ($\Delta T$) takes account of this. In aspects of the invention, the processing module of the self-mixing interferometer may be configured to determine this property of particulate material, e.g., as disclosed herein.

Wavelet Coefficients and Particle Size

As discussed above, the "feedback level" (C) within the laser resonator cavity of a self-mixing interferometer is given by:

$$C = \kappa\frac{\tau_{ext}}{\tau_{int}}\sqrt{1+\alpha^2}$$

The optical coupling of the light returned from the particle and the light within the resonator cavity of the laser results in the "excess phase equation":

$$\varphi_{FB} = \varphi_s + C\sin(\varphi_{FB} + \tan^{-1}\alpha)$$

The term $\varphi_{FB}$ represents the phase accumulated by the electromagnetic field of the laser on feed-back (FB) transmission through the external cavity. The term $\varphi_s$ corresponds to the phase accumulated by transmission through the external cavity if the laser were not experiencing optical feedback. The feedback level C determines the degree of non-linear coupling within the laser resonator cavity. The disclosures herein are mostly, but not exclusively, concerned with the "weak feedback" regime in which $C\rightarrow 0$ such that no nonlinear coupling exist. However, the inventors have realised that use can be made of small but non-negligible values of the feedback level C. The dependence of the phase term $\varphi_{FB}$ and the interferometric signal generated by the laser cavity becomes as follows:

$$\varphi_{FB} = \varphi_s + C\ \sin(\varphi_{FB} + \tan^{-1}\alpha)$$

$$P_{Laser} = A + B\ \cos[\varphi_s + C\ \sin(\varphi_{FB} + \tan^{-1}\alpha)]$$

The inventors have found that a small but not insignificant appearance of "spiky" signal components arise increasingly within a self-mixing interferometer signal when feedback-induced instabilities begin to appear at small but not insignificant feedback levels C. The inventors have realised that the more "spiky" a mother wavelet is the better it is at representing the these "spiky" signal features. The inventors have devised a technique by which these "spiky" signal features can be observed by comparing wavelet transformations of the same signal. The inventors have found that "smoother" mother wavelets (e.g., Morlet) having a relatively lower maximum value of first derivative and/or second derivative (with respect to time) will give stronger wavelet coefficients at a lower, or negligible, feedback level C while "spikier" mother wavelets (e.g., Daubechies) having a relatively higher maximum value of first derivative and/or second derivative (with respect to time) will give higher wavelet coefficients at higher, or non-negligible, feedback levels C. A suitable comparison between "smoother" and "spikier" mother wavelets has been found to be possible according to the ratio of the moduli of wavelet coefficients generated from two different types of mother wavelet. Preferably, the wavelet coefficients being compared correspond to the same scale $\alpha$ and the same time location $\beta$.

The inventors have discovered that an estimate of the radius, a, of a particle responsible for providing the returned light causing the self-mixing interferometer signal $P_{Laser}$ to arise, may be determined from a ratio of the moduli of wavelet coefficients generated from two different types of mother wavelet wherein, for example, each wavelet basis has the general form:

$$\left[\psi^{\alpha}_{\beta}(t)\right]_{TypeM} = \frac{1}{\sqrt{\alpha}}\Psi_M\left(\frac{t-\beta}{\alpha}\right)$$

$$\left[\hat{f}^{\alpha}_{\beta}\right]_{TypeM} = \int P_{Laser}(t)\left[\psi^{\alpha}_{\beta}(t)\right]_{TypeM}dt$$

The estimate of the radius, a, of a particle may be defined as:

$$a = \xi_d\frac{\left|\left[\hat{f}^{\alpha}_{\beta}\right]\right|_{Type1}}{\left|\left[\hat{f}^{\alpha}_{\beta}\right]\right|_{Type2}}$$

Here, the coefficient $\xi_d$ is a pre-set calibration coefficient. That is to say, the inventors have discovered that, at a given distance, d, from the laser resonator cavity of the self-mixing interferometer, the radius of a particle, a, may be sufficiently large to cause a non-negligible feedback levels C to occur within the laser resonator cavity. In aspects of the invention, the processing module of the self-mixing interferometer may be configured to determine this property of particulate, e.g., as disclosed herein. The onset of these conditions are determined by the radius of the particle, which influences its scattering cross-section, and its distance from the laser resonator cavity which influences the intensity of the returned light injected into the laser resonator cavity. These two parameters, particle radius and distance, are found to be correlated to the onset and magnitude of the feedback level C which are detectable via a comparison of different "types" (i.e., 'spike' vs. not 'spiky') of mother wavelets used to represent the same self-mixing interferometer signal.

For example, wavelet coefficients, $$\left|\hat{f}^{j}_{n}\right|,$$

may be generated from two different types of mother wavelet and corresponding to the same scale $\alpha=2^j$ and the same time location $\beta=n2^j$, as follows:

$$\left[\psi^{j}_{n}(t)\right]_{TypeM} = \frac{1}{\sqrt{2^j}}\Psi_M\left(\frac{t-n2^j}{2^j}\right)$$

$$\left[\hat{f}^{j}_{n}\right]_{TypeM} = \int P_{Laser}(t)\left[\psi^{j}_{n}(t)\right]_{TypeM}dt$$

Such that:

$$a = \xi_d \frac{\left\|\left[\hat{f}^j_n\right]\right\|_{Type1}}{\left\|\left[\hat{f}^j_n\right]\right\|_{Type2}}$$

The value of the pre-set calibration coefficient $\xi_d$ may be determined by pre-calibration performed in controlled conditions wherein a number of particles each having a different known radius a are separately passed through the laser beam of specified beam geometry and beam intensity, at a number of pre-set distances d (or average distance $\langle d \rangle$) from the laser resonator cavity of the self-mixing interferometer. In aspects of the invention, the processing module of the self-mixing interferometer may be configured to determine this property of particulate, e.g., as disclosed herein. The ratio of the moduli of wavelet coefficients generated from two different types of mother wavelet applied to the same self-mixing interferometric signal may be measured for each individual known particle radius for each individual pre-set distance included in the pre-calibration process. A look-up table or other addressable data array may be generated in which the input values of the measured ratio of the moduli of wavelet coefficients and the measured estimate of the distance d (or average distance $\langle d \rangle$) results in an output value, from the look-up table, of the pre-set calibration coefficient $\xi_d$ associated with those input values. The estimate of the distance d (or average distance $\langle d \rangle$) may be obtained using any of the methods disclosed herein. This pre-set calibration coefficient $\xi_d$ may also be associated with pre-calibrated values of: speed; path direction/orientation. Accordingly, a combination of input values comprising two or more of: the ratio of the moduli of wavelet coefficients; an associated measured particle speed; an associated measured particle path direction/orientation; an associated measured particle distance from the laser, may be used to return a pre-set calibration coefficient $\xi_d$ from the look-up table or addressable data array using these measurements.

The two different types of mother wavelet differ in the sense that the maximum value of the time derivative of the mother wavelet of one type exceeds the maximum value of the time derivative of the mother wavelet of the other type. In other words, one mother wavelet is "spikier" than the other. Examples of suitable 'types' of mother wavelets from which to select the include, but are not limited to, the following:

TYPE1 (less "spiky"): Morlet; Meyer; Paul; DOG; Mexican Hat; . . .

TYPE2 (more "spiky"): Daubechies1; Daubechies2; Daubechies4; . . . . Daubechies (order: N>4); . . .

For example:

$$a = \xi_d \frac{\left\|\left[\hat{f}^\alpha_\beta\right]\right\|_{Morlet}}{\left\|\left[\hat{f}^\alpha_\beta\right]\right\|_{Deubechies2}}$$

Frequency-Space Scalogram Structures and Particle Size

Figure 15:
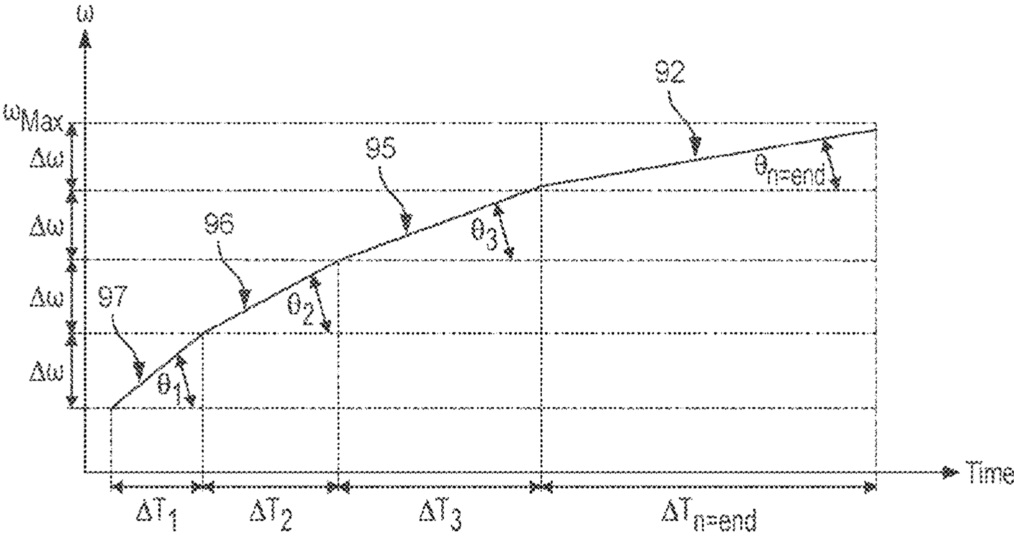
FIG. 15 shows an example of a spectrogram or scalogram for a self-mixing interferometric signal.

The inventors have discovered that structures present in the data representing a wavelet scalogram or a Fourier scalogram (e.g., spectrogram) may be used to provide an estimate of the radius a of the particle to which the scalogram relates. FIG. 15 shows a schematic representation of a scalogram, such as a wavelet scalogram corresponding to a self-mixing interferometer signal. The scalogram is shown as comprising a succession of short segments (97, 96, 95, 92) each of which span a frequency range of interval size $\Delta\omega$ defining a short frequency 'bin'. Each short segment of the scalogram spans a frequency bin of the same interval size $\Delta\omega$ but spanning a unique interval of frequencies in which the end of one interval is contiguous with the start of the next interval.

The frequency range spanned by the interval size $\Delta\omega$ is selected such that the distribution of the data describing the scalogram within that frequency range is approximately linear, or can be sufficiently accurately represented as having a substantially constant (or sufficiently slowly changing) value of slope, $S_n$, defined as:

$$S_n = \frac{\Delta\omega}{\Delta T_n}$$

Here, the time interval $\Delta T_n$ is the interval of time over which the data describing the scalogram within the $n^{th}$ interval $\Delta\omega$ extends. In aspects of the invention, the processing module of the self-mixing interferometer may be configured to determine this slope value, e.g., as disclosed herein. Here, increasing the integer n corresponds to increasing time. It is found that if the scalogram is a wavelet scalogram then the value of slope, $S_n$, tends to progressively diminish at locations along the distribution of the scalogram data located at progressively higher frequency, $\omega$, closer to outer terminal ends of the data distribution in the scalogram. In particular, the slope $S_n$ of the $n^{th}$ interval $\Delta\omega$ defines an angle $\theta_n = \tan^{-1}(S_n)$ which is smaller as the time interval $\Delta T_n$ in question associated with ever higher frequency values becomes ever longer, while the interval $\Delta\omega$ remains constant in size. This arises due to a path of a particle being increasingly closer to an orientation that is perpendicular to the wavefronts of the laser light within the laser beam it traverses. For a given particle velocity, the highest possible frequency component of the self-mixing interferometric signal occurs if path of a particle has an orientation that is perpendicular to the wavefronts of the laser light. If a particle path, for a given speed of particle, is not perpendicular to the wavefronts of the laser light, it may still become closer to achieving (without actually achieving) a perpendicular orientation when it is the furthest from the laser resonator, whilst still being within the laser beam. Of course, for a laser beam of finite beam divergence angle, $\eta$, there comes a point when the particle is no longer (or not yet) within the beam and this approach towards a perpendicular orientation cannot continue. However, the greater the distance from the laser resonator cavity that the particle can achieve whilst still being able to return to the laser resonator cavity a sufficient amount of reflected/scattered light to induce a self-mixing interferometer signal, then the greater will be the highest frequency component of the induced self-mixing interferometer signal. Accordingly, the smaller will be the slope $S_n$ of the scalogram data distribution associated with the frequency bin $\Delta\omega$ containing that highest frequency component. In FIG. 15, one can see a succession of time intervals $\Delta T_1 < \Delta T_2 < \Delta T_3 < \Delta T_{end}$ each associated with data corresponding to a frequency bin $\Delta\omega$ centred upon a respective frequency located at successively higher frequency value and defining a respective segment (97, 96, 95, 92) of the data representing the scalogram. The terminal data segment 92 has the smallest value of slope $S_n = S_{end}$ and the smallest value of segment angle $\theta_{end} = \tan^{-1}(S_{end})$. Accordingly, this segment of the data representing the scalogram corresponds to a situation in which the orientation of the particle path had made its closest approach towards a perpendicular orientation relative to the wavefronts of the laser beam bathing it. The inventors have found that larger particles are able to return to the laser resonator cavity a sufficient amount of reflected/scattered light to induce a self-mixing interferometer signal whilst at a greater distance from the laser resonator cavity simply because they have a greater scattering cross-section. This means that the larger a particle is, the smaller will be the value of the slope $S_{end}$ of the data describing the terminal segment of the scalogram of the self-mixing interferometer signal associated with that particle. The inventors have found that for sufficiently small values of the slope $S_{end}$ of the data describing the terminal segment of the scalogram, the inverse value of the slope correlates to maximum distance $d_{Max}$ that a particle can be from the laser resonator cavity while returning a sufficient amount of reflected/scattered light to induce a self-mixing interferometer signal the radius. In turn, that sufficient amount of reflected/scattered light is correlated with the radius, a, of the particle in question such that:

$$a = \epsilon \frac{\Delta T_{end}}{\Delta \omega} = \frac{\epsilon}{S_{end}}$$

Here, $\in$ is a pre-set calibration coefficient. In aspects of the invention, the processing module of the self-mixing interferometer may be configured to determine this property of particulate, e.g., as disclosed herein. For example, one may apply:

$$S_{end} = \left[\tan\left(\frac{\pi}{2} - \theta_H\right)\right]_{end}$$

Here, $\theta_H$ is an angle of inclination detected via a Hough transform space as discussed above with reference to FIG. 13A and FIG. 13B. Preferably, one may apply the following thresholding constraint that:

$$S_{end} < S_{Threshold}$$

Here, the value of $S_{Threshold}$ may be determined by a calibration process and according to user preferences. Smaller values of $S_{Threshold}$ will ensure that the permitted values of $S_{end}$ used to calculate the particle radius, correspond to particle paths oriented closer to being perpendicular to the wavefronts of the light of the laser beam. The value of the pre-set calibration coefficient $\in$ may be determined by pre-calibration performed in controlled conditions wherein a number of particles each having a different known radius $a_{Calib}$ are separately passed through the laser beam of specified beam geometry and beam intensity, at a number of pre-set orientations (angle ¢ relative to the beam axis) sufficient in value to achieve the condition $S_{end} < S_{Threshold}$ in the resulting scalogram, and from that data a value $\in = a_{calib} S_{end}$ may be assigned to that laser.

Signal Duration and Distance

The inventors have discovered that an estimate, (d), of the distance of a particle from a self-mixing laser interferometer cavity, may be made according to the number, $N_{Cycles}$, of wave cycles present in the waveform of the self-mixing interferometric signal, $P_{Laser}(t)$, generated by that laser cavity as follows:

$$\langle d \rangle = \rho N_{Cycles}$$

Here, ρ is a pre-set calibration coefficient. The value of this pre-set calibration coefficient may be determined for the laser interferometer in question, which produces a laser beam of specified wavelength and beam geometry, by pre-calibration performed in controlled conditions wherein particles are passed through the laser beam at a range of different known distances, ⟨d⟩, from the laser resonator cavity. The number of wave cycles present in the waveform of the self-mixing interferometric signal may be measured for each individual value of calibration distance ⟨d⟩ from the laser, included in the pre-calibration process. A look-up table or other addressable data array may be generated in which an input value of the number, $N_{cycles}$, of wave cycles in the self-mixing interferometric signal results in an output value, from the look-up table, of the pre-set calibration coefficient ρ associated with that laser. This pre-set calibration coefficient may be a constant value that is independent of the number, $N_{Cycles}$, of cycles in the self-mixing interferometric signal, in which case the look-up table may be unnecessary, and the value of the pre-set calibration constant may be explicitly expressed as a constant numerical value in the above equation defining the distance estimate ⟨d⟩. Alternatively, if the calibration process determines that, for a given laser bean geometry and laser wavelength, the pre-set calibration coefficient shows a non-negligible variation with the value of $N_{cycles}$ (i.e., that $\rho = \rho(N_{Cycles})$ is a function of $N_{Cycles}$), then the look-up table may capture this variation and provide a more accurate calibration coefficient providing a better estimate of the particle distance ⟨d⟩ in terms of the value of the number, $N_{Cycles}$, of cycles in the self-mixing interferometric signal.

FIGS. 12B and 12C show schematic examples of how the distance (d) of a particle (4, 4') from a laser interferometer cavity 1 influences the number of curved wavefronts 10 of the laser light that the path (7, 7') of the particle must cross as it traverses the laser beam. Each wavefront crossing corresponds to a full wave cycle in the waveform (90, 91) of the interferometric signal generated by the laser interferometer. A particle path 7 twice as far from the laser cavity of the interferometer may generate twice as many ($N_{Cycles}$) wave cycles within the interferometric waveform as are produced in the interferometric waveform generated by the same laser interferometer by a particle following a parallel path at half the distance from the laser. For example, in the schematic diagram of FIG. 12B, the more distant path 7 of the particle 4 is approximately (but not exactly) twice as far from the laser resonator cavity 1 as is the less distant path 7' of the particle 4'. For this reason, the number ($N_{Cycles} \approx 16$) of wave cycles in the waveform of the interferometric signal 90 corresponding to the more distant path 7 is approximately twice the number ($N_{Cycles} \approx 8$) of cycles in the interferometric signal 91 corresponding to the less distant path 7.

In aspects of the invention, the processing module of the self-mixing interferometer may be configured to determine this property of particulate, e.g., as disclosed herein. In aspects of the invention, this feature may be employed to determine an estimate of a position of a particle in a two-dimensional coordinate system containing two lasers, or an estimate of a position of a particle in a three-dimensional coordinate system containing three lasers.

Figure 16A:
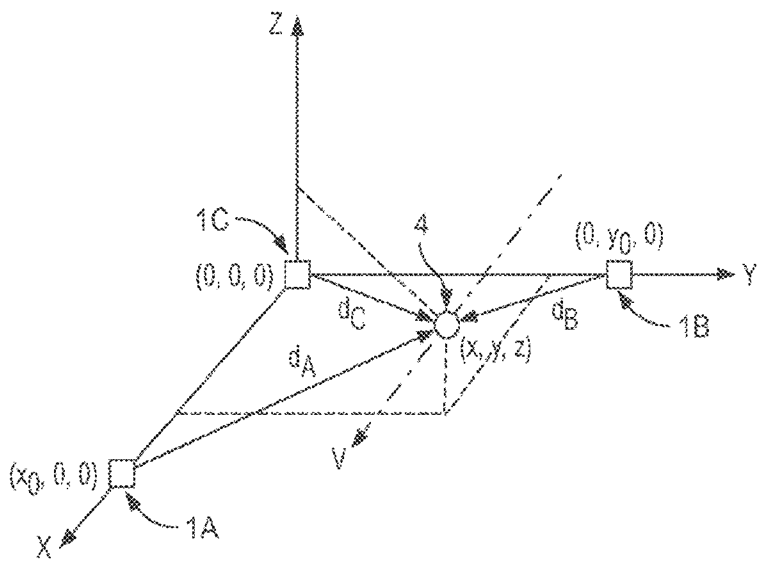
FIG. 16A shows an array of self-mixing interferometers employed in determining a particle position.

Referring to FIG. 16A, there is shown a schematic representation of a three-dimensional coordinate system (x, y, z) of orthogonal axis in which a first laser 1A is located upon the x-axis at coordinate ($x_0$,0,0), a second laser 1B is located upon the y-axis at coordinate (0,$y_0$,0), and a third laser 1C is located at the origin of coordinates (0,0,0). Consider a particle 4 located within this coordinate system at position at position (x,y,z). It has a radial distance $d_A$ from the first laser 1A, a radial distance de from the second laser 1B, and a radial distance $d_C$ from the third laser 1C. The coordinate of the particle is therefore the location of intersection of the three circles of radius $d_A$, $d_B$, and $d_C$, centred at the three lasers 1A, 1B and 1C respectively. This condition satisfies the following system of simultaneous equations:

$$(x-x_0)^2+y^2+z^2=d_A^2$$

$$x^2+(y-y_0)^2+z^2=d_B^2$$

$$x^2+y^2+z^2=d_C^2$$

Solving these equations for x, y and z gives:

$$x=\frac{x_0^2-(d_A^2-d_C^2)}{2x_0}$$

$$y=\frac{y_0^2-(d_B^2-d_C^2)}{2y_0}$$

$$z=\sqrt{d_C^2-(x^2+y^2)}$$

Here, the distances are known from the measurements, made using each of the three lasers, 1A, 1B and 1C, of the number of wave cycles, $[N_{Cycles}]_A$, $[N_{Cycles}]_B$ and $[N_{Cycles}]_C$, in the respective waveforms of the interferometric signals generated by each laser in response to the passing of the particle 4 though each of the three laser beams. In particular:

$$d_A=\langle d\rangle_A=\rho_A[N_{Cycles}]_A$$

$$d_B=\langle d\rangle_B=\rho_B[N_{Cycles}]_B$$

$$d_C=\langle d\rangle_C=\rho_C[N_{Cycles}]_C$$

Figure 16B:
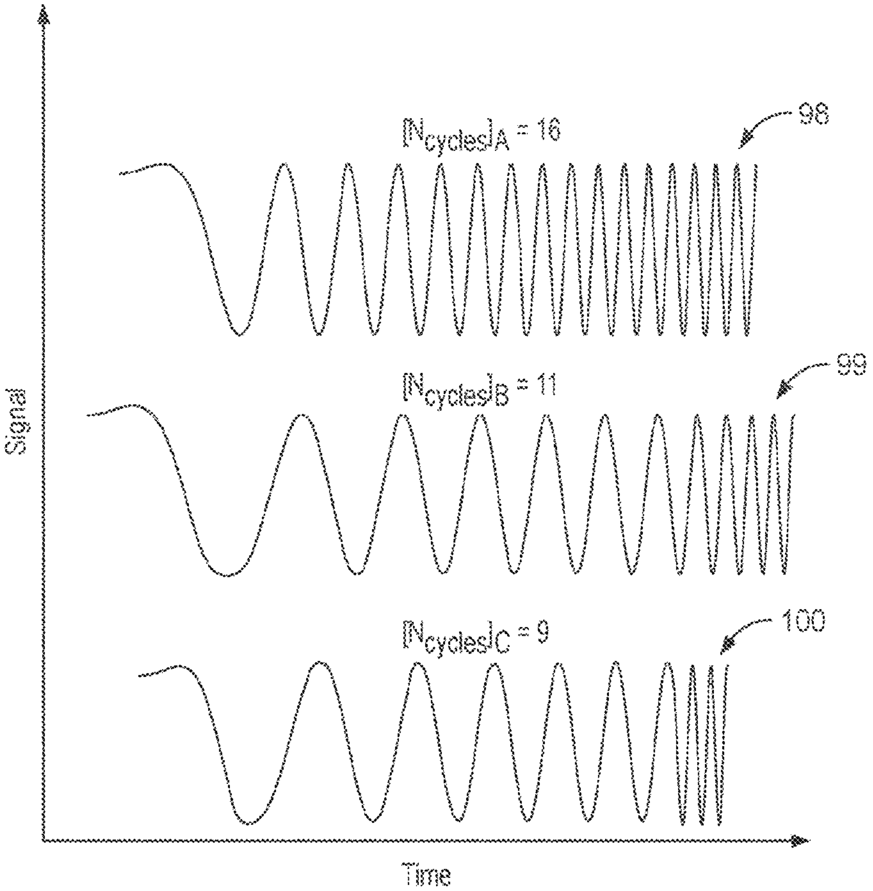
FIG. 16B schematically shows interferometer signals generated by the array of self-mixing interferometers of FIG. 16A.

This distance estimate is substantially independent of the speed, v, of the particle in question because the number of wave cycles produces does not depend on the speed with which the particle passes though the successive wavefronts of the laser beam in question. FIG. 16B schematically shows an example of the three interferometric signals (98, 99, 100) produced by the three lasers, 1A, 1B and 1C due to the passage of one particle 4 through each beam. Here:

$$[N_{Cycles}]_A=16$$

$$[N_{Cycles}]_B=11$$

$$[N_{Cycles}]_C=9$$

This means that $\langle d\rangle_A=16\rho_A$, and $\langle d\rangle_B=11\rho_B$ and $\langle d\rangle_C=9\rho_C$. Each of the three lasers has assigned to it a respective value of calibration constant, $\rho_A$, $\rho_B$ and $\rho_C$. The values of x, y and z may be determined as described above, accordingly. It will be appreciated that the above techniques may also be applied to other configurations in which only two lasers (e.g., Laser 1B and laser 1C) are present (i.e., laser 1A is absent) such that a coordinate position of the particle within a two-dimensional coordinate system in the z-y plane, may be determined by setting $x_0=0$ and $d_A=d_C$ in the above equations, to yield:

$$y=\frac{y_0^2-(d_B^2-d_C^2)}{2y_0}$$

$$z=\sqrt{d_C^2-(y^2)}$$

The interferometric signals (98, 99, 100) may be overlapping in time while the particle is within all three laser beams simultaneously, though the interferometric signals need not be entirely overlapping with each other from beginning to end because the particle may enter and exit different laser beams, amongst the three laser beams, at slightly different respective times depending on the geometry of the laser beams and the manner of their overlap.

Laser Beam Shape

Figure 17A:
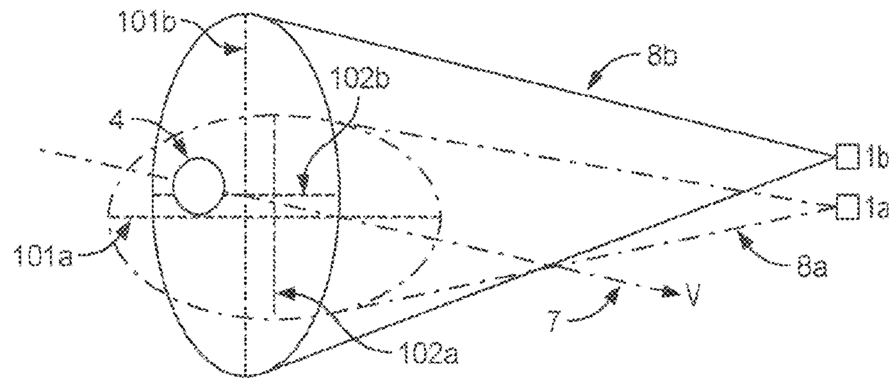
FIG. 17A shows an array of self-mixing interferometers employed in determining a particle property.

FIG. 17A shows an array of two separate self-mixing interferometers, 1*a* and 1*b*, employed in determining a particle property including particle speed v and/or particle distance $d_0$. Each one of the two self-mixing interferometers is as described herein with reference, for example, to FIG. 2A (or FIG. 3 or FIG. 4 for example) and each is configured to produce a diverging conical laser beam (or a moving laser beam which is moved in such a way as to bathe a region defined by a diverging cone). The cross-sectional shape of each of the two respective laser beam cones, in a direction perpendicular to the longitudinal axis of the laser beam cone, is non-circular. The cross-sectional shape of each of the two laser beam cones defines a respective shape which is longest along a first axis perpendicular to the longitudinal axis of the laser beam cone and is shortest along a second axis that is perpendicular to the first axis and perpendicular to the longitudinal axis of the laser beam cone. The first axis of one of the laser beam cones is non-parallel to the first axis of one of the other of the laser beam cones. In this way, the cross-sectional shape of each one of the two laser beam cones is elongated along the respective first axis and these elongation axes are oblique relative to each other.

For example, in aspects of the invention in which the self-mixing interferometers, 1*a* and 1*b*, each produces a respective static conical laser beam, the cross-sectional shape of each of the two respective laser beam cones may be elliptical. For example, the elliptical cross-sectional shape of a first laser beam cone 8*a* generated by a first self-mixing interferometer 1*a* may comprise an ellipse major axis 101*a* and an ellipse minor axis 102*a*. Similarly, the elliptical cross-sectional shape of a second laser beam cone 8*b* generated by a second self-mixing interferometer 1*b* may comprise an ellipse major axis 101*b* and an ellipse minor axis 102*b*. These elliptical cross-sectional shapes may be generated by the use of astigmatic optics within the optical assembly (item 1B, FIG. 2A) of the respective self-mixing interferometer (1*a*, 1*b*). The first axis 101*a* of the laser beam cone produced by the first self-mixing interferometer, 1*a*, is non-parallel to (e.g., approximately perpendicular to) the first axis 101*b* of the laser beam cone produced by the second self-mixing interferometers, 1*b*. In this way, the cross-sectional shape of each one of the two laser beam cones is elongated along the respective first axis and these elongation axes are oblique relative to each other.

The two laser beam cones (8*a*, 8*b*) are configured to overlap such that a region of space exists which is simultaneously bathed by laser light from each one of the two self-mixing interferometers (1*a*, 1*b*). This region of overlap defines a mutual sensing region in which the two self-mixing interferometers (1*a*, 1*b*) may operate in synergy for determining a particle speed v and/or particle distance do of a particle 4 moving along a path 7 passing through the mutual sensing region, as follows.

Figure 17B:
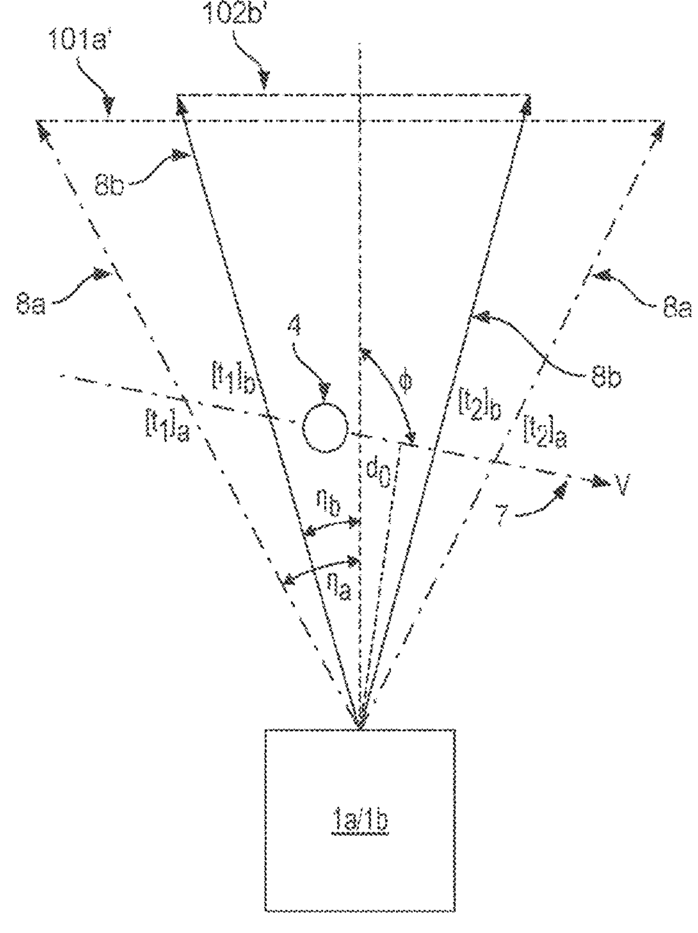
FIG. 17B schematically shows a plane view of the array of self-mixing interferometers of FIG. 17A comprising the planar cross-section of the laser beams of each interferometer containing the individual interferometers and the path of the particle through the respective laser beams.

FIG. 17B schematically shows a plane view of the array of two self-mixing interferometers of FIG. 17A. Here, the plane view comprises the planar cross-section of the laser beam cone 8*a* of the first of the two laser interferometers 1*a*, that contains both the laser interferometer 1*a* and the path 7 of the particle 4 through the first laser beam cone 8*a*. In addition, the plane view also comprises the planar cross-section of the laser beam cone 8*b* of the second of the two laser interferometers 1*b*, that contains both the laser interferometer 1*b* and the path 7 of the particle 4 through the second laser beam cone 8*b*. The planar cross-section of the laser beam cone 8*a* of the first of the two laser interferometers 1*a*, defines a triangle with divergence angle $\eta_a$. Similarly, the planar cross-section of the laser beam cone 8*b* of the second of the two laser interferometers 1*b*, defines a triangle with divergence angle $\eta_b$. Notably, because the orientation of the path 7 of the particle is relatively less oblique to the major axis 101*a* of the first laser beam cone 8*a* and relatively more oblique to the major axis 101*b* of the second laser beam cone 8*b*, the consequence is that a greater proportion of the particle path 7 intersects the first laser beam cone 8*a* than the second laser beam cone 8*b*. This is the reason for the difference $\Delta\eta=(\eta_a-\eta_b)$ between the divergence angles of the planar cross-sections of the first and second laser beam cones (8*a*, 8*b*). The inventors have realised that this difference may be exploited to allow estimates to be made of the particle speed v and/or particle distance $d_0$.

Referring to FIG. 17B, the path 7 of the particle 4 subtends an angle ϕ relative to the longitudinal axis of each of the first and second laser beam cones (8*a*, 8*b*). Here, the example assumes that the longitudinal axes of each of the first and second laser beam cones (8*a*, 8*b*) are substantially parallel such that the angle ¢ is common to both, but this need not be the case. Consider that the particle 4 enters and leaves the first laser beam cone 8*a* at times $[t_1]_a$ and $[t_2]_a$, respectively, and enters and leaves the second laser beam cone 8*b* at times $[t_1]_b$ and $[t_2]_b$, respectively. Let the length of the path 7 of the particle within the first laser beam cone 8*a* be $s_a$, and let the section of that length of the path 7 within the second laser beam cone 8*b* be $s_b$ (which is a part of $s_a$). Consider also, that the particle path 7 forms a tangent to the wavefronts of the laser light in each of the first and second laser beams, 8*a* and 8*b*, simultaneously when the particle 4 is at a distance $d_0$ from the respective lasers 1*a* and 1*b*. The distance $d_0$ corresponds to the closest point of approach of the particle whilst within both laser beam cones. One can see that:

$$v([t_2]_a-[t_1]_a)=s_a$$

$$v([t_2]_b-[t_1]_b)=s_b$$

It can be shown that:

$$T_i=\frac{d_0}{v}\left[\frac{\sin(2\eta_i)}{\sin(\phi_i-\eta_i)\sin(\phi_i+\eta_i)}\right]$$

Here, $T_i=([t_2]_i-[t_1]_i)$ is the time taken for the particle to pass through the given laser beam i=a, b.

Particle Path Orientation & Laser Beam Divergence

From the above equation one can see that:

$$\frac{T_i}{d_0}=\frac{1}{v}\left[\frac{\sin(2\eta_i)}{\sin(\phi_i-\eta_i)\sin(\phi_i+\eta_i)}\right]$$

Referring to FIG. 12B, we may note that the instantaneous value of the frequency of an interferometric waveform signal at its very beginning corresponding to the instant in time when a particle 4 enters the laser beam 8*a*, is given in terms of the rate of change of the separation, l, between the particle and the laser resonator cavity in a direction perpendicular to the wavefronts of the laser light within the laser beam, $$\text{by: }\omega_1=\frac{4\pi}{\lambda}\left[\frac{dl}{dt}\right]_1=v\frac{4\pi}{\lambda}\cos(\pi-\alpha)$$

Similarly, the instantaneous value of the frequency of the interferometric waveform signal at its very end corresponding to the instant in time when a particle 4 exits the laser beam 8*a*, is given by:

$$\omega_2=\frac{4\pi}{\lambda}\left[\frac{dl}{dt}\right]_2=v\frac{4\pi}{\lambda}\cos(\beta)$$

Here, the angles α and β are subtended between the local edge of the laser beam and the path 7 of the particle where it intersects that beam edge. The angle resides outside of the laser beam between the particle path 7 and those parts of the beam edge propagating away from the point of intersection.

By geometry, one can see that $\pi-\alpha=\phi+\eta$ and $\beta=\phi-\eta$, such that:

$$\cos^{-1}\left[\frac{\omega_1\lambda}{4\pi v}\right]=\phi+\eta$$

$$\cos^{-1}\left[\frac{\omega_2\lambda}{4\pi v}\right]=\phi-\eta$$

Thus:

$$\phi=\frac{1}{2}\left\{\cos^{-1}\left[\frac{\omega_1\lambda}{4\pi v}\right]+\cos^{-1}\left[\frac{\omega_2\lambda}{4\pi v}\right]\right\}$$

$$\eta=\frac{1}{2}\left\{\cos^{-1}\left[\frac{\omega_1\lambda}{4\pi v}\right]-\cos^{-1}\left[\frac{w_2\lambda}{4\pi v}\right]\right\}$$

Accordingly, since the wavelength of the laser light bathing the monitored region, λ, is known and given that the speed, v, may be determined according to a method disclosed herein, one may measure the orientation, ϕ, between the particle path 7 and the longitudinal axis of the laser beam, as well as the beam divergence angle, η, using the instantaneous values $\omega_1$ and $\omega_2$ of the frequency of the interferometric waveform at the start and end of the waveform. In aspects of the invention, the processing module of the self-mixing interferometer may be configured to determine the orientation, ¢, and/or the beam divergence angle, η, e.g., as disclosed herein.

In addition, noting that:

$$2\eta=\left\{\cos^{-1}\left[\frac{\omega_1\lambda}{4\pi v}\right]-\cos^{-1}\left[\frac{\omega_2\lambda}{4\pi v}\right]\right\}$$

and noting the following trigonometric identity:

$$\cos^{-1}(X)-\cos^{-1}(Y)=\cos^{-1}\left[XY+\sqrt{(1-X^2)(1-Y^2)}\right]$$

It can be seen that:

$$2\eta=\cos^{-1}\left(\left(\frac{\omega_1\lambda}{4\pi v}\right)\left(\frac{\omega_2\lambda}{4\pi v}\right)+\sqrt{\left(1-\left(\frac{\omega_1\lambda}{4\pi v}\right)^2\right)\left(1-\left(\frac{\omega_2\lambda}{4\pi v}\right)^2\right)}\right)$$

Rearranging this expression gives in terms of the particle speed, v, gives:

$$v=\left(\frac{\lambda}{4\pi}\right)\sqrt{\frac{2\omega_1\omega_2\cos(2\eta)-(\omega_1^2+\omega_2^2)}{\cos^2(2\eta)-1}}$$

Accordingly, the speed of a particle may be determined according to the beam divergence angle, η, which may be a pre-set known value, and the instantaneous values of the frequency of the interferometric waveform at the times when the particle enters and exits the laser beam. In aspects of the invention, the processing module of the self-mixing interferometer may be configured to determine the particle speed, v, e.g., as disclosed herein. It is noted that when $\eta\rightarrow 0$, and the diverging laser beam becomes a collimated laser beam with substantially flat wavefronts (e.g., see FIG. 2D), then $\omega_1-\omega_2$ and the interferometric signal waveform has a single constant frequency ω, resulting in a flat and continuous scalogram structure (e.g., see FIG. 10) such that $v\propto\lambda\omega/4\pi$. In aspects of the invention in which the self-mixing interferometer is configured to produce a collimated laser beam with substantially flat wavefronts, the processing module of the self-mixing interferometer may be configured to determine the particle speed e.g., as disclosed herein.

From the following equation, noted above:

$$\frac{T_i}{d_0}=\frac{1}{v}\left[\frac{\sin(2\eta_i)}{\sin(\phi_i-\eta_i)\sin(\phi_i+\eta_i)}\right]$$

In aspects of the invention, the processing module of the self-mixing interferometer may be configured to determine the value of the ratio, $v/d_0$, according to the above equation, e.g., as disclosed herein.

one can see that differences in the duration $T_i$ of particle passage through a laser beam change according to changes in the cone divergence angle $\eta_i$ as follows:

$$\frac{dT_i}{d\eta_i}=\frac{4d_0}{v}\left[\frac{1-\cos(2\eta_i)\cos(2\phi_i)}{(\cos(2\eta_i)-\cos(2\phi_i))^2}\right]$$

By combining the expression for $T_i$ with the expression for $dT_i/d\eta_i$ to eliminate the terms relating to the angle $\phi_i$, we see that:

$$\frac{dT_i}{d\eta_i}=\frac{vT_i^2}{d_0}\left[1+\frac{2d_0}{vT_i}\cos(2\eta_i)\right]$$

The inventors have appreciated that if we let: $\Delta T=T_a-T_b$, and $\Delta\eta=\eta_a-\eta_b$, then to a good approximation, one may define:

$$\frac{\Delta T}{\Delta\eta}\approx\frac{dT_i}{d\eta_i}=\frac{vT_i^2}{d_0}\left[1+\frac{2d_0}{vT_i}\cot(2\eta_i)\right]$$

Rearranging this equation provides the following useful relationship:

$$\frac{v}{d_0}\approx\frac{\left(\frac{\Delta T}{\Delta\eta}\right)-2T_i\cot(2\eta_i)}{T_i^2}$$

Given that the quantities $\eta_i$, Δη, $T_a$, $T_b$ and ΔT are all determinable by measurements taken by the processing module of the self-mixing interferometer from the interferometric signals generated by the two self-mixing interferometers 1*a* and 1*b*, the processing module of the self-mixing interferometer may determine the ratio, $v/d_0$, of the speed v and the distance do of closest approach of the particle whilst within both laser beam cones.

This relation holds for each one of the two self-mixing interferometers 1*a* and 1*b*, in the sense that the value of the ratio $v/d_0$ is the same for each, such that:

$$\frac{\left(\frac{\Delta T}{\Delta\eta}\right)-2T_a\cot(2\eta_a)}{T_a^2}=\frac{\left(\frac{\Delta T}{\Delta\eta}\right)-2T_b\cot(2\eta_b)}{T_b^2}$$

This leads to:

$$F(\eta_a,\Delta\eta)=1-\left\{\frac{\left(\frac{\Delta T}{\Delta\eta}\right)\left[1-\left(\frac{T_a}{T_b}\right)^2\right]}{2T_a\cot(2\eta_a)-2T_b\left(\frac{T_a}{T_b}\right)^2\cot(2\eta_a+2\Delta\eta)}\right\}$$

Here, $F(\eta_a, \Delta\eta)\equiv 0$. As an alternative, or additional, method for determining the beam divergence angles, η, one may numerically or iteratively calculate the quantity $F(\eta_a, \Delta\eta)$. Given that the quantities $T_a$, $T_b$ and ΔT are all known by measurements taken by the processing module of the self-mixing interferometer from the interferometric signals generated by the two self-mixing interferometers 1*a* and 1*b*, the processing module of the self-mixing interferometer may then determine the values of $\eta_a$ and Δη that produce a value of the right-hand side of the above equation that is acceptably small to approximate a value of zero (i.e., $F(\eta_a,\Delta\eta)\equiv 0$) for practical purposes. A numerical optimisation or minimisation algorithm may be employed, such as is readily apparent and available to the skilled person, to find the minimum of the function $F(\eta_a, \Delta\eta)$ for this purpose. Once the values of the values of $\eta_a$ and Δη have been determined, then the value of $\eta_b$ is simply: $\eta_b=\eta_a+\Delta\eta$. In aspects of the invention, the processing module of the self-mixing interferometer may be configured to determine this property of the beam divergence(s), e.g., as disclosed herein.

This means that with prior knowledge of the value of an estimate of particle speed v the processing module of the self-mixing interferometer may determine an estimate of the particle distance $d_0$ according to:

$$d_0 \approx \frac{vT_t^2}{\left(\frac{\Delta T}{\Delta\eta}\right) - 2T_i \cot(2\eta_i)}$$

Two estimates of the particle distance (i.e., $$d_0 = d_0^{(1)} \text{ and } d_0 = d_0^{(2)}$$

maybe made in which one estimate $$\left(d_0^{(1)}\right)$$

is according to the divergence angle ($\eta_1$) of one of the two laser beams and the other estimate $$\left(d_0^{(2)}\right)$$

is made according to the beam divergence angle ($\eta_2$) of the other one of the two beams, and a composite estimate may be determined as the average of these two estimates:

$$d_0 \frac{d_0^{(1)} + d_0^{(2)}}{2}$$

In aspects of the invention, the processing module of the self-mixing interferometer may be configured to determine this property of particulate material, e.g., as disclosed herein.

A prior estimate of particle speed v may be obtained by the processing module of the self-mixing interferometer using any of the techniques disclosed herein. One further example would be to determine, by the processing module of the self-mixing interferometer, an estimate for the speed v of the particle and its path angle $\phi_i$, by a process of fitting an equation given above for:

$$P_{Laser} = A + B\cos(\omega_s t + \varphi_0)$$

This may be achieved by applying an optimisation routine which varies the values of the speed v of the particle and its path angle $\phi_i$ within this analytical expression, iteratively in such a way as to minimise a difference, ΔP, between the measured interferometric signal waveform, $$P_{Laser}^{(i)}$$

generated by either the first laser interferometer 1_a_ (i.e., i=a) or generated by the second laser interferometer (i.e., i=b), and the analytical expression for the interferometric signal waveform, $P_{Laser}$, given above:

$$\Delta P^{(i)} = P_{Laser}^{(i)} - P_{Laser}$$

Once a sufficiently low value of $\Delta P^{(i)}$ is achieved, the corresponding values of v and $\phi_i$ required to achieve that condition may be identified as acceptable estimates of the true speed of the particle and its path angle, respectively.

Similarly, with prior knowledge of the value of an estimate of particle distance do the processing module of the self-mixing interferometer may determine an estimate of the speed v according to:

$$v \approx \frac{d_0}{T_i^2}\left[\left(\frac{\Delta T}{\Delta\eta}\right) - 2T_i \cot(2\eta_i)\right]$$

In aspects of the invention, the processing module of the self-mixing interferometer may be configured to determine this property of particulate material, e.g., as disclosed herein. A prior estimate of the particle distance $d_0$ may be obtained by the processing module of the self-mixing interferometer using any of the techniques disclosed herein. One example would be to determine the number of wave cycles, $[N_{Cycles}]_i$, within the self-mixing interferometric signal waveform generated by the first laser interferometer 1_a_ (i.e., i=a) or generated by the second laser interferometer (i.e., i=b) and then apply the relationship described in detail above, of the form:

$$d_0 = \rho_i [N_{Cycles}]_i$$

In this way, the self-mixing interferometer apparatus may comprise two separate self-mixing interferometers configured such that two differently oriented conical laser beams will have two different cross-sectional areas when crossed by the same particle-flow. By increasing the cone angle of one of the two beams in one axis/direction (e.g., of an ellipse) and the cone angle of the other laser beam in a different (e.g., the perpendicular) axis/direction, one creates differences in the two respective self-mixing interferometric signals for the same particle direction. In aspects of the invention, the processing module of the self-mixing interferometer may be configured to determine this property of particulate material, e.g., as disclosed herein. The inventors have realised that the analytical equation defined above is more generally applicable as follows:

$$\frac{v}{d_0} \approx \frac{\chi_i\left(\frac{\Delta T}{\Delta\eta}\right) - 2T_t \cot(2\eta_t)}{T_i^2}$$

Here, $\chi_i$ is a pre-set calibration coefficient stored within the processing module of the self-mixing interferometer. The value of this pre-set calibration coefficient may be determined for the laser interferometer in question, which produces a laser beam of specified wavelength and beam geometry, by pre-calibration performed in controlled conditions wherein particles are passed through the laser beam at a range of different known speeds v, known path angles $\phi_i$, and known distances, $d_0$, from the laser resonator cavity. Multiple calibration values of the quantity ΔT/Δη may be determined for each combination of known speed v and known distance do and known path angle $\phi_i$. From these multiple values of the quantity $\Delta T/\Delta\eta$ a representative single value of $\chi_i$ may be identified which sufficiently accurately reproduces the known value of the ratio $v/d_0$ according to the above equation for a sufficiently large proportion of the multiple calibration values of the quantity $\Delta T/\Delta\eta$. In aspects of the invention, the processing module of the self-mixing interferometer may be configured to determine this property of particulate material, e.g., as disclosed herein.

Figure 17C:
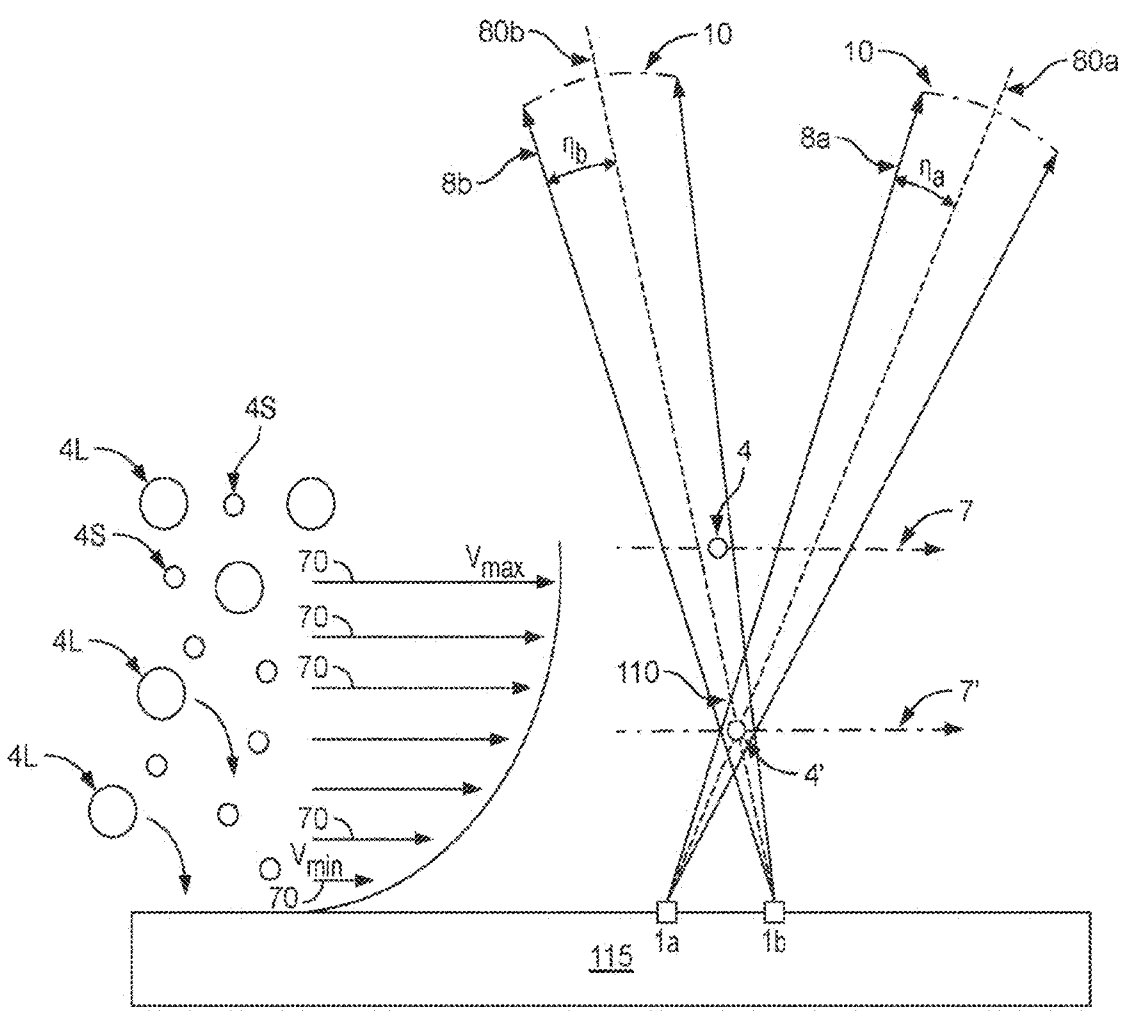
FIG. 17C schematically shows an array of self-mixing interferometers with crossed beams employed in determining a particle property.

FIG. 17C schematically shows another array of self-mixing interferometers employed in determining a particle property. This array comprises two separate self-mixing interferometers, 1*a* and 1*b*, attached to an article 115 (e.g., a portable article or support surface) employed in determining a particle property. Each one of the two self-mixing interferometers is as described herein with reference, for example, to FIG. 2A (or FIG. 3 or FIG. 4 for example) and each is configured to produce a diverging conical laser beam (or a moving laser beam which is moved in such a way as to bathe a region defined by a diverging cone). The cross-sectional shape of each of the two respective laser beam cones, in a plane parallel to the longitudinal axes (80*a*, 80*b*) of both of the laser beam cones, is shown in FIG. 17C. The longitudinal axis 80*a* of one of the laser beam cones 8*a* is non-parallel to the longitudinal axis 80*b* of the other of the laser beam cones 8*b*. In this way, the axes of the two laser beam cones extend in directions that cross each other obliquely to define a finite region of beam/cone overlap 110 in which laser light from both of the two beams exists concurrently. In other words, both lasers bathe this overlap region in laser light concurrently. The angle of divergence $\eta_a$ of the first laser beam cone 8*a* may or may not be the same as the angle of divergence $\eta_b$ of the second laser beam cone 8*b*. However, the respective cone angles of divergence and beam axis orientations defines both the position of the region of beam overlap 110 and the size of that region. In FIG. 17C, the two laser beams are shown as partially overlapping so as to define a finite region of overlap 110, such that cone overlap exists only within a certain finite range of distances from the two separate self-mixing interferometers, 1*a* and 1*b*, but does not exist outside of that finite range of distances. This preferred arrangement has particular advantages in restricting the spatial range of the overlap region 110 to a targeted region, centred at desired respective distances from the two separate self-mixing interferometers, 1*a* and 1*b*, for concurrent-beam monitoring of that targeted region. In general, an overlapping region of multiple divergent beams provides advantages in addition to the performances of non-overlapping beams. In aspects of the invention, the self-mixing interferometer may be configured to provide this property of multiple laser beams, e.g., as disclosed herein.

In particular, for example, two (or more) partially overlapping beams may be treated separately and individually for detected events involving the traversal of a given beam by a particle 4 if that event is not concurrently (i.e., simultaneously) detected in the other beam of the partially overlapping beams (i.e., if the events are not detected in coincidence). This would occur if the particle, such as particle 4 with particle path 7, traversing any one beam happens to traverse only those parts of the beam 8*b* that are not overlapping with the other beam 8*a* of the two partially overlapping beams (i.e., the particle does not traverse any part of the overlap region 110).

However, there is often, in practice, a finite probability that any one of the two separate self-mixing interferometers, 1*a* and 1*b*, might individually generate a signal that is purely the result of noise (e.g., electronic noise) at any given time. This noise signal may be misinterpreted as a genuine interferometric signal associated with a particle detection event (i.e., a "false positive"). This finite probability of a "false positive" exists for each one of the two separate self-mixing interferometers, 1*a* and 1*b*. However, it is generally the case that the probability of both of the two separate self-mixing interferometers, 1*a* and 1*b*, simultaneously generating a "false positive" signal concurrently (i.e., simultaneously) is much smaller that the probability of any one of them generating a false positive signal when the other does not (i.e., non-simultaneous false positives). Consequently, the overlap region between two overlapping laser beam cones, such as region 110 of FIG. 17C may be subject to a much lower rate of "false positive" detections. This means that there is a much higher probability that if both of the two separate self-mixing interferometers, 1*a* and 1*b*, generate concurrent interferometric signals, this is because a particle 4' truly has entered both laser beams 8*a* and 8*b* within the overlap region 110 along a particle path 7', and therefore the detection result can be used with a higher degree of confidence. This higher degree of confidence may be expressed numerically by applying different numerical weights to calculated values of particle properties depending on whether those properties were calculated based on an interferometric detection signal generated by:

(a) any one of two concurrent (simultaneous) such interferometric signals from the two self-mixing interferometers, 1*a* and 1*b*: Here a relatively higher weighting ($W_{con}$) may be applied; or;

(b) one non-concurrent such interferometric signal from one the two self-mixing interferometers, 1*a* and 1*b*: Here a relatively lower weighting ($W_{non-con}$) may be applied, where $W_{non-con}<W_{con}$.

In aspects of the invention, the processing module of the self-mixing interferometer may be configured to determine a property of particulate material according to a weighting method, e.g., as disclosed herein. In one example, $W_{non-con}=0$ and $W_{con}=1$, such that only concurrent interferometric signals are used for calculating particle properties. In another examples, $0<W_{non-con}<1$ and $0<W_{con}<1.0$, where $W_{non-con}<W_{con}$, such that all interferometric signals may be used to calculate particle properties. If both concurrent and non-concurrent interferometric signals are used to calculate particle properties, one may, for example, generate weighted average value of resulting calculated particle property according to the weights $W_{non-con}$ and $W_{con}$ being applied. Alternatively, one may calculate a numerical confidence value associated with a given calculated particle property according to (e.g., equal to) the weight applied to the interferometric signal used to calculate that property. For example, the weights may be applied at step S10 of the process described herein with reference to FIG. 18, or at step S32 of the process described herein with reference to FIG. 19.

The weights may be stored within the processing module of the self-mixing interferometer. The value of each weight may be determined for the laser interferometer in question, which produces a laser beam of specified wavelength and beam geometry, by pre-calibration performed in controlled conditions wherein particles are passed through the laser beam at a range of different known speeds v, known path angles $\phi_i$, known particle radii, a, and known distances, $d_0$, from the laser resonator cavity. Multiple estimates may then be made of any one or more of these known quantities by processing the interferometric signal of the self-mixing interferometer in each case, according to methods disclosed herein, and the value of the estimate may be compared to the known value of the quantity in question. A weight $W_{non-con}$ may be determined to quantify the probability that a non-concurrent interferometric signal was the result of a true interaction with a particle as opposed to merely noise. This may be defined as the ratio of the number of non-concurrent interferometric signals known to be true signals under the controlled conditions and the total number of all non-concurrent interferometric signals including both true signals and noise-induced signals. A weight $W_{con}$ may be determined to quantify the probability that two concurrent interferometric signals were the result of two true interactions with a particle as opposed to one or both being merely noise. This may be defined as the ratio of the number of concurrent interferometric signals known to be true signals under the controlled conditions and the total number of all concurrent interferometric signals including both true signals and noise-induced signals. The processing module of the self-mixing interferometer may be configured to store weights so determined.

If the laser beam geometry of each one of the two laser beams (8*a*, 8*b*) is known, as well as the relative orientations of the two laser beams, the position, volume and orientation of the overlap region 110 is known. Accordingly, an estimate of the distance of the particle from either one of the two separate self-mixing interferometers, 1*a* and 1*b*, may be better constrained by requiring that any distance calculated using any one of the interferometric signals one of the two separate self-mixing interferometers, 1*a* and 1*b*, is not greater than of less than all possible distances between the self-mixing interferometer in question and any point within the volume of the overlap region. Similarly, a step of normalising an event duration (e.g., interferometric signal duration) comprised in step S16 of the process described herein with reference to FIG. 18, or comprised in step S29 of the process described herein with reference to FIG. 19, may be better constrained by requiring that any duration calculated using any one of the interferometric signals one of the two separate self-mixing interferometers, 1*a* and 1*b*, is not greater than of less than all possible durations for a particle of a given speed, v, to cross a known dimension of volume of the overlap region.

The provision of the overlap region 110 provides greater robustness to variations of ambient gas flow speed (within which particles are entrained) across the detection volume 110 and against the effects of ambient gas flow speed in particle size distribution. For example, referring to FIG. 17C, a velocity profile 70 of the laminar flow of an ambient gas (e.g., air) over a surface of the article 115 is shown, with gas velocities being parallel to the surface of the article 115 and ranging from a minimum magnitude $v_{min}$ to a maximum speed $v_{max}$. Particles of two distinct diameters are shown schematically: smaller-diameter particles 4S and larger-diameter particles 4L. The fluid drag force experienced by each particle affects its ability to remain suspended within the laminar flow of gas 70, and lower gas flow speeds result in lower drag forces and a reduces suspensive effect. Particles of larger diameter become less able to resist being attracted to the surface of the article 115 by either one of, or a combination of, the effects of gravity or electrostatic (e.g., van der Waals) forces. The variation in particle diameters causes a corresponding alteration in the particle size distribution across the volume of detection provided by the two conical laser means 8*a* and 8*b*. This biases the perceived distribution of particle sizes unnaturally in favour of smaller particles.

The overlap region 110 may be positioned at a suitably large distance away from the surface of the article 115 to mitigate against this variation in the distribution of particle sizes, noting that such variation is less prevalent at greater distances from the surface of the article 115 where greater laminar gas flow speeds exist. In addition, the overlap region 110 may be positioned at a suitable small distance away from the surface of the article 115 to mitigate against the diminishing reflected/scattered laser light energy (decreasing inversely with the square of distance) one expects to receive at self-mixing interferometers, 1*a* and 1*b*, from a light-scattering particle as one increases the distance of that particle from the self-mixing interferometers. The user may find a suitable position of the overlap region 110 achieving a balance between these two competing requirements such that sufficient particle-scattered light energy is detectable while also adequately mitigating against the biassing effects of laminar gas flow. It is noted that the ability to obtain concurrent interferometric signals self-mixing interferometers, 1*a* and 1*b*, greatly assists in identifying "true positive" interferometric signals of weak intensity, as distinct from random noise likely to be misinterpreted as a weak signal.

Figure 17D:
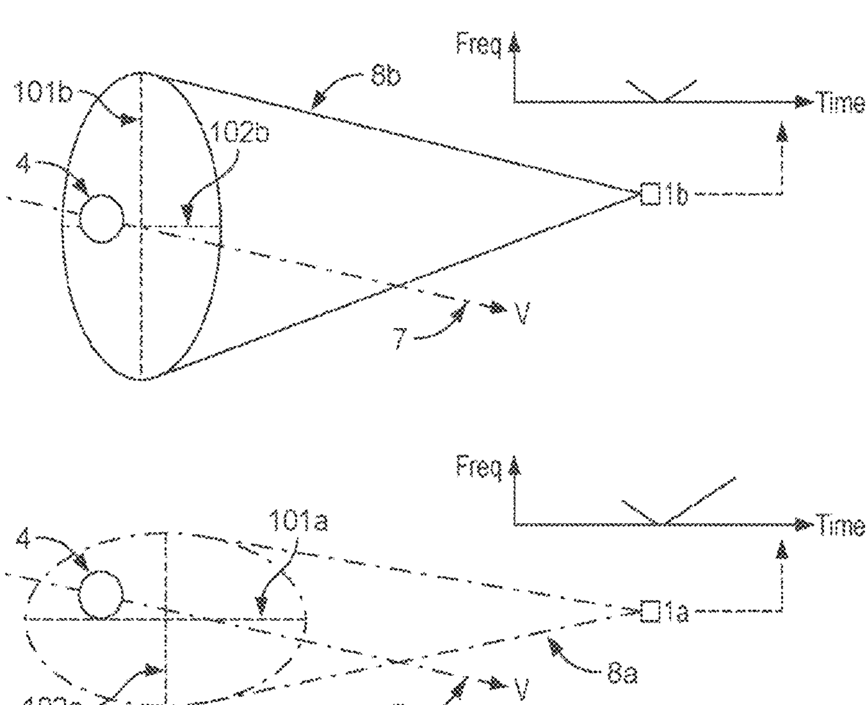
FIG. 17D schematically shows an array of self-mixing interferometers with differing beam geometries employed in determining a particle property.

FIG. 17D schematically shows an array of self-mixing interferometers, 1*a* and 1*b*, with differing beam geometries employed in determining a particle property. Here, the first and second self-mixing interferometers, 1*a* and 1*b*, of FIG. 17A are re-configured to output beams that are either non-overlapping or that do overlap but only at large distances from the two self-mixing interferometers that are not considered for particle monitoring purposes (or that are considered separately, as discussed above). In aspects of the invention, the processing module of the self-mixing interferometer may be configured to provide this property of laser beams, e.g., as disclosed herein.

Each one of the two self-mixing interferometers is as described herein with reference, for example, to FIG. 2A (or FIG. 3 or FIG. 4 for example) and each is configured to produce a diverging conical laser beam (or a moving laser beam which is moved in such a way as to bathe a region defined by a diverging cone). The cross-sectional shape of each of the two respective laser beam cones, in a direction perpendicular to the longitudinal axis of the laser beam cone, is non-circular. The cross-sectional shape of each of the two laser beam cones defines a respective shape which is longest along a first axis perpendicular to the longitudinal axis of the laser beam cone and is shortest along a second axis that is perpendicular to the first axis and perpendicular to the longitudinal axis of the laser beam cone. The first axis of one of the laser beam cones is non-parallel to the first axis of one of the other of the laser beam cones. In this way, the cross-sectional shape of each one of the two laser beam cones is elongated along the respective first axis and these elongation axes are oblique relative to each other.

For example, in aspects of the invention in which the self-mixing interferometers, 1*a* and 1*b*, each produces a respective static conical laser beam, the cross-sectional shape of each of the two respective laser beam cones may be elliptical. For example, the elliptical cross-sectional shape of a first laser beam cone 8*a* generated by a first self-mixing interferometer 1*a* may comprise an ellipse major axis 101*a* and an ellipse minor axis 102*a*. Similarly, the elliptical cross-sectional shape of a second laser beam cone 8*b* generated by a second self-mixing interferometer 1*b* may comprise an ellipse major axis 101*b* and an ellipse minor axis 102*b*. These elliptical cross-sectional shapes may be generated by the use of astigmatic optics within the optical assembly (item 1B, FIG. 2A) of the respective self-mixing interferometer (1*a*, 1*b*). The first axis 101*a* of the laser beam cone produced by the first self-mixing interferometer, 1*a*, is non-parallel to (e.g., approximately perpendicular to) the first axis 101*b* of the laser beam cone produced by the second self-mixing interferometers, 1*b*. In this way, the cross-sectional shape of each one of the two laser beam cones is elongated along the respective first axis and these elongation axes are oblique relative to each other. The result is that each respective beam geometry, particularly the orientation of a respective long axis of the elongated beam cross-sectional shape, is sympathetic to a similar (or same) spatial orientation of a path 7 of a particle 4 through that beam. The greater the similarity of these relative orientations, as between the long axis of the elongated beam cross-sectional shape and the particle path 7, the greater the duration of the interaction between the particle and the laser light of the beam bathing that particle. Consequently, more data describing a scalogram (e.g., a wavelet scalogram: see FIG. 9C, or a Fourier scalogram (e.g., spectrogram): see FIG. 9B) is generated as schematically illustrated in the scalograms shown in FIG. 17D. This spatial variety in beam geometry thereby permits a greater sampling of the monitored area and helps to avoid a sampling 'bias' in the interferometric signal data against those particles having a path orientation that is sympathetic to the geometry of one beam (and one beam geometry) alone. For example, the spatial orientation of the long axis 101*a* of the cross-section beam shape of the first self-mixing interferometer 1*a* is more sympathetic to (i.e., more similar to) the spatial orientation of the particle path 7 than is the spatial orientation of the long axis 101*b* of the cross-section beam shape of the second self-mixing interferometer 1*b*. In addition, only the short axis 102*b* of the second self-mixing interferometer 1*b* is similarly sympathetic to the spatial orientation of the particle path 7. The result is that the interferometric data generated by the first self-mixing interferometer 1*a* describes a longer/fuller scalogram than does the interferometric data generated by the second self-mixing interferometer 1*b*, as schematically illustrates in the associated scalograms of FIG. 17D. In aspects of the invention, the self-mixing interferometer may be configured accordingly, e.g., as disclosed herein.

Figure 17E:
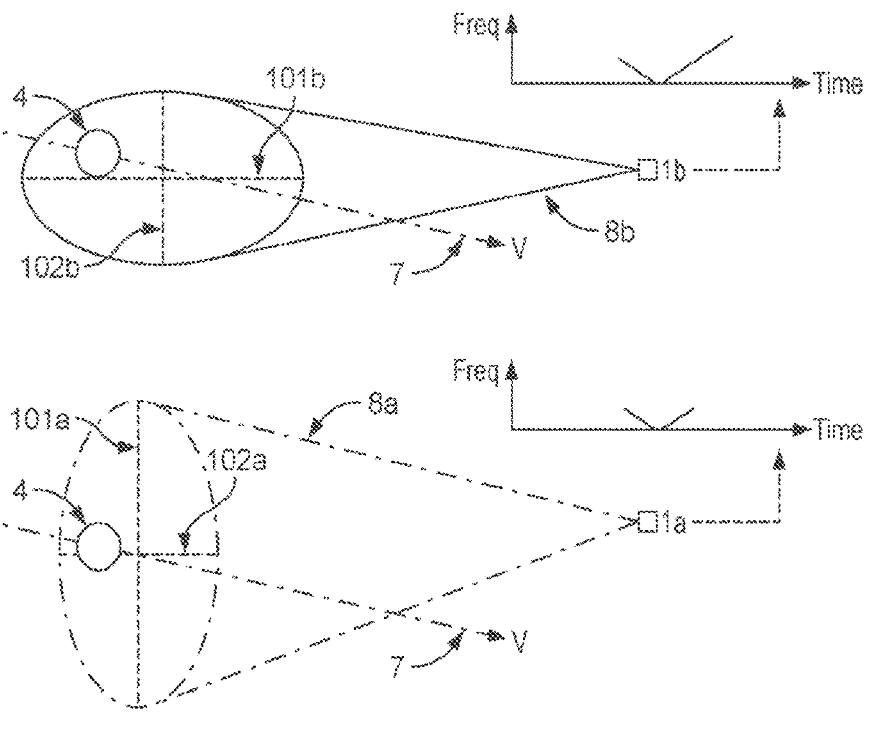
FIG. 17E schematically shows an array of self-mixing interferometers employed in determining a particle property.

FIG. 17E schematically shows an array of self-mixing interferometers employed in determining a particle property. This arrangement of the first and second self-mixing interferometers, 1*a* and 1*b*, matches the arrangement shown in FIG. 17D with the exception that the orientation of the long axes (102*a* and 102*b*) of the first and second self-mixing interferometers (1*a* and 1*b*) are spatially rotated by 90 degrees relative to their respective orientations in the configuration shown in FIG. 17D. The result is that the interferometric data generated by the second self-mixing interferometer 1*b* describes a longer/fuller scalogram than does the interferometric data generated by the first self-mixing interferometer 1*a*, as schematically illustrates in the associated scalograms of FIG. 17E.

In aspects of the invention, the self-mixing interferometer(s) may be configured to change the spatial orientation of a long axis (101*a*, 101*b*) of a cross-section beam shape of the laser beam output by the self-mixing interferometer (or each self-mixing interferometer if more than one is used). This change may be done during the outputting of the laser beam, or between successive separate outputs of a laser beam, such that the monitored region is bathed by laser light from a laser beam of changing cross-sectional geometry as time progresses. This change in cross-sectional geometry may be implemented by the optical assembly which may comprise optical elements (e.g., lenses and/or mirrors etc.) configured to apply a controllably changeable asymmetry (e.g., astigmatism) to the cross-sectional shape of a laser beam output by it. By changing the laser beam cross-sectional geometry in this way, the apparatus may be better able to sample particle properties in a monitored region with less bias against particular particle path orientations.

Figure 17F:
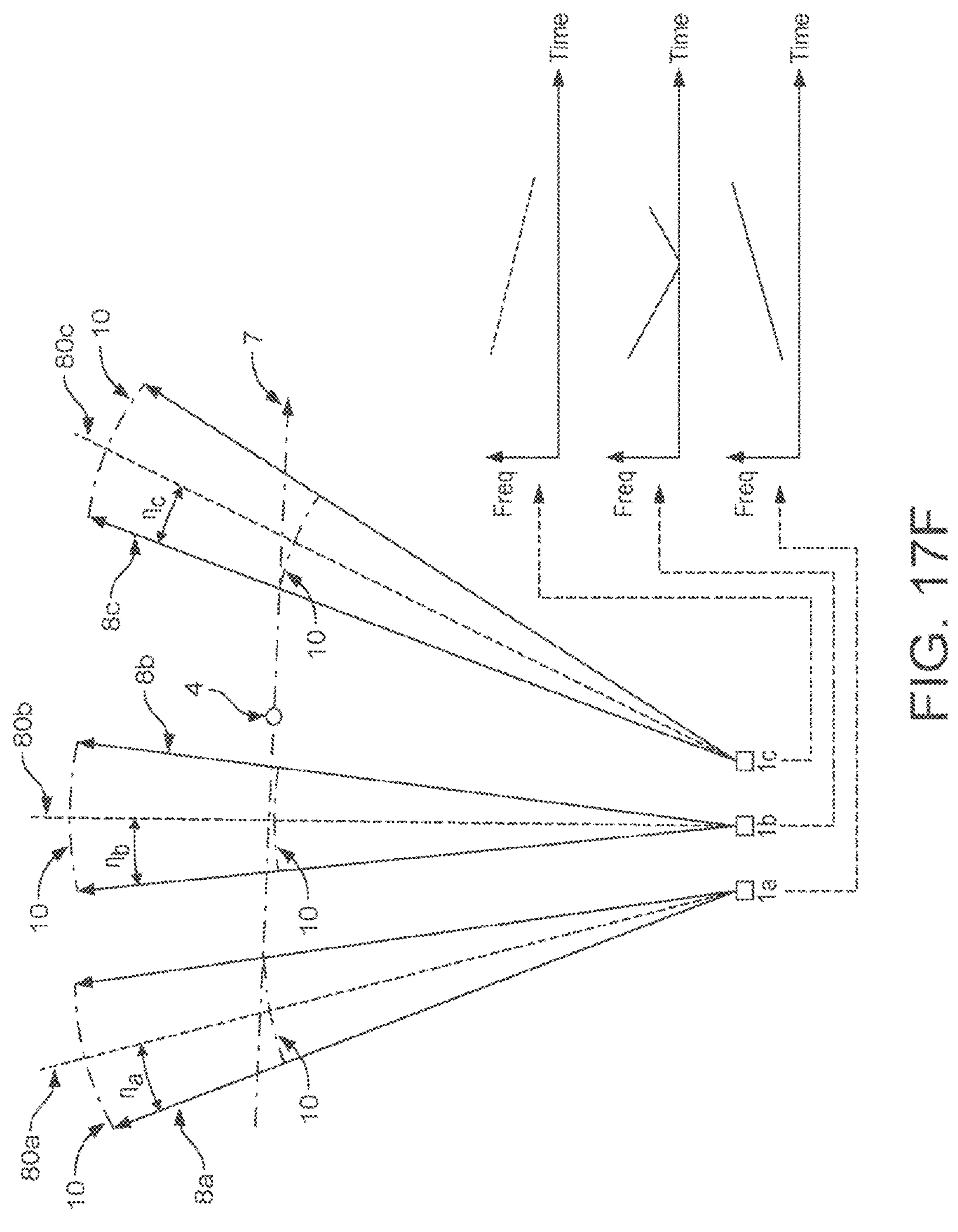
FIG. 17F schematically shows an array of self-mixing interferometers with differing beam directions employed in determining a particle property.

FIG. 17F schematically shows an array of three self-mixing interferometers with differing beam directions employed in determining a particle property. Additional such interferometers and associated laser beams may be provided (not shown). This array comprises three separate self-mixing interferometers, 1*a*, 1*b* and 1*c*, employed in determining a particle property. Each one of the three self-mixing interferometers is as described herein with reference, for example, to FIG. 2A (or FIG. 3 or FIG. 4 for example) and each is configured to produce a diverging conical laser beam 8*a*, 8*b* and 8*c* (or a moving laser beam which is moved in such a way as to bathe a region defined by a diverging cone). The cross-sectional shape of each of the two respective laser beam cones, in a plane parallel to the longitudinal axes (80*a*, 80*b*, 80*c*) of the laser beam cones, is shown in FIG. 17F. The longitudinal axis of any one of the three laser beam cones is non-parallel to the longitudinal axes of the other two of the three laser beam cones. The axes of the three laser beam cones extend in directions that do not cross each other. In other aspects, any two beams or all three beams may be arranged to cross obliquely to define a finite region of beam/cone overlap in which laser light from each of the two or three beams exists concurrently, as discussed with reference to FIG. 17C. The angle of divergence $\eta_a$ of the first laser beam cone 8*a* may or may not be the same as the angle of divergence $\eta_b$ of the second laser beam cone 8*b* and either of these may or may not be the same as the angle of divergence $\eta_c$ of the third laser beam cone 8*c*. The respective cone angles of divergence and beam axis orientations defines both the angular position of the region monitored by the beam in question and the size of that region. In FIG. 17F, the local wavefronts 10 of laser light within each of these three laser beams are shown immediately adjacent to a path 7 of a particle 4 that passes through each of the three laser beams: one after the other. The relative orientation of each wavefront with respect to the particle path 7 defines the nature of the interferometric signal generated by each respective one of the three separate self-mixing interferometers, 1*a*, 1*b* and 1*c*, in response to reflected/scattered light returned to the interferometers by the particle when traversing the beam in question. In aspects of the invention, the self-mixing interferometer may be configured accordingly, e.g., as disclosed herein.

In particular, the particle path 7 traverses the laser beam 8*a* of the first self-mixing interferometer 1*a* in a direction that approaches, but never achieves, a tangential orientation to the local wavefront and, at all times, possessing a component of velocity resolved in a direction perpendicular to the local wavefront that is directed towards the first self-mixing interferometer. This results in interferometric data describing a scalogram (e.g., Fourier or wavelet) in which the instantaneous frequency continually falls during the time that the particle traverses the first laser beam 8*a*. This is schematically shown in FIG. 17F. Conversely, the particle path 7 traverses the laser beam 8*b* of the second self-mixing interferometer 1*b* in a direction that approaches, and momentarily achieves, then subsequently recedes from, a tangential orientation to the local wavefront. The particle path 7 has a component of velocity resolved in a direction perpendicular to the local wavefront, that is initially directed towards the first self-mixing interferometer. This component momentarily vanishes and then re-emerges in a direction away the first self-mixing interferometer. This results in interferometric data describing a scalogram (e.g., Fourier or wavelet) in which the instantaneous frequency initially falls, momentarily vanishes and then increases during the time that the particle traverses the second laser beam 8$b$. This is schematically shown in FIG. 17F. In addition, the particle path 7 traverses the laser beam 8$c$ of the third self-mixing interferometer 1$c$ in a direction that recedes from, but never achieves, a tangential orientation to the local wavefront and, at all times, possesses a component of velocity resolved in a direction perpendicular to the local wavefront that is directed away from the third self-mixing interferometer. This results in interferometric data describing a scalogram (e.g., Fourier or wavelet) in which the instantaneous frequency continually rises during the time that the particle traverses the third laser beam 8$c$. This is schematically shown in FIG. 17F.

In this way, the use of multiple laser beams directed in multiple different respective directions in space (e.g., non-overlapping), the apparatus may be better able to sample particle properties in a monitored region with less bias against particular particle path orientations. Any one of, or any number of (e.g., some or all of), the laser beams may also be configured to possess a non-symmetrical cross-sectional shape, as discussed above with reference to FIGS. 17D and 17E. In addition, if the individual scalograms (e.g., Fourier or wavelet) generated by each individual self-mixing interferometer (1$a$, 1$b$, 1$c$) are all in respect of the same particle which traverses the respective laser beams (8$a$, 8$b$, 8$c$) of the interferometers one after the other in succession, as shown in FIG. 17F, then these successive scalograms may be combined in to one composite scalogram comprising the scalograms of each interferometer representing a respective component of the composite scalogram covering a respective one of a sequence of successive time intervals. This arrangement may be implemented in the scenarios discussed herein with reference to FIG. 3 above, for example.

Particle Concentration

Having obtained an estimate of the speed v of a particle, according to any technique disclosed herein, it is possible to generate an estimate of the concentration of detected particles within the region bathed by the laser light of the self-mixing interferometer(s) in question. Consider volume V=Al of space defined by a plane area A swept through a linear distance l. If this volume of space contains N particles then the particle concentration, Ω, is defined as:

$$\Omega = \frac{N}{Al}$$

Now consider that the plane area A is swept through the linear distance I due to a uniform flow of a gas at an average speed ⟨v⟩ within which the particles are entrained and possess the same average speed. If the average separation, in the direction of the flow of gas, between successive particles within this gas flow is Δx, then:

$$\Omega(N = 1) = \frac{1}{A\Delta x}$$

In other words, for a segment of the volume V defined as ΔV=AΔx, one particle is present on average. This means that a self-mixing interferometer configured to detect the presence of a particle in the region of volume ΔV will detect one particle. Thus, over an interval of time Δt, the self-mixing interferometer may detect $N_{\Delta t}$=⟨v⟩ Δt/Δx separate particles, successively. Substituting for Δx reveals that the particle concentration may be determined from the average rate, R=$N_{\Delta t}$/Δt, of particle detection events as follows:

$$\Omega = \frac{N_{\Delta t}}{A\langle v\rangle\Delta t} = \frac{R}{A\langle v\rangle}$$

Here, $N_{\Delta t}$ is the number of particle detection events occurring at the self-mixing laser interferometer device over a period of time Δt, A is the projected area of the effective detection region of the laser beam of the interferometer in a direction perpendicular to the average direction of flow of gas within which the detected particles were entrained, and ⟨⟨v⟩ is the average speed (averaged across the measured speeds of the detected population of particles) of detected particles within that flow. In aspects of the invention, the processing module of the self-mixing interferometer may be configured to determine a value of particle concentration accordingly, e.g., as disclosed herein.

As expected, for a given particle concentration Ω, an increase in the average speed of detected particles results in a proportional increase in the number $N_{\Delta t}$ of detected particles within the period of time Δt.

The average direction of gas flow may be determined according to a technique disclosed herein. The cross-sectional area A of the volume V of the region of space that the self-mixing interferometer configured to detect particles, may be determined from the known geometry and configuration of the laser beam of the interferometer. The average rate, R, of particle detection may be determined by calculating the quantity: R=$N_{\Delta t}$/Δt. This may be done in a continuously updating manner such that:

$$R = N(t)/(t - t_0)$$

Here, N (t) is the cumulative number of particles detected, or the cumulative number of individual particle detection events, at a time t measured continuously from a starting time of t=$t_0$. In aspects of the invention, the processing module of the self-mixing interferometer may be configured to determine a value of particle detection rate accordingly, e.g., as disclosed herein.

Figure 19:
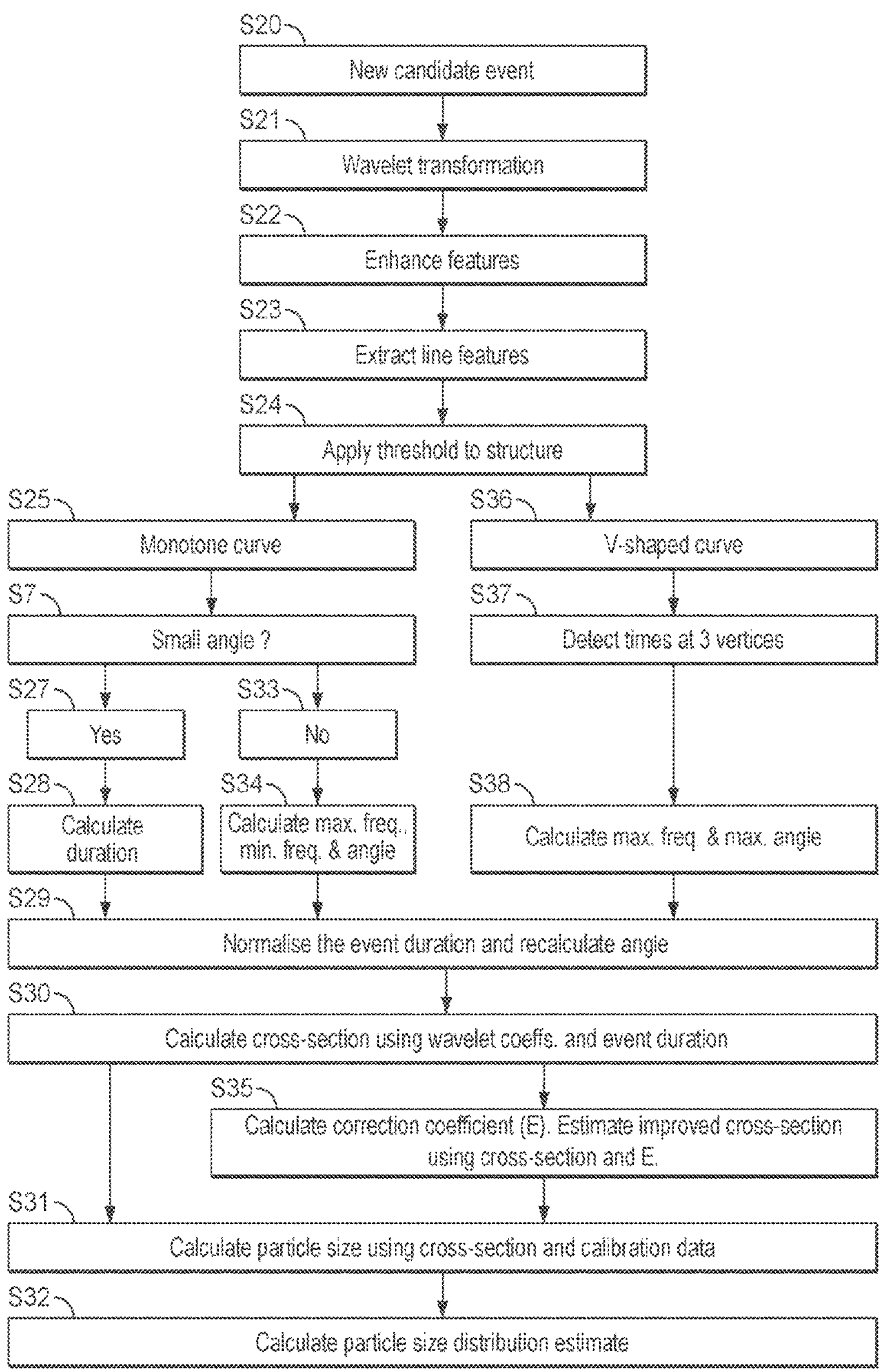
FIG. 19 shows a flow-chart if steps in an algorithm implemented by a self-mixing interferometer.

The processing module 1D is configured to use structures in the scalograms by implementing the following algorithm in order to generate an estimate of the distribution of the size of particles that have passed through the laser beam. Referring to FIG. 19, here is shown a sequence of the following steps in this algorithm.

Step S20: Acquire an interferometric signal corresponding to a new 'candidate event'. Her the term 'candidate event' refers to the event of a particle traversing the laser beam and causing generation of an interferometric signal.

Step S21: Apply a wavelet transformation to the interferometric signal to obtain data describing a wavelet scalogram.

Step S22: Apply a filter to the data describing the wavelet scalogram in order to enhance edge features of structures (e.g., data lobes) within the data describing the wavelet scalogram. For example, a kernel based filter may be used, such as a "Canny Edge" filter or the like.

Step S23: Extract line features from the filtered data. A Hough transform can be used for this purpose, for example, as described below in more detail with reference to FIGS. 15A and 15B.

Step S24: Identify whether the inclination of the extracted linear feature is sufficiently small. For example, one may determine if an angle ($\theta_H$) detected in the Hough transform space has a magnitude value above a pre-set threshold value (i.e., see FIG. 15B, $|\theta_H|>\theta_{Thr}$). It is noted that the angle of inclination (@mmc) of the extracted linear feature is related to the angle ($\theta_H$) detected in the Hough transform space as follows: $\theta_{inc}=\pi/2-\theta_H$. Thus, a sufficiently large value of $\theta_H$ may correspond to a desirably small value of angle of inclination ($\theta_{Inc}$).

Step S25: If only one angle value is detected in the Hough transform space then determine that the scalogram data distribution possesses only one lobe ("Monotone Curve"). FIG. 11C and FIG. 11D are examples of this.

Step S26: If "MONOTONE CURVE" is determined at Step S25, then determine if the value of angle of inclination ($\theta_{Inc}$) is sufficiently small. This may be done by comparing the magnitude of the value of angle of inclination to a threshold inclination angle value (e.g., i $$|\theta_{Inc}| < \theta_{Thr}^{Inc}$$

?). Step S27: If the value of angle of inclination ($\theta_{Inc}$) is sufficiently small then go to Step S28.

Step S28: Calculate the duration $$T' = [t'_3 - t'_2]$$

(see FIG. 12C) or $\Delta T_{end}$ (see FIG. 15) of the time interval over which the data describing the relevant part of the scalogram extends or represents.

Step S29: Normalise (re-scale) the time interval to mitigate against the effects of the distance of the particle from the laser resonator cavity of the interferometer. Re-calculate the angle θ subtended by that part of the scalogram data according to the re-scaled time interval.

Step S30: Calculate a value for the scattering cross-section of the particle using the sum of the squares of the moduli of the wavelet coefficients, and dividing the sum by the duration of the time interval over which the data describing the relevant part of the scalogram extends or represents.

Step S31: Calculate an estimate of the size of the particle radius, a, using cross-section calculated at Step S29 and using a pre-stored cross-section calibration coefficient.

Step S32: Generate (or update) a distribution (e.g., histogram) of the distribution of measured particle radius sizes. This may include adding a newly-calculated estimate of the size of the particle radius, a, to an appropriate particle radius size bin in a pre-existing histogram of such earlier-measured radius estimate values, to as to update that histogram.

Step S33: If the angle is determined to be not sufficiently small, then go to Step S34.

Step S34: Determine $\omega_{Max2}$, $\omega_{Min}$ (or $\omega_{Max1}$, $\omega_{Min}$ as desired: see FIG. 12C) for the time interval over which the data describing the relevant part of the scalogram extends or represents, and from them calculate the angle θ subtended by that part of the scalogram data. Go to Step S29 and normalise (re-scale) the time interval to mitigate against the effects of the distance of the particle from the laser resonator cavity of the interferometer. Go to Step S30 and calculate a value for the scattering cross-section of the particle using the sum of the squares of the moduli of the wavelet coefficients, and dividing the sum by the duration of the time interval over which the data describing the relevant part of the scalogram extends or represents.

Step S35: Determine a correction coefficient (E, where E>1) using pre-set coefficient look-up tables in which an input value of the re-calculated angle θ returns a correction coefficient E for that angle subtended by that part of the scalogram data. Estimate improved cross-section by multiplying the original cross-section value by the correction coefficient E. Go to Step S31 and calculate an estimate of the size of the particle radius, a, using corrected cross-section value and using a pre-stored cross-section calibration coefficient. Go to Step S32 and generate (or update) a distribution (e.g., histogram) of the distribution of measured particle radius sizes. This may include adding a newly-calculated estimate of the size of the particle radius, a, to an appropriate particle radius size bin in a pre-existing histogram of such earlier-measured radius estimate values, to as to update that histogram.

Step S36: If two angle values are detected in the Hough transform space then determine that the scalogram data distribution possesses two lobes ("V-Shaped"). FIG. 11A, FIG. 11B and FIGS. 11E to 11H, and FIG. 12C are examples of this.

Step S37: Determine the wavelet frequency extremes $\omega_{Max1}$, $\omega_{Min}$, $\omega_{Max2}$, and the corresponding times $t_1$, $t_2$, $t_3$, respectively, at which these frequency extremes occur (as desired: see FIG. 12C) for the time interval over which the data describing the relevant part of the scalogram extends or represents. These frequency extremes, and the times at which they occur, define the coordinates of the three 'vertices' of the V-shaped structure of described by the data describing the scalogram.

Step S38: Select the greater of $\omega_{Max1}$ and $\omega_{Max2}$, and select the part of the scalogram data that describes the time interval part of the scalogram having frequencies extending between $\omega_{Min}$ and whichever one of $\omega_{Max1}$ and $\omega_{Max2}$ was selected. Calculate the angle θ subtended by that selected part of the scalogram data relative to the time axis. Go to Step S29 and normalise (re-scale) the selected time interval to mitigate against the effects of the distance of the particle from the laser resonator cavity of the interferometer. Re-calculate the angle θ subtended by that part of the scalogram data according to the re-scaled time interval. Go to Step S30 and calculate a value for the scattering cross-section of the particle using the sum of the squares of the moduli of the wavelet coefficients, and dividing the sum by the duration of the time interval over which the data describing the relevant part of the scalogram extends or represents. Go to Step S35 and determine a correction coefficient (E, where E>1) using pre-set coefficient look-up tables in which an input value of the re-calculated angle θ returns a correction coefficient E for that angle subtended by that part of the scalogram data. Estimate improved cross-section by multiplying the original cross-section value by the correction coefficient E. Go to Step S31 and calculate an estimate of the size of the particle radius, a, using corrected cross-section value and using a pre-stored cross-section calibration coefficient. Go to Step S32 and generate (or update) a distribution (e.g., histogram) of the distribution of measured particle radius sizes. This may include adding a newly-calculated estimate of the size of the particle radius, a, to an appropriate particle radius size bin in a pre-existing histogram of such earlier-measured radius estimate values, to as to update that histogram.

In aspects of the invention, the processing module of the self-mixing interferometer may be configured to determine a value of particle property according to these steps, e.g., as disclosed herein.

References herein to a "wavelet scalogram" may include a reference to a visual representation of a wavelet transform, having axes for time, scale (e.g., frequency), and wavelet coefficient magnitude value, analogous to a spectrogram.

References herein to a "Fourier scalogram" may include a reference to a visual representation of a Fourier transform, having axes for time, frequency, and power per unit frequency (ω) value (i.e., the ratio: Power/ω, dB/Hz), analogous to a spectrogram, or synonymous with a spectrogram.

The invention includes the combination of the aspects and preferred features described except where such a combination is clearly impermissible or expressly avoided.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

The invention claimed is:

1. A self-mixing interferometer configured to monitor particulate material within a monitored region of space comprising:

a laser cavity assembly;

an optical assembly configured to bathe the monitored region with laser light of the interferometer possessing wavefronts having different directions at different respective locations within the monitored region;

a laser monitoring unit configured to acquire an interferometric signal generated by the interferometer in response to light returned to the laser cavity assembly from said wavefronts by said particulate material;

a computer processing module configured to determine a reference wavefront corresponding to a position that the particulate material enters into the laser light in the monitored region, and a property of the particulate material within the monitored region based on the reference wavefront and according to changes in the frequency of a waveform within at least a part of the interferometric signal.

2. The self-mixing interferometer according to claim 1, wherein the computer processing module is configured to determine a property of the particulate material within the monitored region according to a continuous change in the frequency of said waveform.

3. The self-mixing interferometer according to claim 1, wherein the property of the particulate material comprises a property of the path thereof within the monitored region.

4. The self-mixing interferometer according to claim 3, wherein the property of the path comprises a distance to said particulate material relative from the interferometer.

5. The self-mixing interferometer according to claim 3, wherein the property of the path comprises a speed of said particulate material relative to the interferometer.

6. The self-mixing interferometer according to claim 3, wherein the property of the path comprises a direction of said particulate material relative to the interferometer.

7. The self-mixing interferometer according to claim 1, wherein the computer processing module is configured to determine a size and/or a size distribution of said particulate material within the region of space.

8. The self-mixing interferometer according to claim 1, wherein the computer processing module is configured to determine a concentration of said particulate material within the region of space.

9. The self-mixing interferometer according to claim 1, wherein the interferometric signal generated by the interferometer and acquired by the laser monitoring unit comprises a voltage waveform signal at least a part of which continuously changes in frequency and corresponds to a voltage across the electrical drive terminals of a laser cavity of the laser cavity assembly.

10. The self-mixing interferometer according to claim 1, wherein the interferometric signal generated by the interferometer and acquired by the laser monitoring unit comprises an optical output power signal at least a part of which continuously changes in frequency and corresponds to an optical output power of a laser cavity of the laser cavity assembly.

11. The self-mixing interferometer according to claim 1, wherein the optical assembly is configured to bathe the monitored region with a static divergent and/or convergent beam of said laser light possessing a curved wavefront in which the monitored region comprises regions other than a focal region of said laser light.

12. The self-mixing interferometer according to claim 1, wherein the optical assembly is configured to bathe the monitored region with a beam of said laser light possessing a substantially flat wavefront moved across the monitored region to a plurality of different directions.

13. The self-mixing interferometer according to claim 1, in which said laser cavity assembly is configured to output a laser beam in each of two or more different directions, wherein the computer processing module is configured to determine two or three mutually orthogonal components of a velocity of particulate material through the monitored region according to said changes in the frequency of a waveform within at least a part of the interferometric signals generated respectively by the laser cavity assembly when in each of the two or more different directions and/or according to the number of wave cycles within the respective waveforms.

14. The self-mixing interferometer according to claim 1, wherein said waveform within at least a part of the interferometric signal comprises a chirped waveform.

15. The self-mixing interferometer according to claim 1, wherein said laser cavity assembly is configured to output two or more laser beams comprising different respective cross-sectional beam shapes and/or different beam directions.

16. The self-mixing interferometer according to claim 15, wherein the two or more laser beams are configured to overlap within the monitored region to define an overlap region and the computer processing module is configured to determine a property of the particulate material within the overlap region in response to light returned to the laser cavity assembly concurrently from said wavefronts of said two or more laser beams.

17. The self-mixing interferometer according to claim 15, wherein the computer processing module is configured to determine a property of the particulate material within the monitored region according to differences in said respective cross-sectional beam shapes.

18. A portable electronic device comprising the self-mixing interferometer according to claim 1.

19. An air purification device comprising the self-mixing interferometer according to claim 1.

20. A method for monitoring particulate material within a monitored region of space using self-mixing interferometry comprising:

providing an interferometer comprising a laser cavity assembly and an optical assembly;

bathing the monitored region with laser light of the interferometer possessing wavefronts having different directions at different respective locations within the monitored region;

acquiring an interferometric signal generated by the interferometer in response to light returned to the laser cavity assembly from said wavefronts by said particulate material;

by a computer processing module, determining a reference wavefront corresponding to a position that the particulate material enters into the laser light in the monitored region, and a property of the particulate material within the monitored region based on the reference wavefront and according to changes in the frequency of a waveform within at least a part of the interferometric signal.

* * * * *